US012474670B2

(12) United States Patent
Komatsu et al.

(10) Patent No.: US 12,474,670 B2
(45) Date of Patent: Nov. 18, 2025

(54) CARTRIDGE UNIT

(71) Applicant: CANON KABUSHIKI KAISHA, Tokyo (JP)

(72) Inventors: Noriyuki Komatsu, Shizuoka (JP); Teruhiko Sasaki, Shizuoka (JP); Tomonori Mori, Kanagawa (JP); Makoto Hayashida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/433,893

(22) Filed: Feb. 6, 2024

(65) Prior Publication Data

US 2024/0176287 A1 May 30, 2024

Related U.S. Application Data

(63) Continuation of application No. 17/554,157, filed on Dec. 17, 2021, now Pat. No. 11,927,913, which is a (Continued)

(30) Foreign Application Priority Data

Dec. 27, 2019 (JP) ................................ 2019-239498
Nov. 26, 2020 (JP) ................................ 2020-196038

(51) Int. Cl.
*G03G 21/18* (2006.01)

(52) U.S. Cl.
CPC ..... *G03G 21/1878* (2013.01); *G03G 21/1814* (2013.01); *G03G 2221/1823* (2013.01)

(58) Field of Classification Search
CPC ........... G03G 21/1878; G03G 21/1814; G03G 2221/1823; G03G 21/1875; G03G 15/0865; G03G 2215/0695; G03G 2215/0697
See application file for complete search history.

(56) References Cited

U.S. PATENT DOCUMENTS 7,447,469 B2 11/2008 Uchiyama
7,826,780 B2 11/2010 Deguchi
(Continued)

FOREIGN PATENT DOCUMENTS

CN 1428668 A 7/2003
CN 1459673 A 12/2003
(Continued)

OTHER PUBLICATIONS

Office Action issued in Chinese Appln. No. 202211682967.3 mailed Apr. 28, 2024. English machine translation provided.
(Continued)

*Primary Examiner* — Sandra Brase
(74) *Attorney, Agent, or Firm* — ROSSI, KIMMS & McDOWELL LLP

(57) ABSTRACT

A cartridge unit includes: a first unit which includes a first supporting portion and a second supporting portion; and a second unit which includes a first supported portion, a second supported portion, and a storage member, the storage member including a memory contact, and a contact arrangement surface on which the memory contact is disposed. The second unit rotates from a first position to a second position in a state in which the first supported portion is supported by the first supporting portion and the second supported portion is supported by the second supporting portion to be positioned with respect to the first unit. A normal direction of the contact arrangement surface faces toward a direction in which the memory contact is exposed. The normal direction faces toward a direction opposite to a direction in which the second unit is directed from the first position to the second position.

9 Claims, 54 Drawing Sheets

Related U.S. Application Data continuation of application No. 17/126,498, filed on Dec. 18, 2020, now Pat. No. 11,237,519.

(56) References Cited

U.S. PATENT DOCUMENTS

| | | | | |
|---|---|---|---|---|
| 7,840,154 | B2 | 11/2010 | Ishii | |
| 7,953,339 | B2 | 5/2011 | Fukamachi | |
| 9,823,621 | B2 * | 11/2017 | Miyamoto | G03G 21/1814 |
| 10,042,321 | B2 | 8/2018 | Abe | |
| 2003/0215261 | A1 | 11/2003 | Karakama et al. | |
| 2007/0230999 | A1 | 10/2007 | Shimomura | |
| 2009/0184817 | A1 | 7/2009 | Ishizuka | |
| 2009/0214249 | A1 | 8/2009 | Lee et al. | |
| 2011/0020039 | A1 | 1/2011 | Mitsuishi et al. | |
| 2012/0274992 | A1 | 11/2012 | Suzuki | |
| 2014/0356004 | A1 | 12/2014 | Tsuritani et al. | |
| 2017/0075297 | A1 * | 3/2017 | Eto | G03G 15/0865 |
| 2017/0217196 | A1 | 8/2017 | Kon et al. | |
| 2018/0017934 | A1 | 1/2018 | Abe et al. | |
| 2018/0095420 | A1 | 4/2018 | Abe et al. | |
| 2019/0196394 | A1 | 6/2019 | Yabuki et al. | |
| 2022/0197185 | A1 * | 6/2022 | Kamimura | G03G 15/0889 |

FOREIGN PATENT DOCUMENTS

| | | | |
|---|---|---|---|
| CN | 1480801 | A | 3/2004 |
| CN | 1758151 | A | 4/2006 |
| CN | 101046661 | A | 10/2007 |
| CN | 101515134 | A | 8/2009 |
| CN | 102759872 | A | 10/2012 |
| CN | 104914701 | A | 9/2015 |
| CN | 107020826 | A | 8/2017 |
| JP | 2002072784 | A | 3/2002 |
| JP | 2005181968 | A | 7/2005 |
| JP | 2008224966 | A | 9/2008 |
| JP | 2008249802 | A | 10/2008 |
| JP | 2008276138 | A | 11/2008 |
| JP | 2018010243 | A | 1/2018 |

OTHER PUBLICATIONS

Notice of Allowance issued in U.S. Appl. No. 17/126,498, mailed Sep. 29, 2021.

Office Action issued in U.S. Appl. No. 17/554,157, mailed Dec. 21, 2022.

Office Action issued in U.S. Appl. No. 17/554,157, mailed Apr. 24, 2023.

Office Action issued in U.S. Appl. No. 17/554,157, mailed Jul. 18, 2023.

Notice of Allowance issued in U.S. Appl. No. 17/554,157, mailed Nov. 22, 2023.

* cited by examiner

10

CARTRIDGE UNIT

BACKGROUND OF THE INVENTION

Field of the Invention

The present invention relates to a cartridge unit.

Description of the Related Art

In laser beam printers and copiers used as electrophotographic image forming apparatuses, a toner image is formed on a photosensitive drum and the toner image is transferred to a sheet serving as a recording material to form an image on the recording material.

In laser beam printers, in order to facilitate maintenance, a method in which some parts of an image forming apparatus are provided in a cartridge and the cartridge is taken out of a main body of the apparatus to perform maintenance or replacement is widely adopted.

Japanese Patent Application Publication No. 2018-10243 discloses a cartridge unit having a photosensitive member unit having a photosensitive drum, a developing unit having a developing roller, and a toner cartridge for accommodating toner, in which the developing unit and the toner cartridge are attachable to and detachable from the photosensitive member unit.

The toner cartridge in which the toner is accommodated is detachably provided in a process cartridge having the developing unit and the photosensitive member unit. The cartridge unit is configured by integrating the process cartridge and the toner cartridge. On the other hand, a cartridge unit may include a storage member for storing information.

An object of the present invention is to appropriately dispose a storage member in a case in which a toner cartridge includes the storage member.

SUMMARY OF THE INVENTION

In order to achieve the object described above, a cartridge unit including:

- a first unit which includes a photosensitive drum, a developing roller, a first supporting portion, and a second supporting portion; and
- a second unit which is configured to be attachable to and detachable from the first unit, the second unit including a first supported portion supported by the first supporting portion, a second supported portion supported by the second supporting portion, and a first storage member that stores information, and the second unit configured to supply developer to the first unit, the first storage member including a first storage element, a first memory contact electrically connected to the first storage element, and a first contact arrangement surface on which the first memory contact is disposed,
- wherein the second unit is configured to rotate from a first position to a second position in a state in which the first supported portion is supported by the first supporting portion and the second supported portion is supported by the second supporting portion so that the second unit is positioned with respect to the first unit,
- the second unit rotate from the first position to the second position such that the first supported portion and the second supported portion are rotation centers of the second unit, and
- a normal direction of the first contact arrangement surface faces toward a direction in which the first memory contact is exposed, the normal direction of the first contact arrangement surface faces toward a direction opposite to a direction in which the second unit is directed from the first position to the second position.

In order to achieve the object described above, a cartridge unit which is attachable to and detachable from an apparatus main body of an image forming apparatus, the apparatus main body including a positioning portion and a rotation restricting portion, the cartridge unit including:

- a first unit which includes a photosensitive drum and a developing roller;
- a second unit which is configured to be attachable to and detachable from the first unit, the second unit including a first storage member that stores information, and the second unit configured to supply developer to the first unit, the first storage member including a first storage element, a first memory contact electrically connected to the first storage element, and a first contact arrangement surface on which the first memory contact is disposed;
- a positioned portion which comes into contact with the positioning portion; and
- a rotation restricted portion which comes into contact with the rotation restricting portion and restricts rotation around the positioned portion,
- wherein the first contact arrangement surface faces toward a direction opposite to a direction in which the rotation restricted portion is pressed against the rotation restricting portion.

Further features of the present invention will become apparent from the following description of exemplary embodiments (with reference to the attached drawings).

DESCRIPTION OF THE EMBODIMENTS

Figure 1:
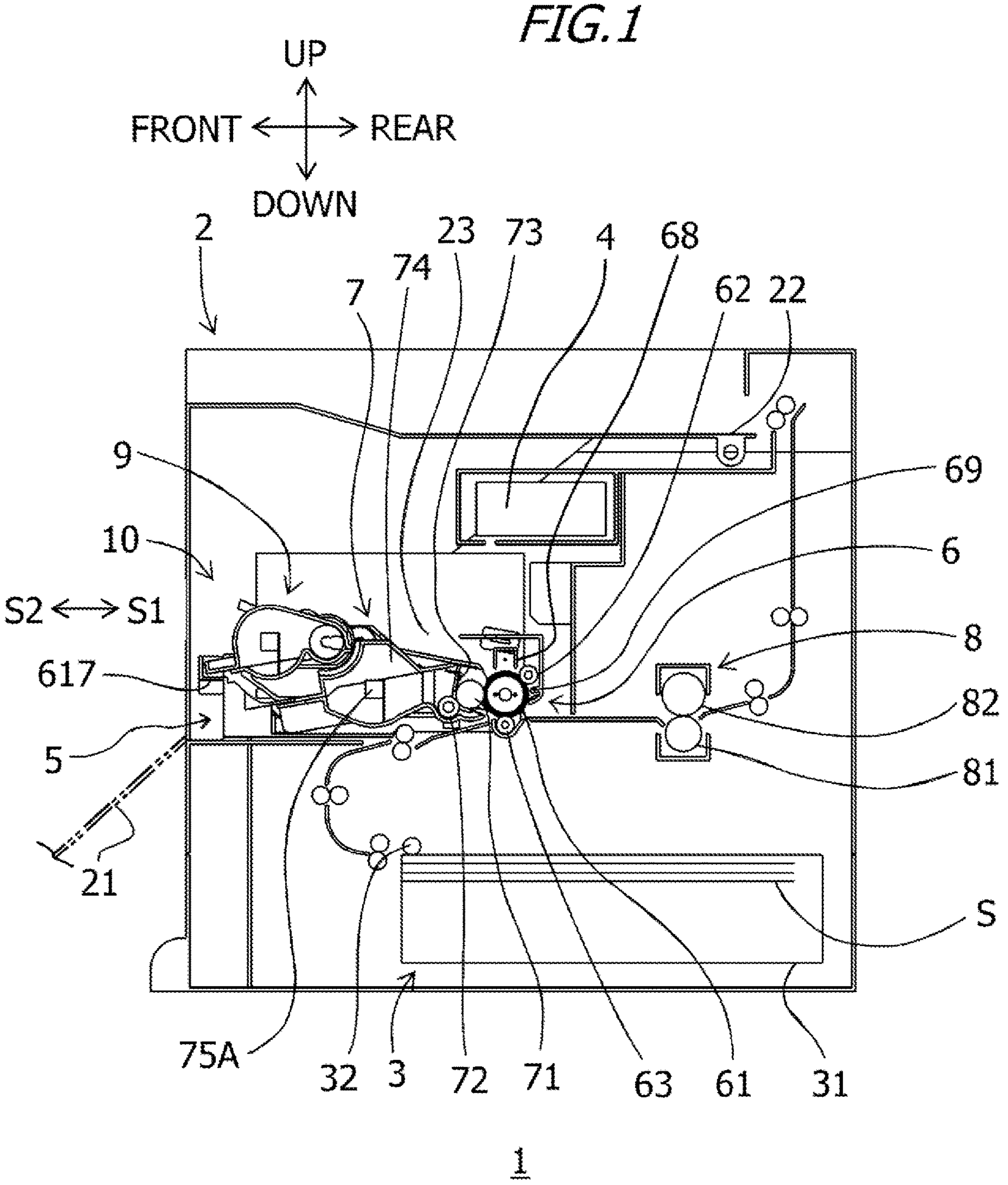
FIG. 1 is a cross-sectional view of an image forming apparatus including a cartridge unit of a first embodiment.

Embodiments of the present invention will now be described with reference to the drawings. Dimensions, materials, shapes of the components and the relative positions thereof described in the embodiments may be appropriately changed depending on the configuration of an apparatus to which the present invention is applied, and on various conditions, and are not intended to limit the scope of the invention to the following embodiments.

First Embodiment

A first embodiment of the present invention will be described in detail with reference to the figures as appropriate.

In the following description, directions are defined with a user who uses an image forming apparatus 1 set as a reference. That is, a front face side of the image forming apparatus 1 is defined as "front", a rear face side thereof is defined as "rear", an upper surface (top surface) side thereof is defined as "up", and a lower surface (bottom surface) side is thereof is defined as "down". Further, a left side of the image forming apparatus 1 when viewed from the front side is defined as "left", and a right side thereof is defined as "right".

Directions of a process cartridge 5 and a toner cartridge 9 are also defined in the same manner as in the image forming apparatus 1 assuming that they have the same postures as when they are attached to the image forming apparatus 1. The directions in the figures are defined by arrows shown in the figures. A front to rear direction, an up and down direction, and a left to right direction indicated by these arrows are directions orthogonal to each other. These directions indicate fixed directions in all figures. The up and down direction is parallel to a vertical direction, and the left to right direction and the front to rear direction are parallel to a horizontal direction.

Also, the left to right direction is parallel to a rotational axis direction of a photosensitive drum 61 and a rotational axis direction of a developing roller 71. Further, a developing unit 7 attached to and integrated with a photosensitive member unit 6 is referred to as the process cartridge 5. An insertion direction (attaching direction) S1 and a detaching direction S2 when the process cartridge 5 is attached to an apparatus main body 2 are parallel to the front to rear direction and orthogonal to the left to right direction and the up and down direction.

In addition, the process cartridge 5 that is a first unit is provided with a detachable toner cartridge 9 that is a second unit for supplying toner to the developing unit 7. The process cartridge 5 to which the toner cartridge 9 is attached and integrated is referred to as a cartridge unit 10.

Overall Configuration of Image Forming Apparatus

FIG. 1 is a cross-sectional view of the image forming apparatus 1 to which the cartridge unit 10 is attached, and a cross-section thereof is parallel to the up and down direction and the front to rear direction. As shown in FIG. 1, the image forming apparatus 1 mainly includes a paper feeding portion 3 for supplying paper S into an apparatus main body 2, an exposure apparatus 4, the cartridge unit 10 which transfers a toner image onto the paper S, and a fixing apparatus 8 which heat-fixes the toner image transferred onto the paper S.

The paper feeding portion 3 is provided in a lower part inside the apparatus main body 2 and mainly includes a paper feed tray 31 and a paper feeding mechanism 32. The paper S accommodated in the paper feed tray 31 is supplied toward the cartridge unit 10 (between the photosensitive drum 61 and a transfer roller 63) by the paper feeding mechanism 32.

The exposure apparatus 4 is disposed in an upper part inside the apparatus main body 2 and includes a laser emitting unit (not shown), a polygon mirror, a lens, a reflecting mirror, etc., which have no reference numerals. In this exposure apparatus 4, a laser beam based on image data which is emitted from the laser emitting unit is scanned at a high speed on a surface of the photosensitive drum 61 to expose the surface of the photosensitive drum 61.

The cartridge unit 10 is attachable to and detachable from the apparatus main body 2 and is disposed below the exposure apparatus 4. The cartridge unit 10 is inserted from an opening, which is formed in the apparatus main body 2 when a door (an opening and closing member) 21 of the apparatus main body 2 is opened (shown by a two-dot chain line in FIG. 1), into an accommodating portion 23 of the apparatus main body 2 in an insertion direction S1, and the cartridge unit 10 is attached to the apparatus main body 2. When the cartridge unit 10 is detached from the apparatus main body 2, the cartridge unit 10 is moved and taken out in a detaching direction S2.

The cartridge unit 10 has the process cartridge 5 and the toner cartridge 9. The cartridge unit 10 is configured to be attachable to and detachable from the apparatus main body 2 in a state in which the toner cartridge 9 is attached to the process cartridge 5. The process cartridge 5 mainly includes the photosensitive member unit 6 and the developing unit 7. The photosensitive member unit 6 mainly includes the photosensitive drum 61, a corona charging device 68, an exposure portion 69, a recovery roller 62, and the transfer roller 63. The developing unit 7 is configured to be detachably attached to the photosensitive member unit 6. Alternatively, the developing unit 7 may be integrated with the photosensitive member unit 6 to be replaceable. The developing unit 7 mainly includes the developing roller 71, a supply roller 72, a layer thickness regulating blade 73, a toner accommodating portion (a developer accommodating portion) 74 which accommodates toner (developer), and a first agitator 75A provided in the toner accommodating portion 74. Also, the developing unit 7 may be configured to be separable from the photosensitive member unit 6. In that case, the toner cartridge 9 can be attached to and detached from the developing unit 7 in a state in which the photosensitive member unit 6 and the developing unit 7 are coupled to each other.

Image Forming Process

Figure 5:
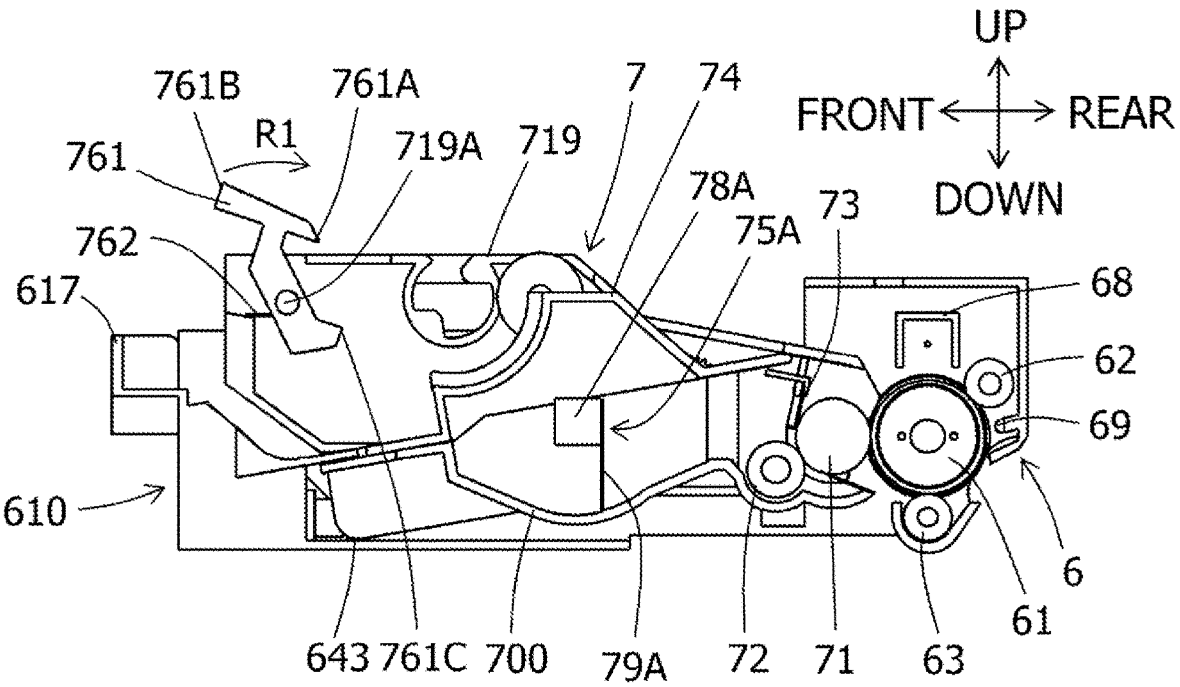
FIG. 5 is a cross-sectional view of a process cartridge of the first embodiment.

Next, an image forming process using the process cartridge 5 will be described. FIG. 5 is a cross-sectional view of the process cartridge 5. The photosensitive drum 61 is rotationally driven during the execution of the image forming process. First, the surface of the photosensitive drum 61 is uniformly charged by the corona charging device 68, and then exposed with the laser beam corresponding to the image data emitted from the exposure apparatus 4 (see FIG. 1), whereby an electrostatic latent image corresponding to the image data is formed on the photosensitive drum 61.

On the other hand, the toner in the toner accommodating portion 74 is agitated by the first agitator 75A and then supplied to the developing roller 71 via the supply roller 72. Then, the toner supplied to the developing roller 71 enters a position between the developing roller 71 and the layer thickness regulating blade 73 and is carried on the developing roller 71 as a thin layer having a constant thickness.

The toner carried on the developing roller 71 is supplied to the electrostatic latent image formed on the photosensitive drum 61. Thus, the toner adheres to the electrostatic latent image and is visualized, and a toner image is formed on the photosensitive drum 61. After that, the paper S is conveyed between the photosensitive drum 61 and the transfer roller 63, and the toner image on the photosensitive drum 61 is transferred onto the paper S.

As shown in FIG. 1, the fixing apparatus 8 is disposed behind the process cartridge 5 and mainly includes a heat roller 82 and a pressure roller 81. The paper S onto which the toner image is transferred passes through the fixing apparatus 8, and at that time, the paper S is heated and pressurized between the heat roller 82 and the pressure roller 81, and the toner image is fixed on the paper S. The paper S that has passed through the fixing apparatus 8 is discharged onto a paper ejection tray 22.

The corona charging device 68 is a charging unit that charges the surface of the photosensitive drum 61 in a non-contact manner. The exposure portion 69 includes a light emitting diode serving as a light source and a light guide serving as a light guide member and guides the light emitted from the light emitting diode with the light guide and irradiates the surface of the photosensitive drum 61 with the light. The current supplied to the light emitting diode is supplied from the apparatus main body 2. The charge on the surface of the photosensitive drum 61 is removed by irradiation with light from the exposure portion 69. Further, a predetermined voltage is applied to the recovery roller 62 from the apparatus main body 2, and foreign matter such as paper dust and contaminants and toner adhering to the surface of the photosensitive drum 61 are collected.

Configuration of Process Cartridge

Next, each unit of the process cartridge 5 will be described. As described above, the process cartridge 5 includes the photosensitive member unit 6 and the developing unit 7.

Configuration of Developing Unit

Figure 2:
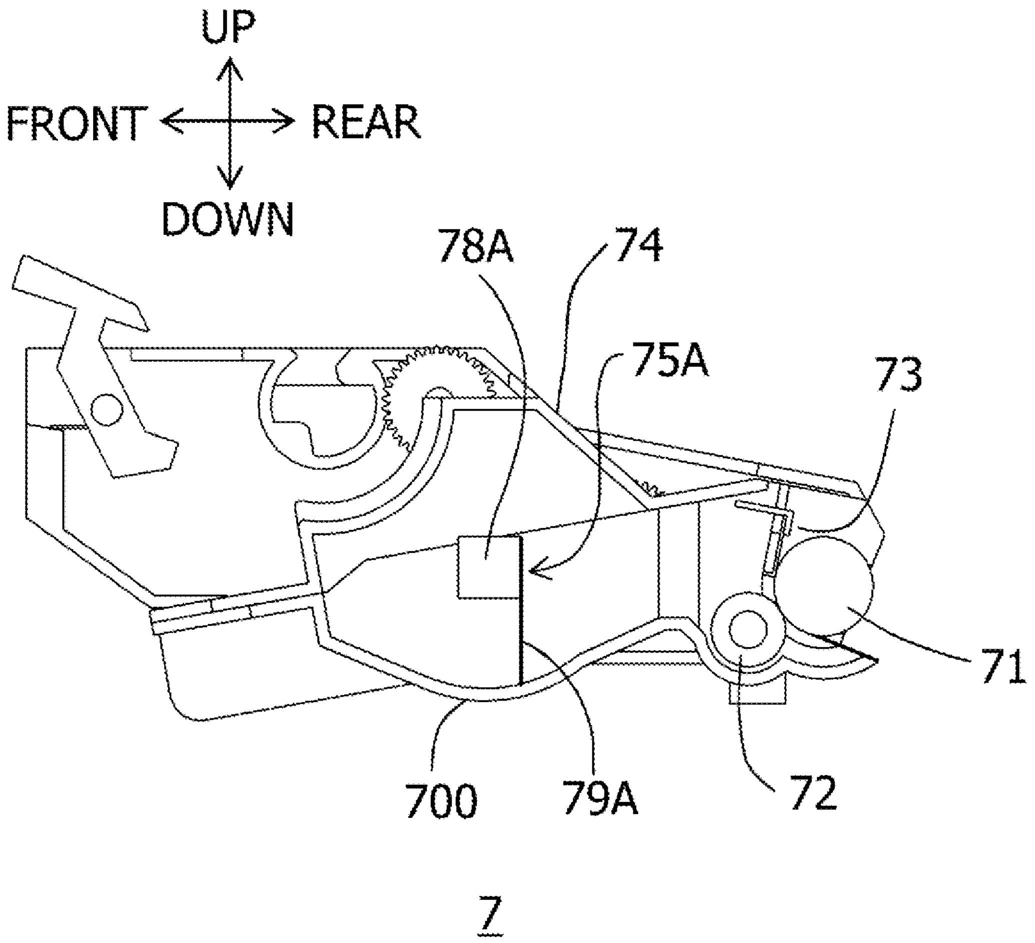
FIG. 2 is a cross-sectional view of a developing unit of the first embodiment.
Figure 3:
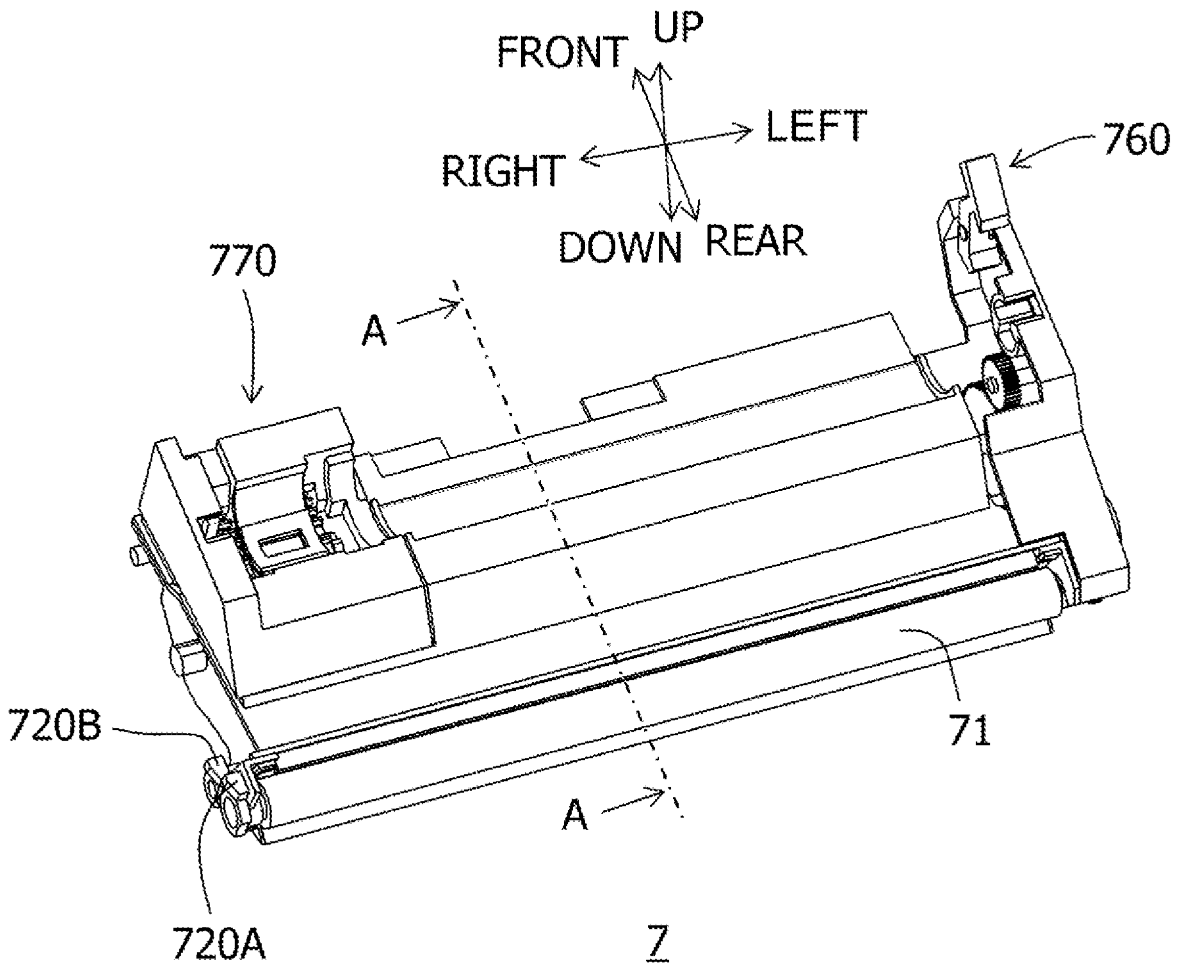
FIG. 3 is a perspective view of the developing unit of the first embodiment.
Figure 4:
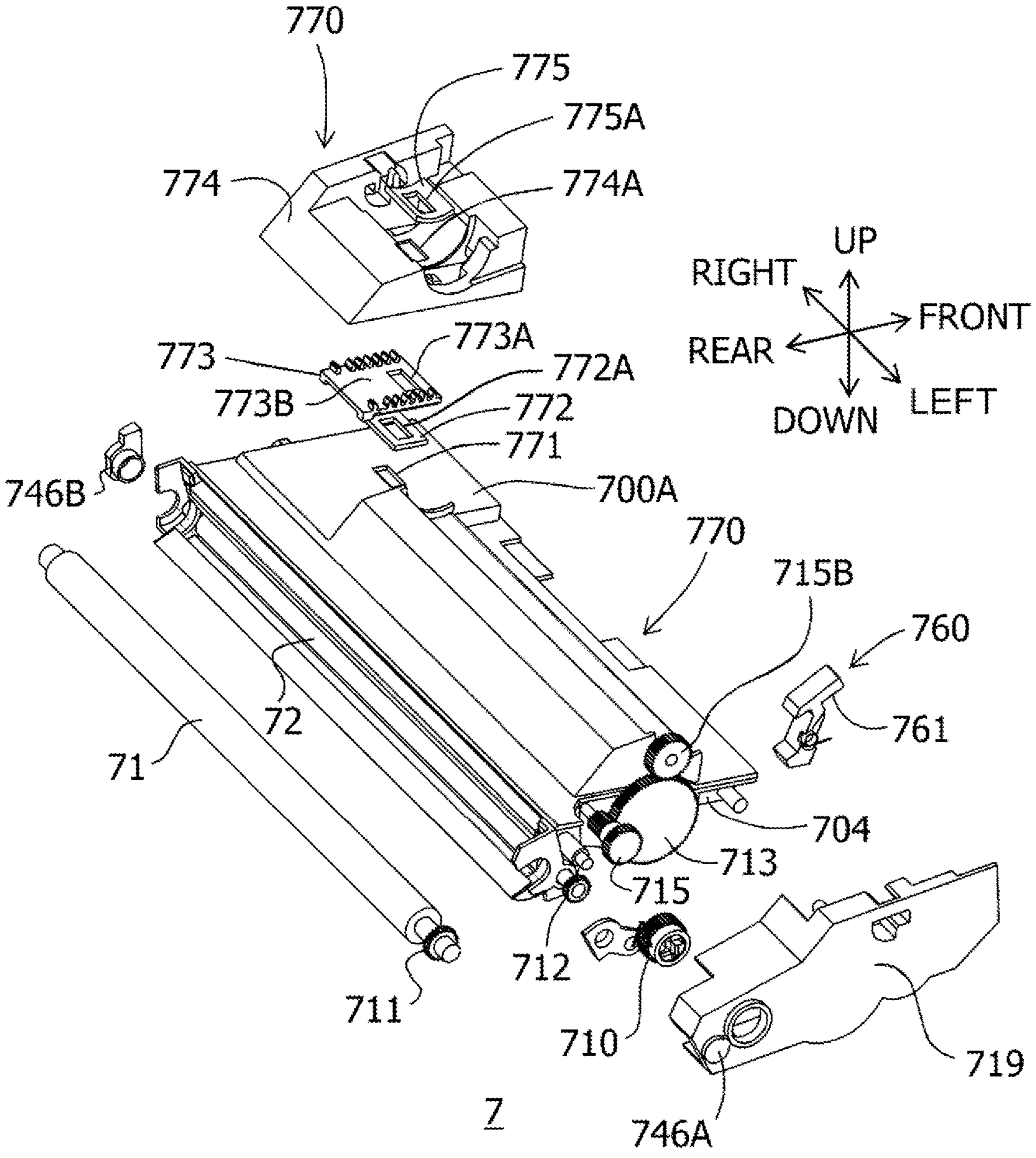
FIG. 4 is an exploded perspective view of the developing unit of the first embodiment.
Figure 6:
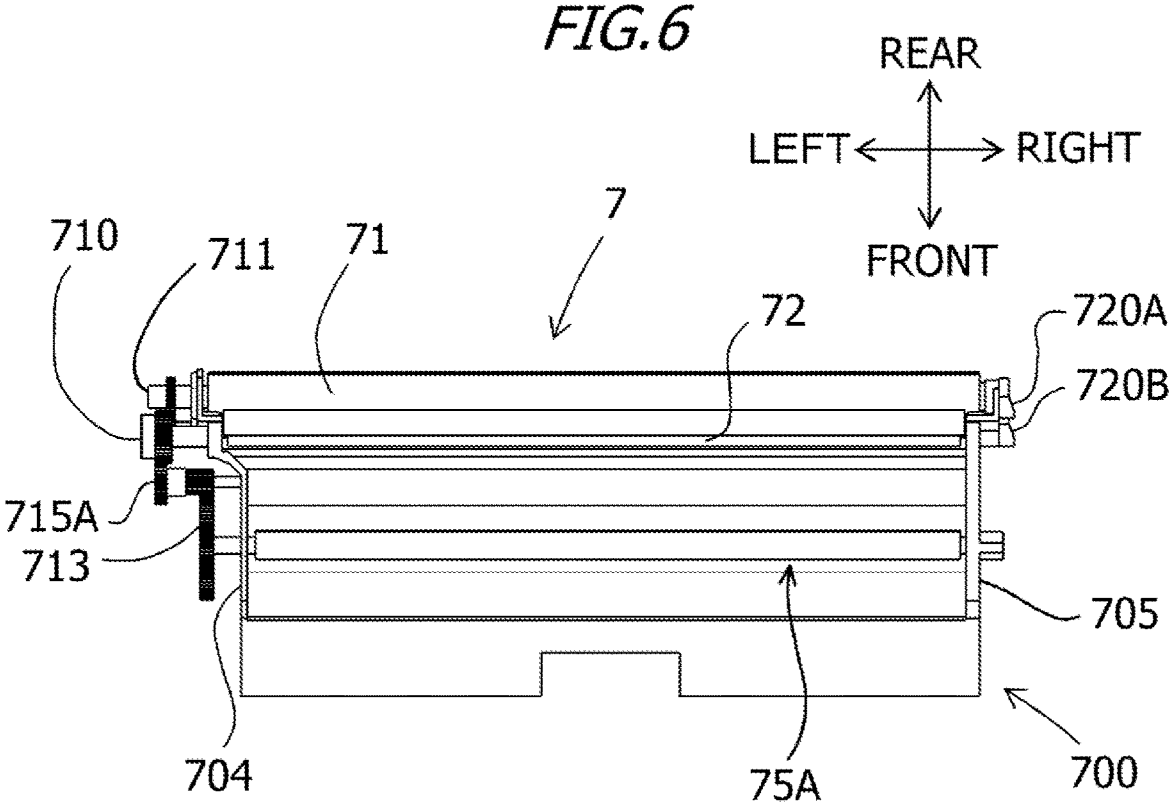
FIG. 6 is a top view of the developing unit of the first embodiment.
Figure 11:
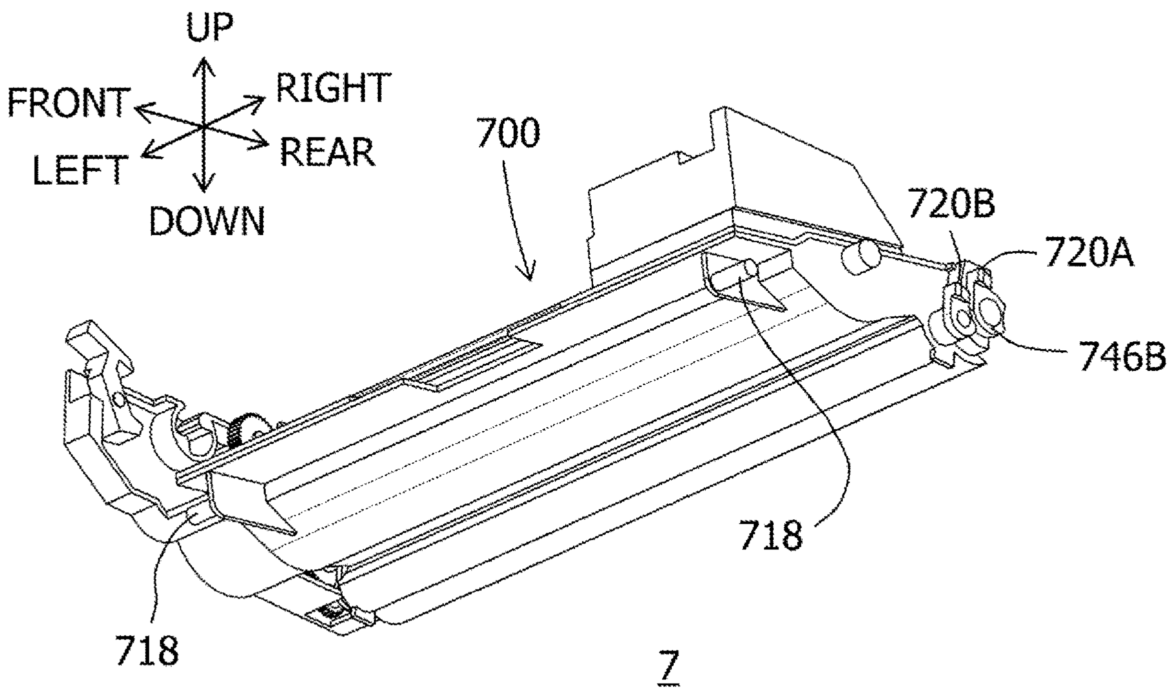
FIG. 11 is a perspective view of the developing unit of the first embodiment from below.

First, a configuration of the developing unit 7 will be described. FIG. 2 is a cross-sectional view of the developing unit 7 and is a cross-sectional view along line A-A in FIG. 3. FIG. 3 is a perspective view of the developing unit 7. Further, the cross-section A-A in FIG. 3 is parallel to the up and down direction and the front to rear direction. FIG. 4 is an exploded perspective view of the developing unit 7. FIG. 6 is a top view of the developing unit 7 and shows a state in which a top surface of a housing 700 is removed for convenience of explanation. FIG. 11 is a perspective view of the developing unit 7 from below. In the developing unit 7, as shown in FIG. 2, the developing roller 71 is rotatably supported on a rear side of the housing 700.

As shown in FIGS. 4 and 6, both ends of the developing roller 71, the supply roller 72, and the first agitator (first stirring member) 75A are rotatably supported by each of a left side wall 704 and a right side wall 705 of the housing 700. Also, a developing coupling 710, a developing roller gear 711, a supply roller gear 712, a first agitator gear 713, and idle gears 715A and 715B are provided on a left side of the left side wall 704 of the housing 700. The developing roller gear 711 is fixed to an end portion of the developing roller 71, and the supply roller gear 712 is fixed to the end of the supply roller 72. Further, the first agitator gear 713 is fixed to an end portion of an agitating rod 78A (see FIG. 5) of the first agitator 75A.

In addition, the developing unit 7 can be equipped with the toner cartridge 9 for supplying toner and is provided with a toner receiving portion 770 for receiving the toner supplied by the toner cartridge 9. Further, the developing unit 7 is also provided with a lift mechanism 760 for holding and lifting up the toner cartridge 9.

As shown in FIG. 3, the developing unit 7 is provided with an electrical contact 720A serving as a first electrical contact that is electrically connected to the developing roller 71 and is supplied with a voltage applied to the developing roller 71. Further, the developing unit 7 is provided with an electrical contact 720B serving as a second electrical contact that is electrically connected to the supply roller 72 and is supplied with the voltage applied to the supply roller 72. These electrical contacts come into contact with power supply contacts (not shown) provided on the apparatus main body 2, whereby power is supplied to the developing roller 71 and the supply roller 72.

Next, a drive configuration of the developing unit 7 will be described with reference to FIG. 4. A developing drive transmission member (not shown) provided in the apparatus main body 2 moves rightward in conjunction with an operation of closing the door 21 (FIG. 1) provided in the apparatus main body 2 toward a position for engaging with the developing coupling 710. On the other hand, the development drive transmission member moves leftward in conjunction with an operation of opening the door 21 (FIG. 1) of the apparatus main body 2 toward a position for releasing the engagement with the developing coupling 710.

When the apparatus main body 2 operates after the door 21 (FIG. 1) of the apparatus main body 2 is closed, a driving force is transmitted (input) from the developing drive transmission member to the developing coupling 710 serving as a driving force receiving member. Next, the developing roller 71 becomes rotatable from a gear provided on a circumferential surface of the developing coupling 710 via the developing roller gear 711, and the supply roller 72 becomes rotatable via the supply roller gear 712. The developing drive transmission member is configured to allow a position shift of the developing coupling 710 within a predetermined range and transmit a driving force to the developing coupling 710. A side holder 719 attached to the housing 700 restricts movement of the developing coupling 710, the developing roller gear 711, and the supply roller gear 712 in a rotational axis direction of the developing roller 71.

As shown in FIG. 5, the developing unit 7 has the first agitator 75A, and the first agitator 75A agitates the toner inside the toner accommodating portion 74. The first agitator 75A includes the agitating rod 78A and an agitating sheet 79A. Further, the first agitator 75A is configured to be rotatable by receiving a driving force from the developing coupling 710 via the idle gear 715A using the first agitator gear 713 (see FIG. 6). The toner in the vicinity of the first agitator 75A inside the toner accommodating portion 74 is agitated by the first agitator 75A, then supplied to the supply roller 72 side, and further supplied to the developing roller 71 by the supply roller 72.

Configuration of Photosensitive Member Unit and Support of Developing Unit

Figure 7:
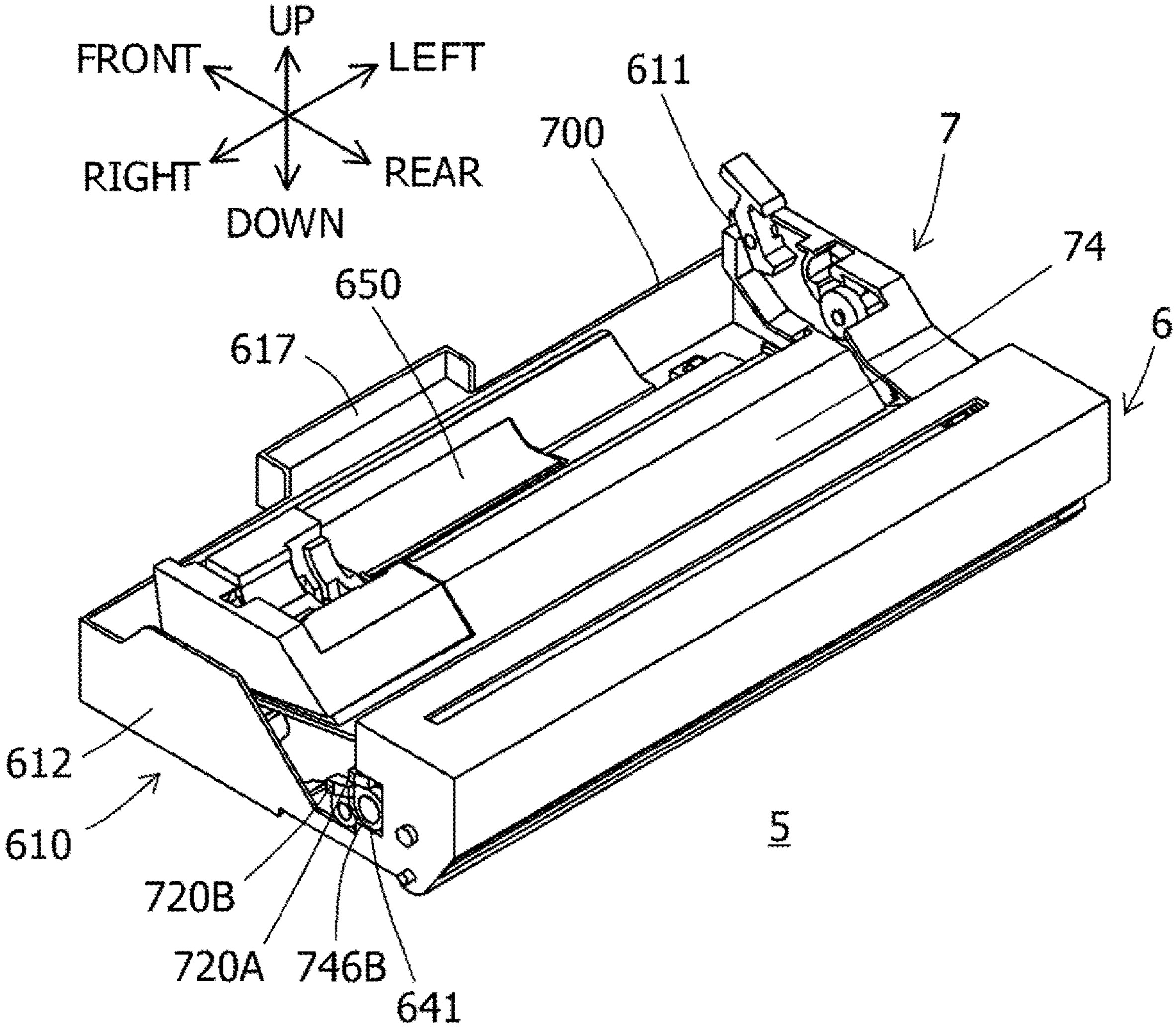
FIG. 7 is a perspective view of the process cartridge of the first embodiment.
Figure 8:
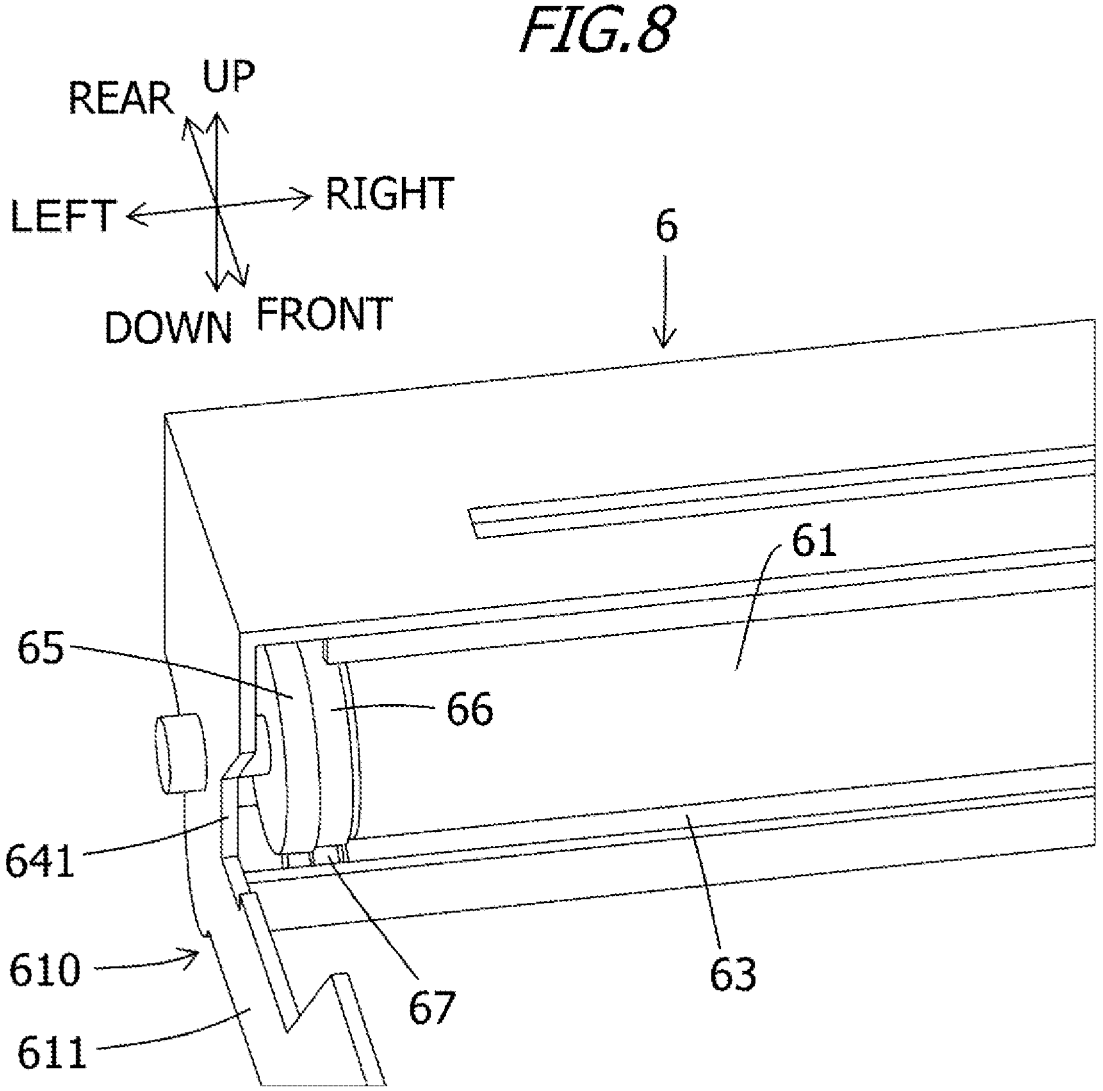
FIG. 8 is a partial perspective view of a photosensitive member unit of the first embodiment.
Figure 9:
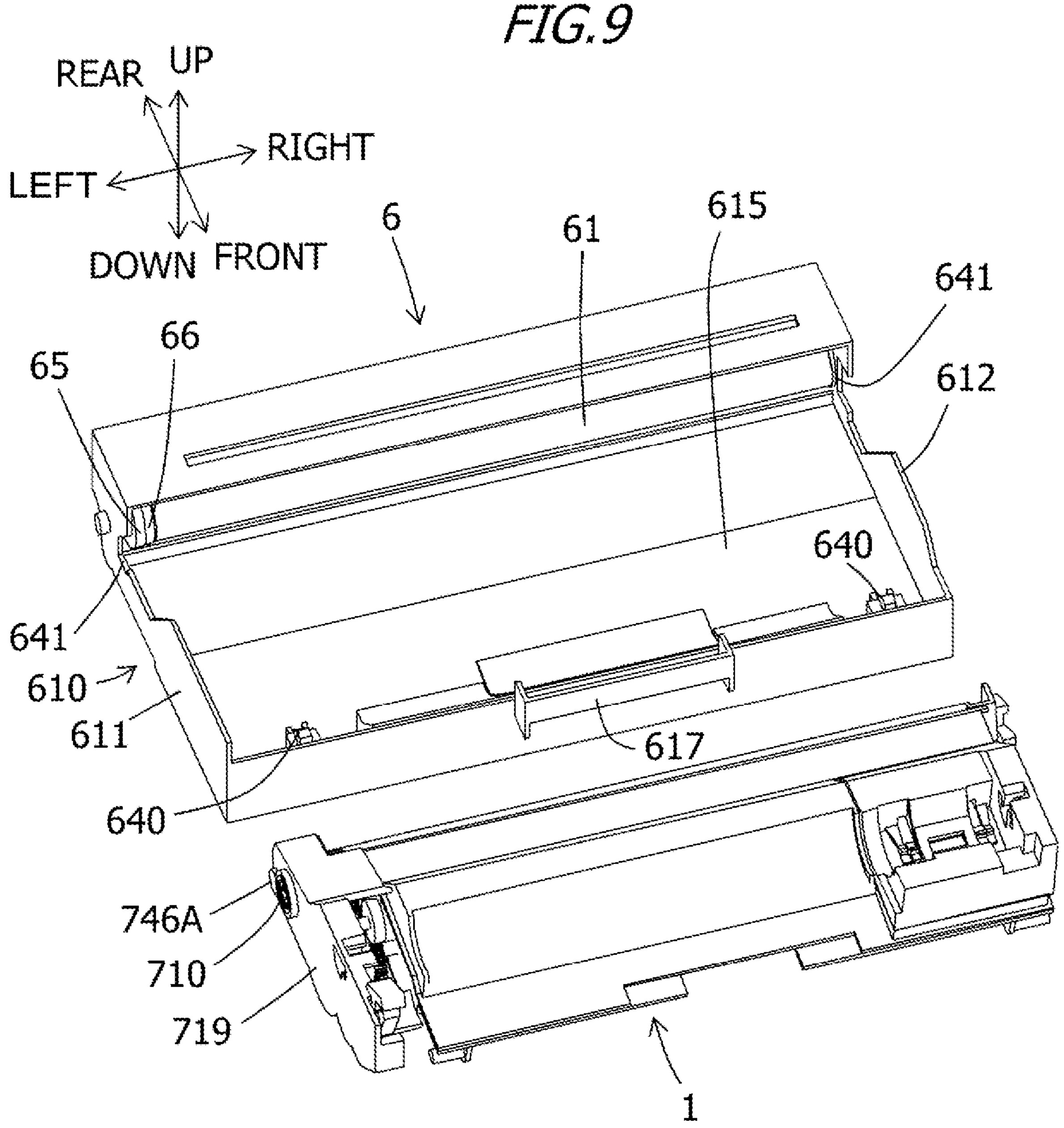
FIG. 9 is a perspective view of the developing unit and the photosensitive member unit of the first embodiment.
Figure 10:
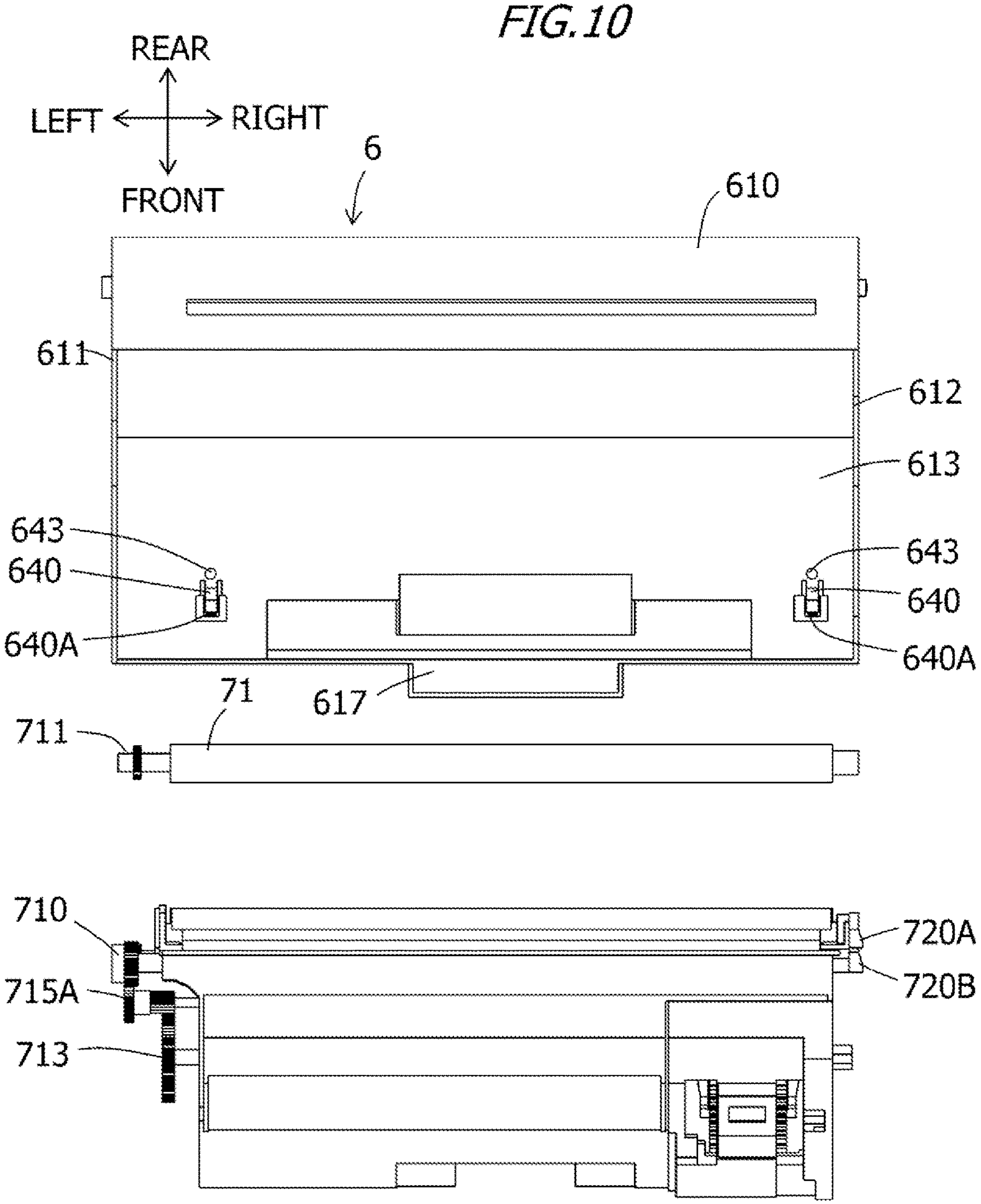
FIG. 10 is a top view showing an arrangement relationship between the photosensitive member unit and the developing unit of the first embodiment.

Next, a detailed configuration of the photosensitive member unit 6 will be described. FIG. 7 is a perspective view of the process cartridge 5. FIG. 8 is a partial perspective view of the photosensitive member unit 6. FIG. 9 is a perspective view of the developing unit 7 and the photosensitive member unit 6. FIG. 10 is a top view showing an arrangement relationship of the photosensitive member unit 6, the developing unit 7, and the developing roller 71 in the left to right direction.

As shown in FIG. 9, the photosensitive member unit 6 mainly includes a frame 610 having a pair of left and right side walls 611 and 612, and the photosensitive drum 61 rotatably supported on a rear side of the frame 610. The photosensitive drum 61 is configured by applying a photosensitive layer to an outer surface of an aluminum drum tube. In front of the frame 610, an attaching portion 615 to which the developing unit 7 can be attached, a gripping portion 617 for the user to grip the photosensitive member unit 6, and pressing members 640 for pressing the developing unit 7 are provided. In addition, as shown in FIG. 7, the toner accommodating portion 74 of the developing unit 7 attached to the attaching portion 615 is disposed between the left side wall 611 and the right side wall 612 in the left to right direction.

As shown in FIGS. 7 and 9, on the left side wall 611 and the right side wall 612 of the frame 610, a receiving portion 641 for receiving rotating bearing members 746A and 746B of the developing roller 71 is formed in front of the photosensitive drum 61. The receiving portion 641 is a substantially U-shaped depressed portion whose front side is open, and a rotation shaft of the developing roller 71 is inserted into the receiving portion 641. The developing unit 7 is supported on the photosensitive member unit 6 by the receiving portion 641.

Further, as shown in FIG. 10, protruding portions 643 that protrude upward are provided at both end portions of a bottom surface 613 of the frame 610 in the left to right direction. The protruding portions 643 movably support the developing unit 7 by coming into contact with a boss 718 provided at a bottom portion of the housing 700 of the developing unit 7, which is shown in FIG. 11. In addition, in the configuration of the present embodiment, as shown in FIG. 7, a pressing member 650 for restricting detachment of the developing unit 7 is provided in a state in which the developing unit 7 is attached to the photosensitive member unit 6.

As shown in FIG. 9, the pressing members 640 are provided in front of the frame 610 and at both end portions of the frame 610 in the left to right direction and biased in a direction from the front toward the rear due to a compression spring 640A (FIG. 10) serving as a biasing member. For this reason, the pressing members 640 press the boss 718 (FIG. 11) provided in the housing 700 of the developing unit 7 due to a biasing force of the compression spring 640A (FIG. 10). By pressing the developing unit 7 with the pressing members 640, the developing roller 71 is biased toward the photosensitive drum 61.

Further, as shown in FIG. 8, a photosensitive member gear (first gear) 65 and a transfer gear (second gear) 66 are fixed to a left end portion of the photosensitive drum 61 and configured to rotate integrally with the photosensitive drum 61. When the process cartridge 5 is attached to the apparatus main body 2, a driving gear (not shown) of the apparatus main body 2 and the photosensitive member gear 65 engage with each other, and thus a driving force is transmitted to the photosensitive drum 61 and the transfer gear 66 to make them rotatable. The transfer gear 66 further engages with a transfer roller gear (third gear) 67 fixed to a left end portion of the transfer roller 63, and the transfer roller 63 is also in a rotatable state.

Configuration of Toner Cartridge

Figure 12:
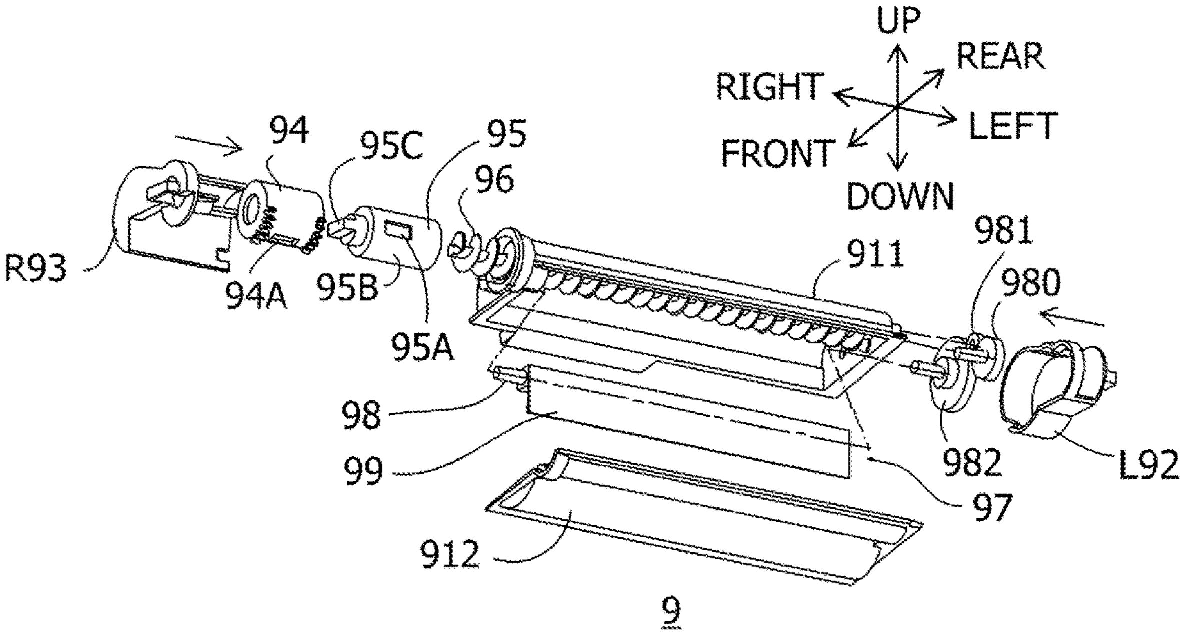
FIG. 12 is an exploded perspective view of a toner cartridge of the first embodiment.
Figure 13:
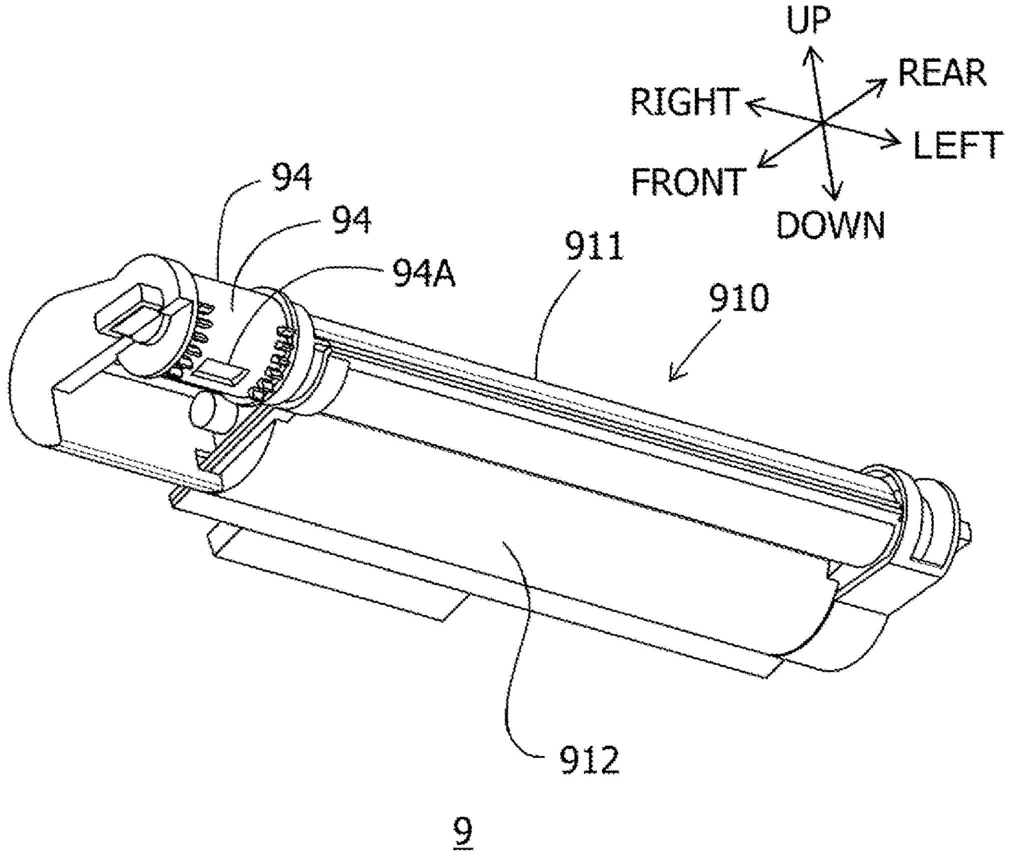
FIG. 13 is a perspective view of the toner cartridge of the first embodiment from below.

Next, a configuration of the toner cartridge 9 will be described. FIG. 12 is an exploded perspective view of the toner cartridge 9, and FIG. 13 is a perspective view of the toner cartridge 9 from below. Further, FIG. 14 is a cross-sectional view of the toner cartridge 9.

As shown in FIG. 12, the toner cartridge 9 mainly includes a container member 911, a bottom member 912, a T side holder L92, a T side holder R93, a discharge opening forming member 94, a discharge side shutter 95, a conveying screw 96, and a second agitator 97. Further, in order to transmit the drive, a conveying screw gear 980, a T idle gear 981, and a second agitator gear 982 are provided. The T side holder L92 and the T side holder R93 can also be a part of the toner container 910. In addition, the T side holder L92, the T side holder R93, and the toner container 910 can be collectively referred to as a frame of the toner cartridge 9. The T side holder L92, the T side holder R93, and the toner container 910 may be integrally formed.

As shown in FIG. 13, the toner container 910 is formed by the container member 911 and the bottom member 912, and the toner is accommodated inside the toner container 910. The discharge opening forming member 94 is provided at one end portion of the toner container 910 in a longitudinal direction thereof. The discharge opening forming member 94 has a discharge opening forming surface 94C on an outer circumferential portion thereof, and a discharge opening 94A for discharging toner to the outside is formed on the discharge opening forming surface 94C.

Figure 14:
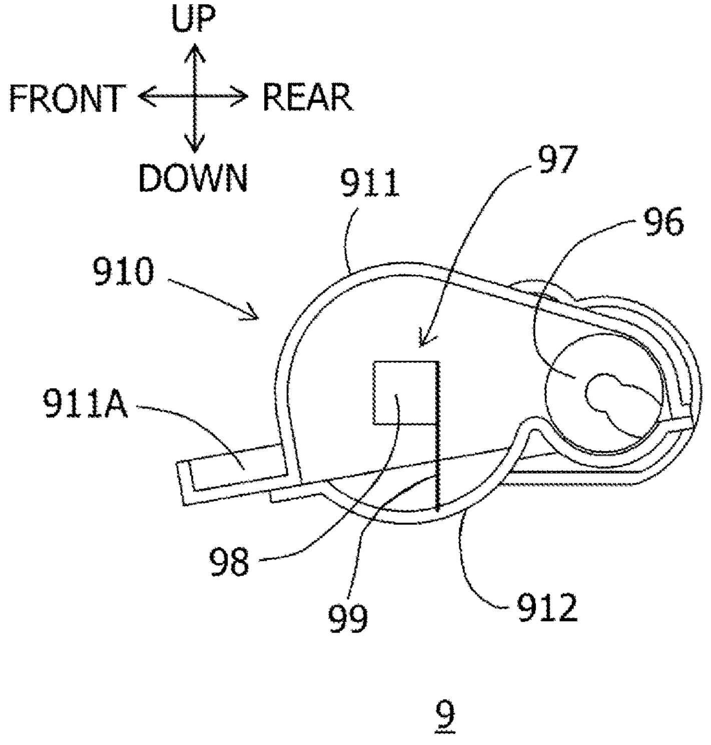
FIG. 14 is a cross-sectional view of the toner cartridge of the first embodiment.

As shown in FIG. 14, the conveying screw 96 and the second agitator 97 are rotatably provided inside the toner container 910. A driving force is transmitted to the conveying screw 96 and the second agitator 97 by the conveying screw gear 980 and the second agitator gear 982 provided outside the toner container 910 to make them rotate (see FIG. 12). The second agitator 97 is configured of a second agitating rod 98 and a second agitating sheet 99, similarly to the first agitator 75A. The toner contained inside the toner container 910 is agitated and conveyed toward the conveying screw 96 by the second agitator 97. Next, the toner is conveyed to the right toward the discharge opening 94A shown in FIG. 13 by the conveying screw 96 and is discharged from the discharge opening 94A.

As shown in FIG. 12, the discharge side shutter 95 is rotatably provided inside the discharge opening forming member 94. The discharge side shutter 95 is provided with a toner passing hole 95A and a closing portion 95B. In a case in which the discharge side shutter 95 rotates and a position of the toner passing hole 95A and a position of the discharge opening 94A coincide with each other, the toner can be discharged from the discharge opening 94A. On the other hand, in a case in which the closing portion 95B faces the discharge opening 94A, the discharge of toner from the discharge opening 94A is restricted to prevent the toner inside the toner container 910 from leaking at the time of conveying or the like.

Support of Toner Cartridge

Figure 15A:
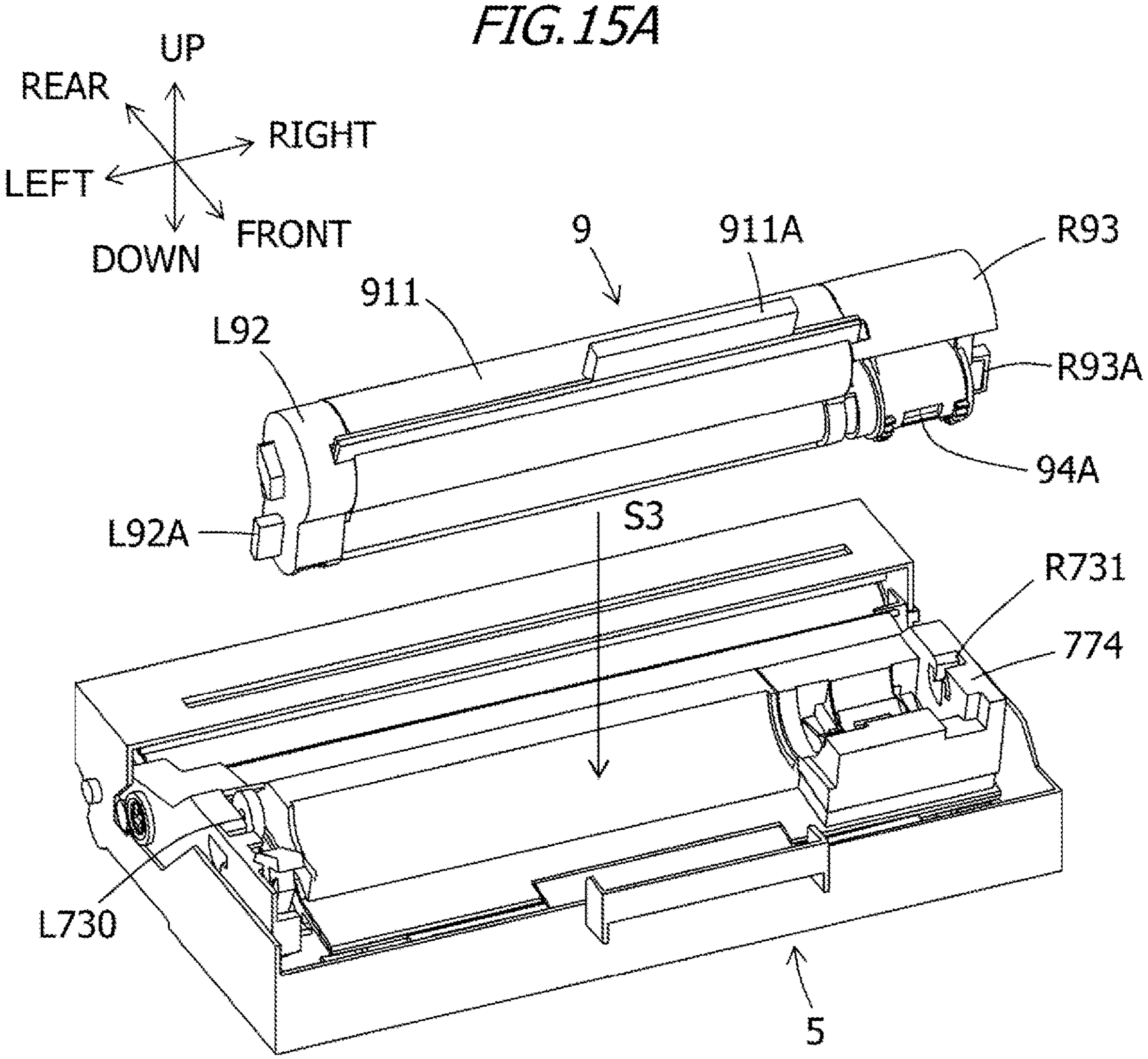
FIG. 15A is a perspective view of the toner cartridge and the process cartridge of the first embodiment.
Figure 15B:
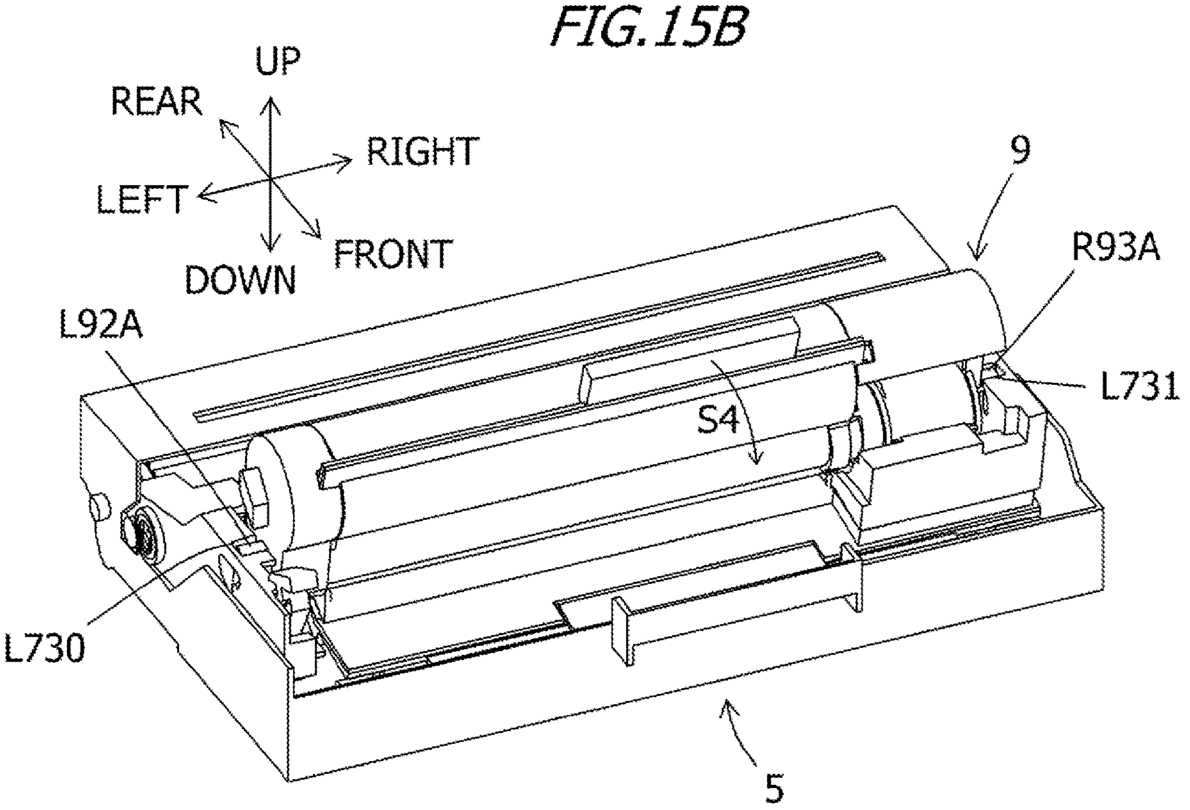
FIG. 15B is a perspective view of the toner cartridge and the process cartridge of the first embodiment.
Figure 15C:
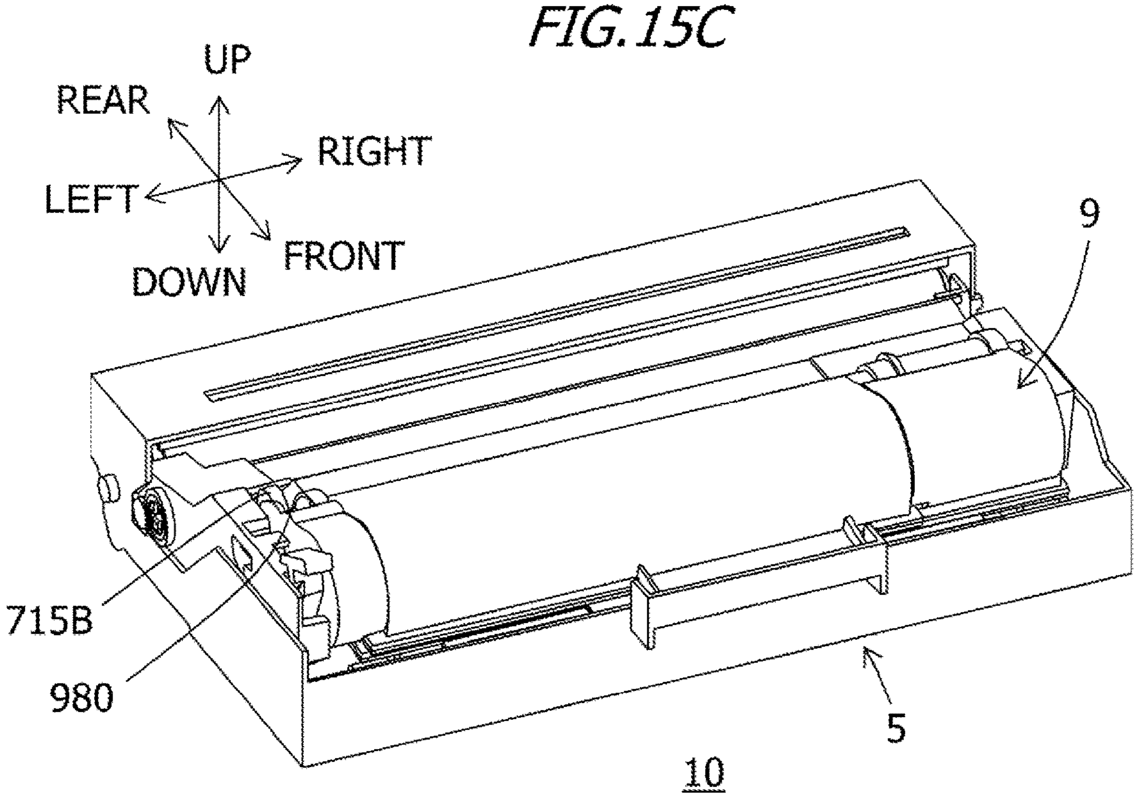
FIG. 15C is a perspective view of the toner cartridge and the process cartridge of the first embodiment.

Next, a support configuration of the toner cartridge 9 will be described. FIGS. 15A to 15C are perspective views of the toner cartridge 9 and the process cartridge 5. FIG. 15A shows a state before the toner cartridge 9 is attached to the process cartridge 5. FIG. 15B shows a state in which the toner cartridge 9 is being attached to the process cartridge 5. FIG. 15C shows a state in which the toner cartridge 9 has been attached to the process cartridge 5.

As shown in FIGS. 15A to 15C, the toner cartridge 9 is attachable to and detachable from the developing unit 7. The container member 911 of the toner cartridge 9 is provided with a handle portion 911A as a gripping portion for the second unit. The T side holder L92 and the T side holder R93 are fixed to both end portions of the toner cartridge 9 in a longitudinal direction thereof. The T side holder L92 and the T side holder R93 each include a supported protrusion L92A and a supported protrusion R93A (supported portion) for being supported by the developing unit 7. Further, the developing unit 7 is provided with a supporting portion L730 and a supporting portion R731 for supporting the supported protrusion L92A and the supported protrusion R93A.

As shown in FIG. 15A, when the toner cartridge 9 is attached to the developing unit 7, the toner cartridge 9 is moved in a direction of arrow S3 while the handle portion 911A is gripped from above with respect to the developing unit 7. As shown in FIG. 15B, the toner cartridge 9 moved in the direction of the arrow S3 is in a state in which the supported protrusion L92A and the supported protrusion R93A are supported by the supporting portion L730 and the supporting portion R731. From this state, the toner cartridge 9 is rotated in a direction of arrow R3 with the supported protrusion L92A and the supported protrusion R93A serving as rotation centers. As a result, as shown in FIG. 15C, attaching of the toner cartridge 9 on the process cartridge 5 is completed, and the cartridge unit 10 is formed. A rotational axis direction of the toner cartridge 9 is parallel to the longitudinal direction of the toner cartridge 9.

Further, in a state in which the toner cartridge 9 has been attached to the process cartridge 5, the conveying screw gear 980 of the toner cartridge 9 can engage with the idle gear 715B of the developing unit 7. As a result, the driving force of the developing unit 7 is transmitted to the toner cartridge 9.

A life span of the toner cartridge 9 determined by an amount of toner stored in the toner cartridge 9 is set shorter than a life span of the process cartridge 5 determined by a life span of the photosensitive drum 61 and a life span of the developing roller 71. Therefore, it is necessary to replace only the toner cartridge 9 that has reached the end of its life span separately from the process cartridge 5. In this case, the toner cartridge 9 can be replaced by simply opening the door 21 (FIG. 1) of the apparatus main body 2, and the user can perform the replacement work without detaching the process cartridge 5 from the apparatus main body 2.

Opening and Closing Operations of Receiving Side Shutter

Figure 16A:
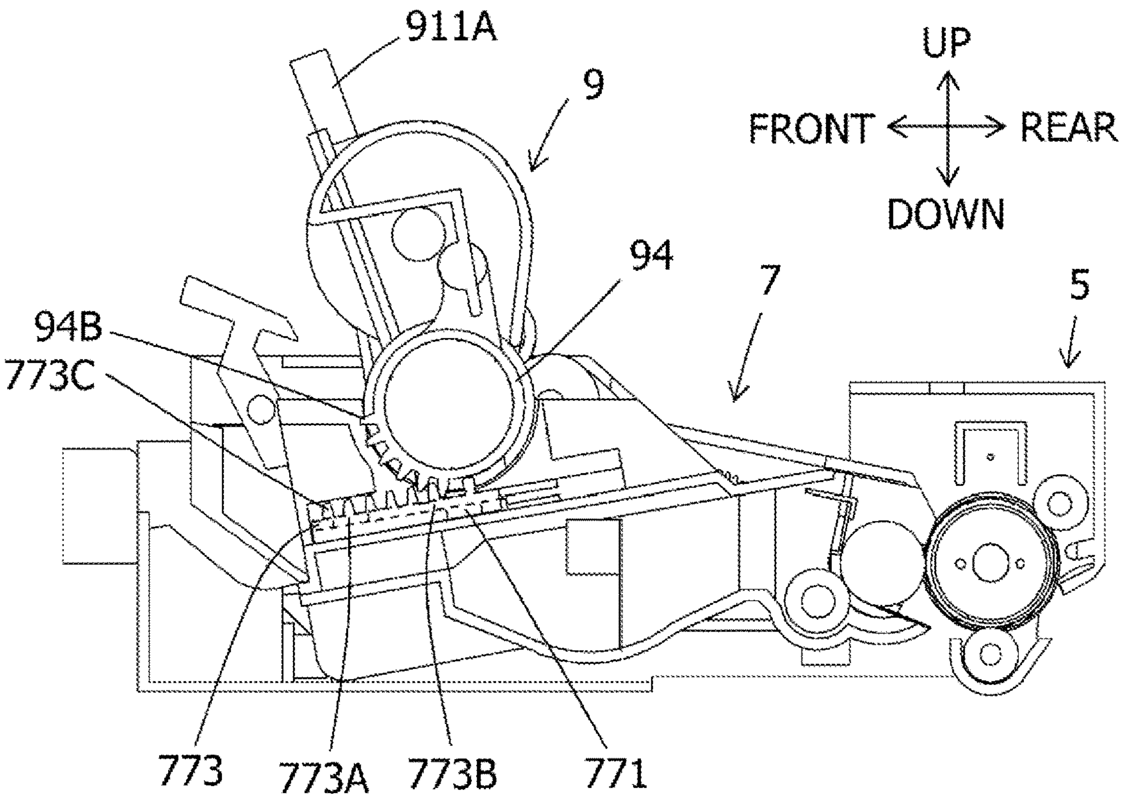
FIGS. 16A and 16B are diagrams showing opening and closing operations of a receiving side shutter of the developing unit of the first embodiment.
Figure 16B:
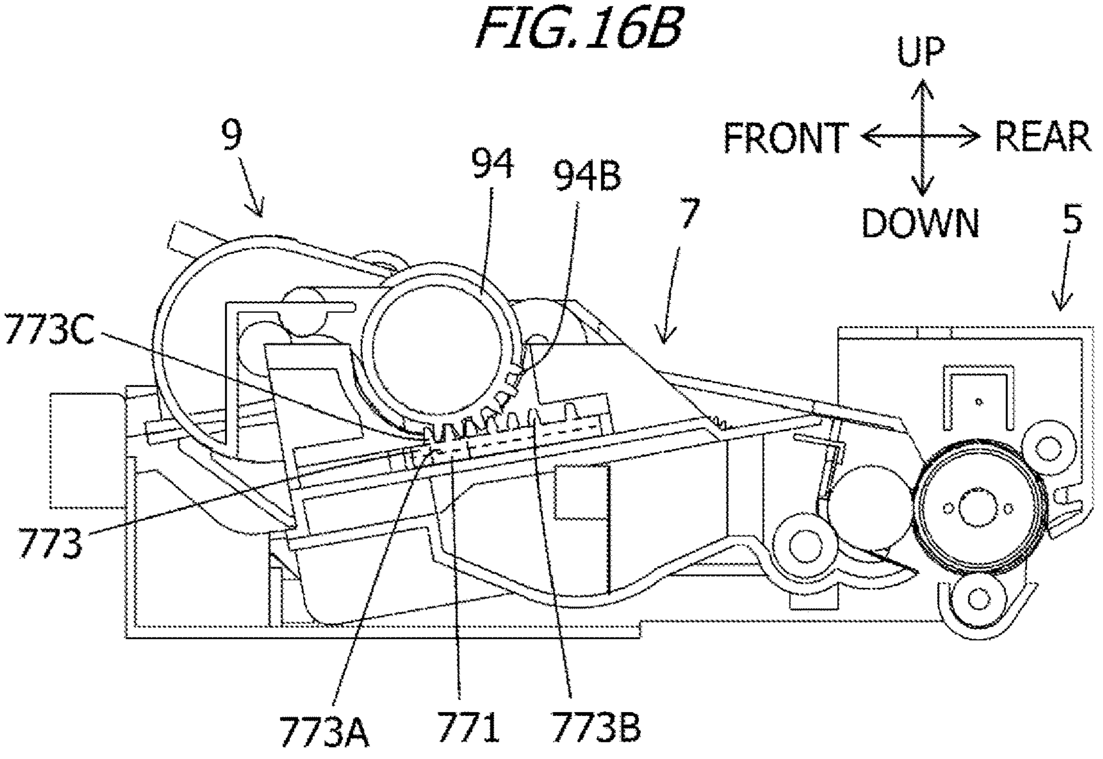

Next, opening and closing operations of a receiving side shutter will be described. FIGS. 16A and 16B are diagrams showing the opening and closing operations of the receiving side shutter of the developing unit 7, FIG. 16A shows a state in which the receiving side shutter is closed, and FIG. 16B shows a state in which the receiving side shutter is open.

As shown in FIG. 4, the toner receiving portion 770 of the developing unit 7 is configured of a toner receiving port 771, a receiving side shutter seal 772, a receiving side shutter 773, a receiving port cover 774, and a connecting seal 775 which are provided on an upper surface 700A of the housing 700. Hole portions 772A, 773A, 774A, and 775A are provided in the receiving side shutter seal 772, the receiving side shutter 773, the receiving port cover 774, and the connecting seal 775, respectively. In a state in which each position of the hole portion 772A of the receiving side shutter seal 772, the hole portion 774A of the receiving port cover 774, and the hole portion 775A of the connecting seal 775 coincides with a position of the toner receiving port 771, they are assembled with each other. Further, the receiving side shutter 773 is provided with a shielding portion 773B in addition to the hole portion 773A and is assembled in a state in which it can be slid. The toner receiving port 771 is opened and closed by sliding the shielding portion 773B.

Here, opening and closing operations of the receiving side shutter 773 will be described with reference to FIGS. 16A and 16B. The opening and closing operations of the receiving side shutter 773 is performed in conjunction with the attaching operation and the detaching operation of the toner cartridge 9. As shown in FIGS. 16A and 16B, a drive protrusion group 94B is disposed on an outer circumferential surface of the discharge opening forming member 94 of the toner cartridge 9. Further, a driven protrusion group 773C is disposed in the receiving side shutter 773.

As described above, in the process of attaching the toner cartridge 9, a rotational operation of the toner cartridge 9 is performed to shift to a fully attached state. FIG. 16A shows a state before the rotational operation of the toner cartridge 9 is performed in the process of attaching the toner cartridge 9. In the state shown in FIG. 16A, the shielding portion 773B of the receiving side shutter 773 faces the toner receiving port 771 and the toner receiving port 771 is closed. In this case, the drive protrusion group 94B and the driven protrusion group 773C are in an engaged state.

FIG. 16B shows the fully attached state after the toner cartridge 9 is rotated. In this case, since the rotational operation of the toner cartridge 9 is performed while the drive protrusion group 94B and the driven protrusion group 773C maintain their engagement, the receiving side shutter 773 slides in conjunction with the rotational operation of the toner cartridge 9. Thus, the position of the hole portion 773A of the receiving side shutter 773 and the position of the toner receiving port 771 coincide with each other to open the toner receiving port 771. Similarly, when the toner cartridge 9 is detached from the developing unit 7, the receiving side shutter 773 slides in conjunction with the rotational operation of the toner cartridge 9, and the toner receiving port 771 is closed.

As described above, in the state in which the toner cartridge 9 is attached to the developing unit 7, the toner receiving port 771 is in an open state, and the toner can be received inside the developing unit 7. On the other hand, in the state in which the toner cartridge 9 is not attached to the developing unit 7, the toner receiving port 771 is closed to prevent foreign matter from entering the developing unit 7 and the toner from leaking to the outside of the developing unit 7.

Opening and Closing Operations of Shutter on Discharge Side

Figure 17A:
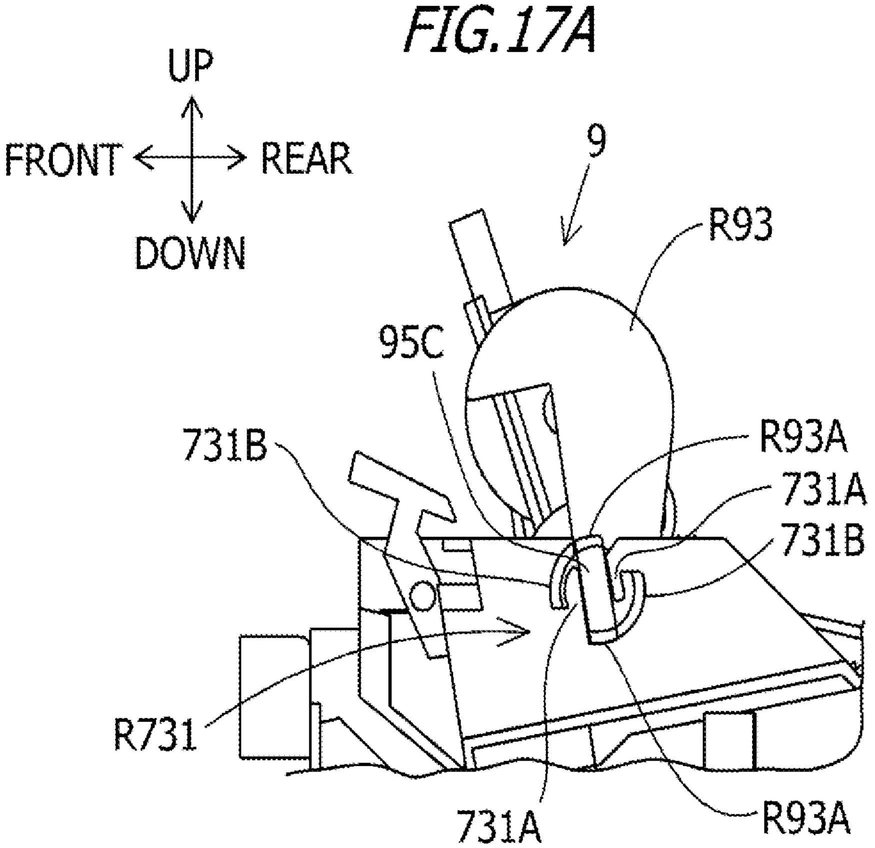
FIGS. 17A and 17B are diagrams showing opening and closing operations of a discharge side shutter of the toner cartridge of the first embodiment.
Figure 17B:
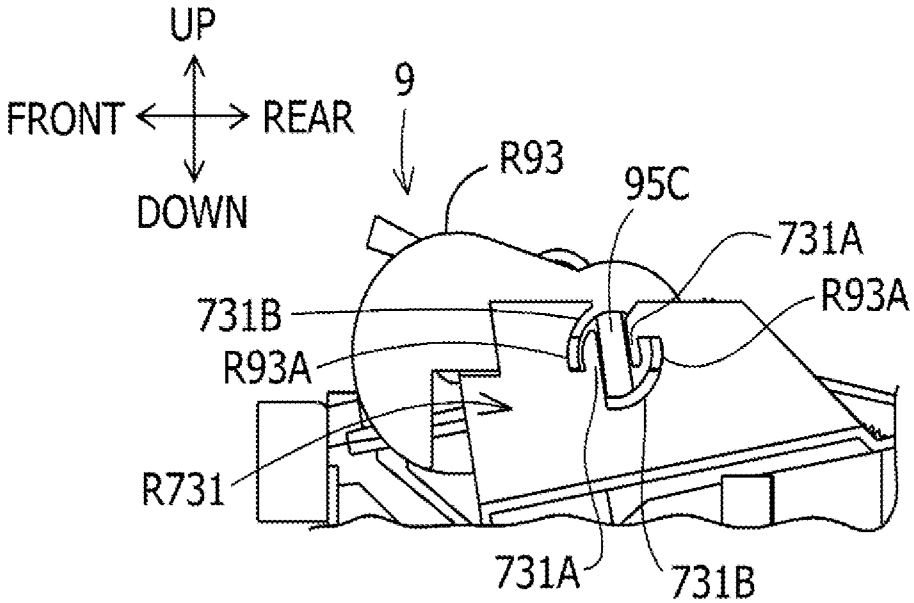

Next, opening and closing operations of the discharge side shutter 95 will be described. FIGS. 17A and 17B are diagrams showing the opening and closing operations of the discharge side shutter 95 of the toner cartridge 9, FIG. 17A shows a state in which the discharge side shutter 95 is closed, and FIG. 17B shows a state in which the discharge side shutter 95 is open.

As described above, in the case in which the position of the discharge opening 94A of the discharge opening forming member 94 shown in FIG. 12 and the position of the toner passing hole 95A of the discharge side shutter 95 coincide with each other, the discharge opening 94A is in an open state. Further, in the case in which the closing portion 95B of the discharge side shutter 95 faces the discharge opening 94A, the discharge opening 94A is in a closed state. The opening and closing operations of the discharge side shutter 95 are also performed in conjunction with the rotational operation at the time of attaching and detaching the toner cartridge 9, similar to the opening and closing operations of the receiving side shutter 773 described above.

As shown in FIGS. 17A and 17B, the discharge side shutter 95 is provided with a locked protrusion 95C, and the locked protrusion 95C is disposed inside the supported protrusions R93A in a radial direction thereof. Further, the supporting portion R731 of the developing unit 7 is provided with locking portions 731A and notch portions 731B.

FIG. 17A shows a state before the rotational operation of the toner cartridge 9 is performed in the process of attaching the toner cartridge 9. In the state shown in FIG. 17A, since the closing portion 95B (FIG. 12) of the discharge side shutter 95 and the discharge opening 94A (FIG. 12) face each other, the discharge opening 94A (FIG. 12) is in a closed state. In this case, the locked protrusion 95C is sandwiched between the locking portions 731A, and a rotational operation of the discharge side shutter 95 with respect to the developing unit 7 is prohibited.

FIG. 17B shows the fully attached state after the toner cartridge 9 is rotated. In this case, the toner cartridge 9 is rotated with respect to the developing unit 7 in a state in which the rotational operation of the discharge side shutter 95 is prohibited. Here, since the supported protrusions R93A can enter the notch portions 731B, rotation of the discharge side shutter 95 is prohibited, but rotation of the toner cartridge 9 is not hindered.

As described above, the rotational operation of the toner cartridge 9 in the process of attaching the toner cartridge 9 causes the discharge side shutter 95 to rotate relatively inside the toner cartridge 9. As a result, the position of the toner passing hole 95A (FIG. 12) of the discharge side shutter 95 and the position of the discharge opening 94A (FIG. 12) coincide with each other to open the discharge opening 94A (FIG. 12). Similarly, when the toner cartridge 9 is detached from the developing unit 7, the discharge side shutter 95 rotates in conjunction with the rotational operation of the toner cartridge 9 to close the discharge opening 94A (FIG. 12).

Lift Mechanism of Toner Cartridge

Next, the lift mechanism 760 of the toner cartridge 9 will be described.

Figure 18A:
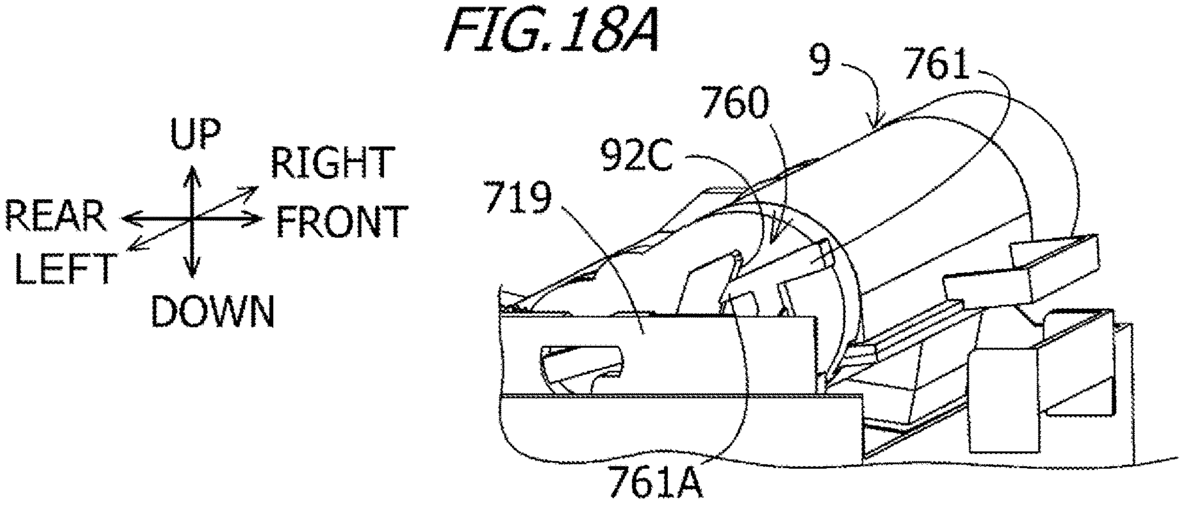
FIGS. 18A to 18C are diagrams showing an operation of a lift mechanism of the first embodiment.
Figure 18B:
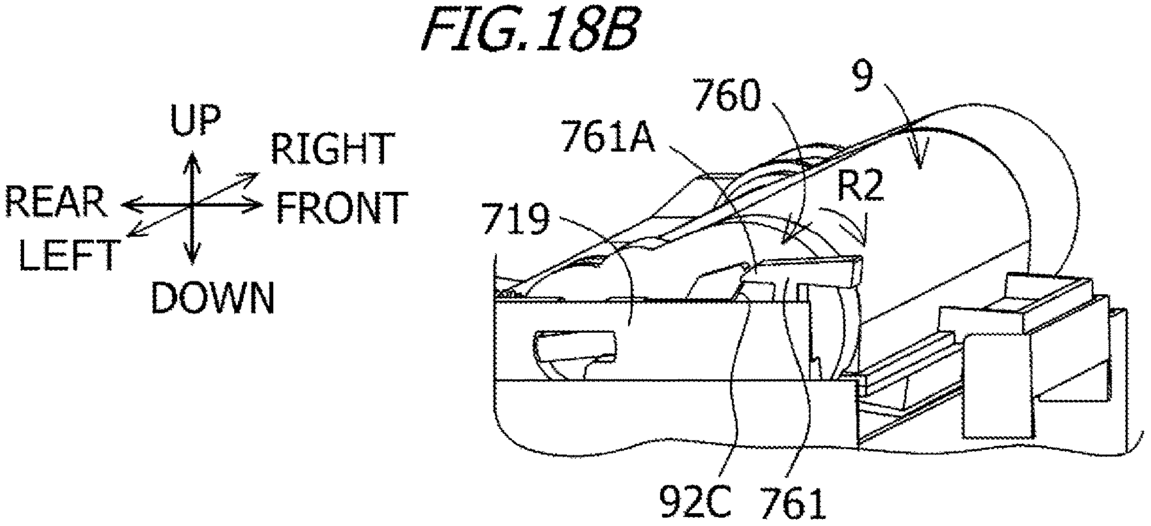
Figure 18C:
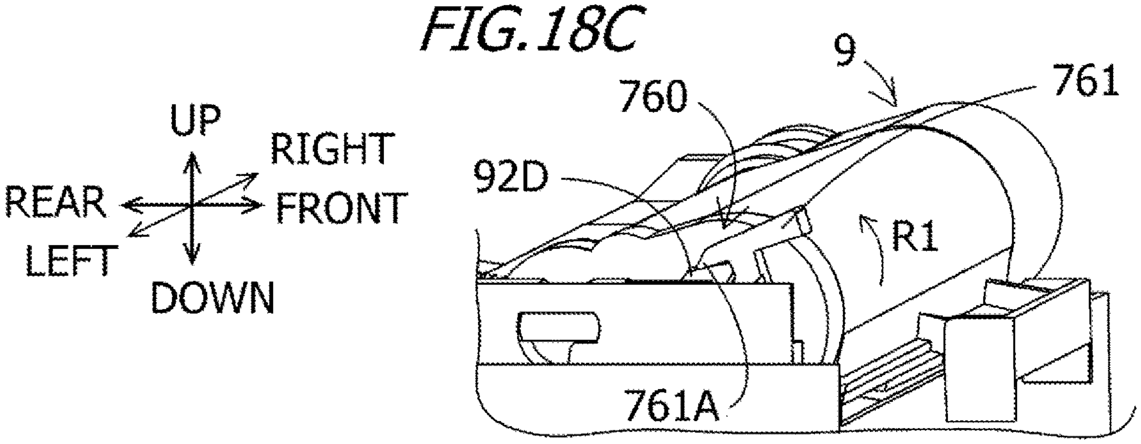

FIGS. 18A to 18C show movement of the lift mechanism 760 in the process of attaching the toner cartridge 9 to the developing unit 7. FIG. 18A shows a state in which the developing unit 7 is attached to the lift mechanism 760 during the attaching process of the toner cartridge 9. FIG. 18B shows a state in which the lift mechanism 760 is open during the attaching process of the toner cartridge 9. FIG. 18C shows a state in which the toner cartridge 9 has been attached.

Figure 19A:
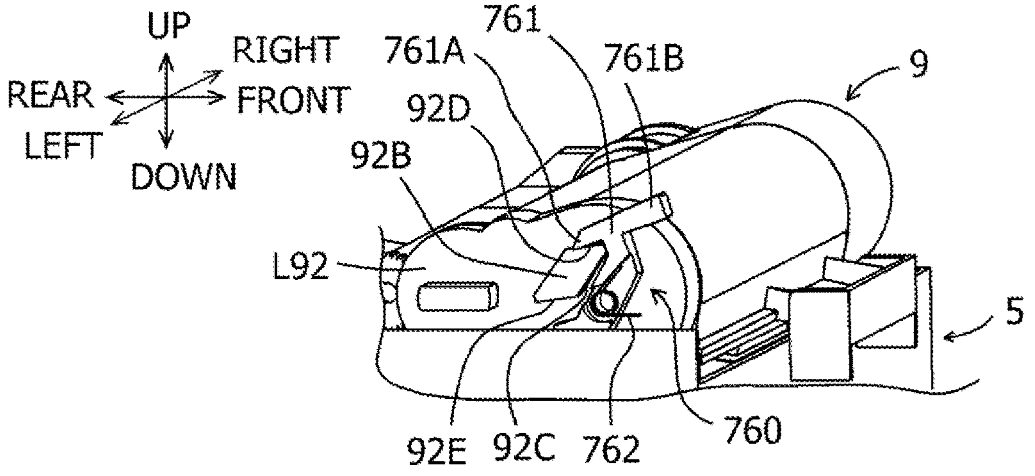
FIGS. 19A to 19C are diagrams showing an operation of the lift mechanism of the first embodiment.
Figure 19B:
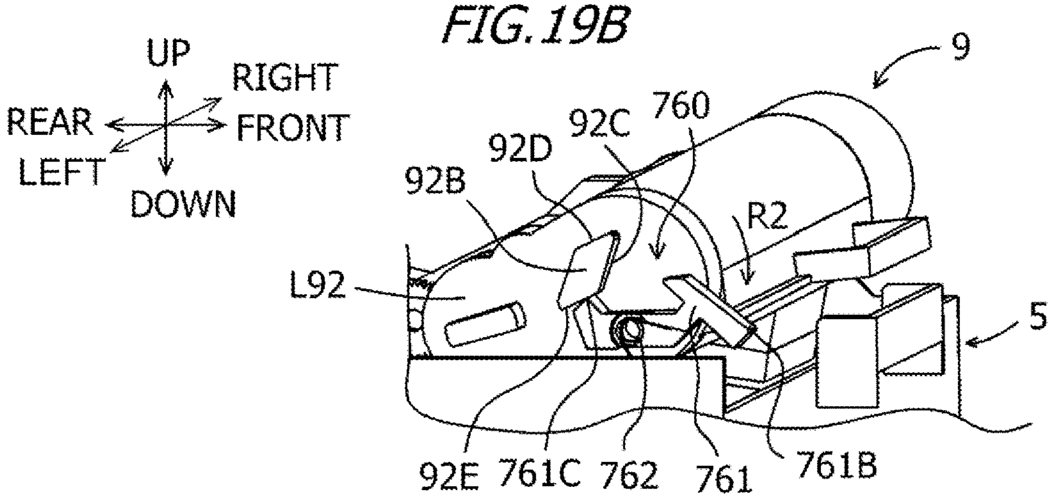
Figure 19C:
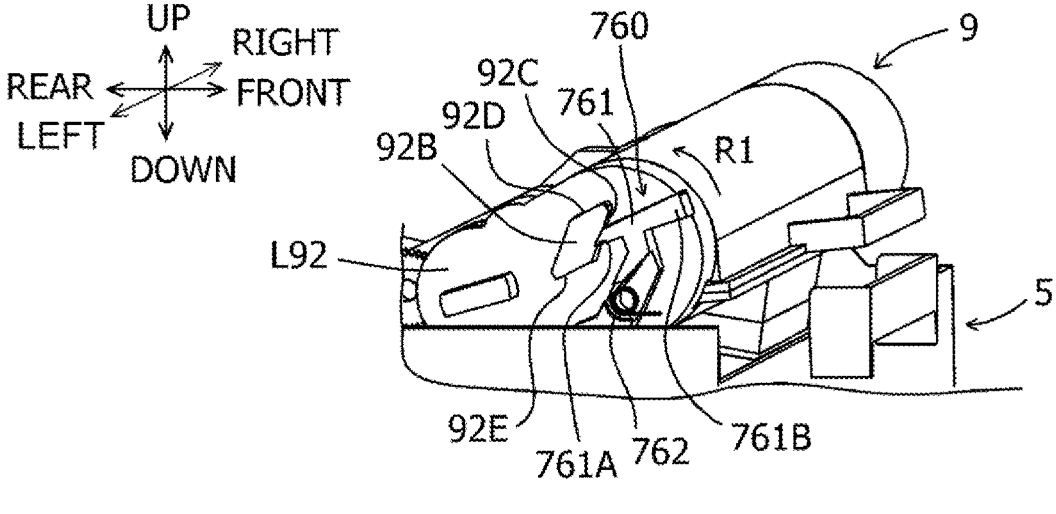

FIGS. 19A to 19C show movement of shifting the toner cartridge 9 to a lift-up state using the lift mechanism 760 in the state in which the toner cartridge 9 is attached to the developing unit 7. FIG. 19A shows a state in which the toner cartridge 9 has been attached to the developing unit 7. FIG. 19B shows a state in which the toner cartridge 9 is lifted up by the lift mechanism 760. FIG. 19C shows a state in which the toner cartridge 9 is lifted up. Also, in FIGS. 19A to 19C, the side holder 719 of the developing unit 7 is omitted for convenience of explanation.

As shown in FIGS. 19A to 19C, the T side holder L92 of the toner cartridge 9 is provided with a protruded portion 92B, and the protruded portion 92B includes a contact surface 92C, a holding surface 92D, and a receiving surface 92E. Further, as shown in FIG. 5, the lift mechanism 760 is configured of a boss 719A, a lift member 761, and a torsion coil spring 762 which are provided in the side holder 719 of the developing unit 7. The lift member 761 and the torsion coil spring 762 are attached to the boss 719A and can rotate around the boss 719A. The lift member 761 has a contact region 761A, an operation portion 761B, and a raising portion 761C. Further, the lift member 761 is biased in a direction of arrow R1 due to the torsion coil spring 762.

First, the movement of the lift mechanism 760 in the process of attaching the toner cartridge 9 will be described with reference to FIGS. 18A to 18C.

When the rotational operation of the toner cartridge 9 is performed during the attaching process of the toner cartridge 9, as shown in FIG. 18A, the contact surface 92C and the contact region 761A are in contact with each other, and the toner cartridge 9 is placed on the lift mechanism 760. When the rotational operation of the toner cartridge 9 is continued, as shown in FIG. 18B, the contact region 761A is pushed by the contact surface 92C, and the lift member 761 rotates in a direction of arrow R2 to allow the rotational operation of the toner cartridge 9. Further, when the rotational operation of the toner cartridge 9 is continued and the attachment of the toner cartridge 9 is completed, as shown in FIG. 18C, the contact region 761A is separated from the contact surface 92C and comes into contact with the holding surface 92D. The lift member 761 can keep the toner cartridge 9 in the fully attached state. That is, the lift member 761 is a support member for supporting the toner cartridge 9 on the process cartridge 5. In this way, the lift mechanism 760 is an operation member that moves the toner cartridge 9 in the direction in which it is attached to the process cartridge 5.

Next, movement of shifting the toner cartridge 9 from the fully attached state to the lift-up state will be described with reference to FIGS. 19A to 19C.

As shown in FIG. 19A, in the fully attached state of the toner cartridge 9, the contact region 761A of the lift member 761 is in contact with the holding surface 92D, and the toner cartridge 9 cannot be detached. In order to detach the toner cartridge 9, as shown in FIG. 19B, the operation portion 761B of the lift member 761 is operated to rotate the lift member 761 in the direction of arrow R2. Thus, the raising portion 761C of the lift member 761 comes into contact with the receiving surface 92E, and the toner cartridge 9 can be rotated. After that, when the operation portion 761B is open, as shown in FIG. 19C, the lift member 761 rotates in the direction of arrow R1 due to a biasing force of the torsion coil spring 762. The contact surface 92C and the operation portion 761B are in a contact state, and the toner cartridge 9 is in a lift-up state on the lift mechanism 760. This makes it possible to detach the toner cartridge 9. In this way, the lift mechanism 760 moves the toner cartridge 9 in the direction in which it is detached from the process cartridge 5.

Arrangement of Memory Tags

Figure 20:
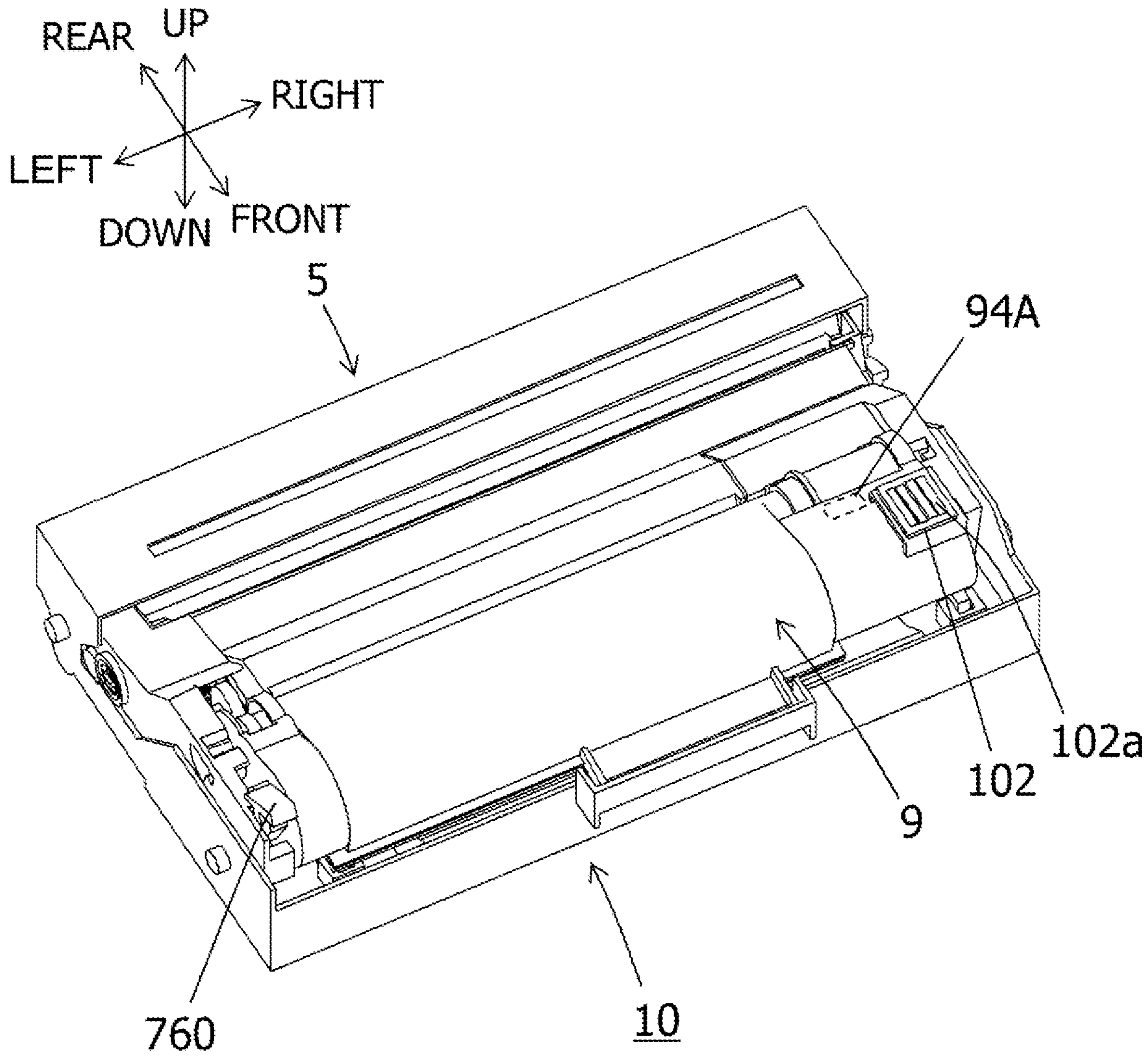
FIG. 20 is a perspective view of the cartridge unit of the first embodiment.
Figure 21:
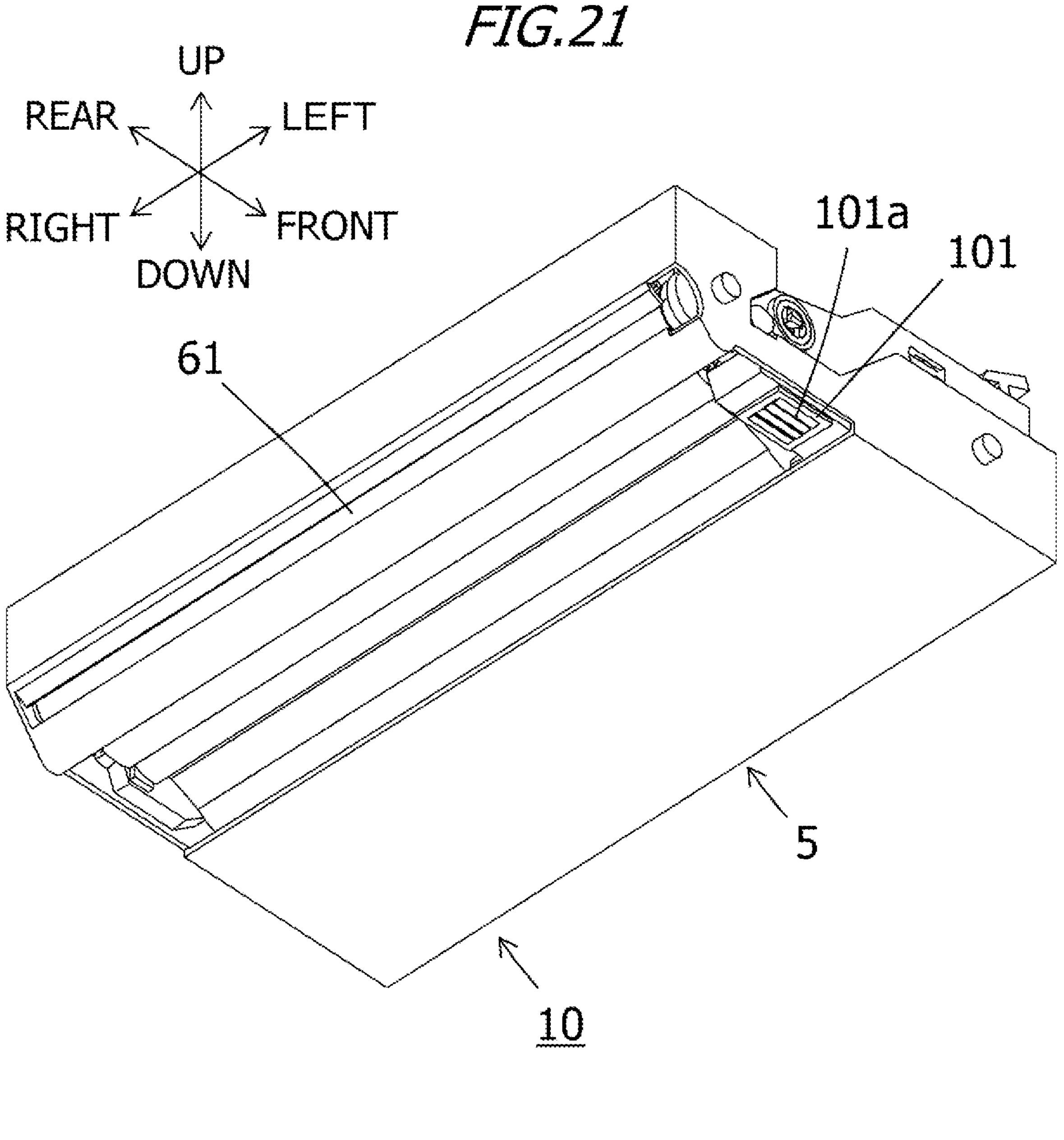
FIG. 21 is a perspective view of the cartridge unit of the first embodiment.

Next, a storage member according to the first embodiment will be described. FIG. 20 is a perspective view of the cartridge unit 10 from diagonally above, and FIG. 21 is a perspective view thereof from diagonally below. The cartridge unit 10 has a second memory tag 101 serving as a second storage member of the process cartridge 5 and a first memory tag 102 serving as a first storage member of the toner cartridge 9.

The second memory tag 101 and the first memory tag 102 each have a memory substrate, a memory chip (storage element) provided on the memory substrate for storing information, and memory contacts electrically connected to the memory chip. The memory chip may be disposed inside the memory substrate. The memory contacts are, for example, electrodes provided on the memory substrate. As the memory contacts, the second memory tag 101 has second memory contacts 101*a*, and the first memory tag 102 has first memory contacts 102*a*. The second memory tag 101 has a second memory chip (second storage element), the second memory contacts 101*a* electrically connected to the second memory chip, and a second contact arrangement surface on which the second memory contacts 101*a* are disposed. The first memory tag 102 has a first memory chip (first storage element), the first memory contacts 102*a* electrically connected to the first memory chip, and a first contact arrangement surface on which the first memory contacts 102*a* are disposed. The first memory tag 102 is disposed on the top surface of the process cartridge 5 in a posture in which the cartridge unit 10 is used. As can be understood from FIG. 20, the first memory tag 102 is disposed at a position separated from the discharge opening forming member 94 and the discharge side shutter 95.

The number of the second memory contacts 101*a* and the number of the first memory contacts 102*a* are both four. The four second memory contacts 101*a* are arranged in a direction perpendicular to the attaching direction of the cartridge unit 10 and in the left to right direction of the process cartridge 5. The four first memory contacts 102*a* are arranged in the direction perpendicular to the attaching direction of the cartridge unit 10 and in the left to right direction of the toner cartridge 9. The second memory tag 101 and the first memory tag 102 can store and transmit various information. Information is transmitted between the apparatus main body 2 and the second memory contacts 101*a* by making electrical contacts between the second memory contacts 101*a* and main body memory contacts of the apparatus main body 2. Information is transmitted between the apparatus main body 2 and the first memory contacts 102*a* by making electrical contacts between the first memory contacts 102*a* and the main body memory contacts of the apparatus main body 2.

Different information is stored in each of the second memory tag 101 and the first memory tag 102. The second memory tag 101 provided in the process cartridge 5 stores information about the process cartridge 5. For example, the information about the process cartridge 5 is information about a printing usage history of the photosensitive drum 61 and the developing roller 71 provided in the process cartridge 5, etc. The first memory tag 102 provided on the toner cartridge 9 stores information about the toner cartridge 9. For example, the information about the toner cartridge 9 is information about a remaining amount of toner contained in the toner cartridge 9, etc. By reading this information in the apparatus main body 2, control of the apparatus main body 2, such as notifying of replacement of the process cartridge 5 and the toner cartridge 9 with new cartridges, is performed.

Next, the arrangement of the second memory tag 101 and the first memory tag 102 in an axis direction will be described. Here, the axis direction is the rotational axis direction of the photosensitive drum 61 (left to right direction) or the rotational axis direction of the developing roller 71 (left to right direction) and is simply referred to as the axis direction in the following description. In FIG. 21, the second memory tag 101 is disposed on a left side of a lower surface of the process cartridge 5. In FIG. 20, the first memory tag 102 is disposed on a right side of an upper surface of the toner cartridge 9. The toner cartridge 9 has the discharge opening 94A serving as a developer discharge opening for discharging toner to the process cartridge 5. The discharge opening 94A of the toner cartridge is provided on a right side of the toner cartridge 9. As described above, in the longitudinal direction (axis direction) of the toner cartridge 9, the discharge opening 94A and the first memory tag 102 are disposed on one end side with respect to a center of the toner cartridge 9. The fact that some members (in this case, the discharge opening 94A and the first memory tag 102) are disposed on one end side with respect to the center of the toner cartridge 9 in the axis direction indicates that a distance between an end portion of the toner cartridge 9 on one end side and the members in the axis direction is shorter than a distance between an end portion of the toner cartridge 9 on the other end side opposite to the one end side and the members. Similarly, the fact that some members are disposed on the other end side with respect to the center of the toner cartridge 9 in the axis direction indicates that the distance between the end portion of the toner cartridge 9 on the other end side and the members in the axis direction is shorter than the distance between the end portion of the toner cartridge 9 on one end side and the members. The lift mechanism 760, which is a support member for supporting the toner cartridge 9 on the process cartridge 5, is provided on a left side of the toner cartridge 9. That is, the first memory tag 102 is disposed on the same side as the discharge opening 94A with respect to the center of the toner cartridge 9 in the axis direction and is disposed on the side opposite to the lift mechanism 760. Therefore, in the longitudinal direction (axis direction) of the toner cartridge 9, the lift mechanism 760 is disposed on the other end side opposite to one end side with respect to the center of the toner cartridge 9. Also, the second memory tag 104 can also be disposed on one end side with respect to the center of the toner cartridge 9.

Figure 22:
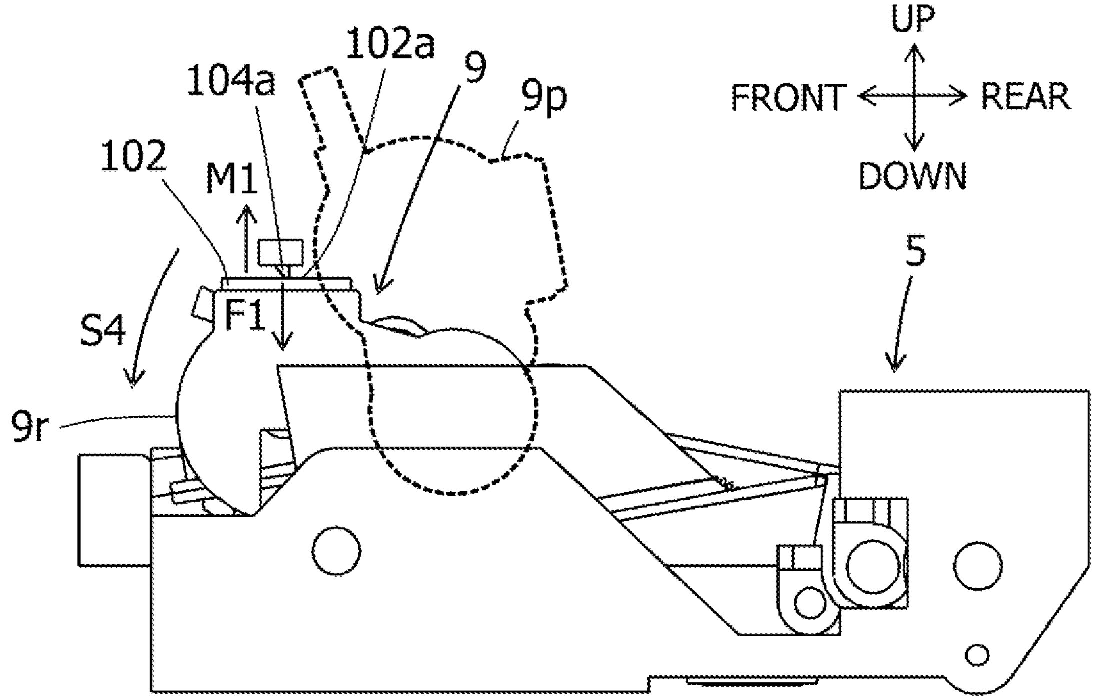
FIG. 22 is a side view of the cartridge unit of the first embodiment.

Further, the arrangement of the first memory tag 102 will be described with reference to FIG. 22. FIG. 22 is a side view of the cartridge unit 10 from a right side. As described above, the toner cartridge 9 is attached to the process cartridge 5 by rotating the toner cartridge 9. A position 9*p* of the toner cartridge 9 before the toner cartridge 9 rotates is shown by a dotted line in FIG. 22. Also, a rotating direction of the toner cartridge 9 is indicated by arrow S4 in FIG. 22. The rotating direction S4 of the toner cartridge 9 is the attaching direction of the toner cartridge 9 to the process cartridge 5. FIG. 22 shows a position 9*r* of the toner cartridge 9 when the toner cartridge 9 rotates and the toner cartridge 9 is attached to the process cartridge 5. As can be seen from FIG. 22, when the toner cartridge 9 moves from the position 9*p* to the position 9*r*, the first memory tag 102 moves integrally with the T side holder L92, the T side holder R93, and the toner container 910. In a state in which the toner cartridge 9 is in contact with the process cartridge 5, the toner cartridge 9 moves from the position 9*p* (a first position) to the position 9*r* (a second position), and the toner cartridge 9 is positioned on the process cartridge 5. In this case, the toner cartridge 9 rotates from the position 9*p* to the position 9*r* in a state in which the supported protrusion L92A is supported by the supporting portion L730 and the supported protrusion R93A is supported by the supporting portion R731 (the state shown in FIG. 15B). The position 9*r* (second position) of the toner cartridge 9 when the toner cartridge 9 is positioned with respect to the process cartridge 5 is a fully attached position or a positioning position of the toner cartridge 9 with respect to the process cartridge 5. The position of the first memory tag 102 when the toner cartridge 9 is at the position 9*r* in the up and down direction (vertical direction) is lower than the position of the first memory tag 102 when the toner cartridge 9 is at the position 9*p*. Also, as can be seen from FIGS. 17A, 17B, 20 and 22, a distance between a rotational center of the toner cartridge 9 (supported protrusion L92A and supported protrusion R93A) and the discharge opening 94A in a direction orthogonal to the longitudinal direction of the toner cartridge 9 is shorter than a distance between the rotational center of the toner cartridge 9 and the first memory tag 102. Further, when the toner cartridge 9 is at the position 9*r*, the first memory tag 102 is located at the highest position in the toner cartridge 9 in the up and down direction. In addition, as can be understood from FIGS. 9 and 22, in the up and down direction, the first memory tag 102 is located above upper ends of the left side wall 611 and the right side wall 612.

The first memory tag 102 has the first contact arrangement surface on which the first memory contacts 102*a* are disposed. The apparatus main body 2 has first main body memory contacts 104*a* that comes into contact with the first memory contacts 102*a* when the cartridge unit 10 is attached to the apparatus main body 2. The first memory contact 102*a* has a first memory contact surface that comes into contact with the first main body memory contact 104*a*. When the cartridge unit 10 is attached to the apparatus main body 2, the first memory contact 102*a* receives a pressing force from the first main body memory contact 104*a* of the apparatus main body 2 and comes into contact with the first main body memory contact 104*a*. A direction of this pressing force is indicated by arrow F1. The direction F1 of the pressing force is the same as the rotating direction S4 when the toner cartridge 9 is attached. That is, the first memory contact 102*a* receives the pressing force from the first main body memory contact 104*a* of the apparatus main body 2, and the toner cartridge 9 is pressed from the position 9*p* toward the position 9*r*. The first memory contact 102*a* has the first memory contact surface extending parallel to the front to rear direction and the left to right direction. The first memory contact surface of the first memory contact 102*a* may be formed at the same height as the first contact arrangement surface of the first memory tag 102. There may be a step between the first contact arrangement surface of the first memory tag 102 and the first memory contact surface of the first memory contact 102*a*. A normal direction M1 of the first memory contact surface facing in a direction in which the first memory contact 102*a* is exposed on the first contact arrangement surface faces in a direction opposite to the rotating direction S4. That is, the normal direction M1 of the first memory contact surface faces in a direction opposite to the direction (rotating direction S4) in which the toner cartridge 9 is directed from the position 9*p* (first position) to the position 9*r* (second position). The first contact arrangement surface and the first memory contact surface are parallel to each other. Therefore, the normal direction M1 of the first contact arrangement surface facing in the direction in which the first memory contact 102*a* is exposed faces in the direction opposite to the rotating direction S4. That is, the normal direction M1 of the first contact arrangement surface faces in a direction opposite to the direction (rotating direction S4) in which the toner cartridge 9 is directed from the position 9*p* (first position) to the position 9*r* (second position). As a result, the direction F1 of the pressing force mentioned above and the rotating direction S4 become the same direction.

Figure 23A:
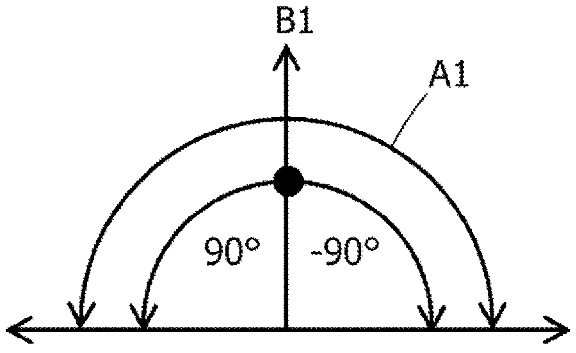
FIGS. 23A to 23D are schematic diagrams showing the same direction and an opposite direction in the present invention.
Figure 23C:
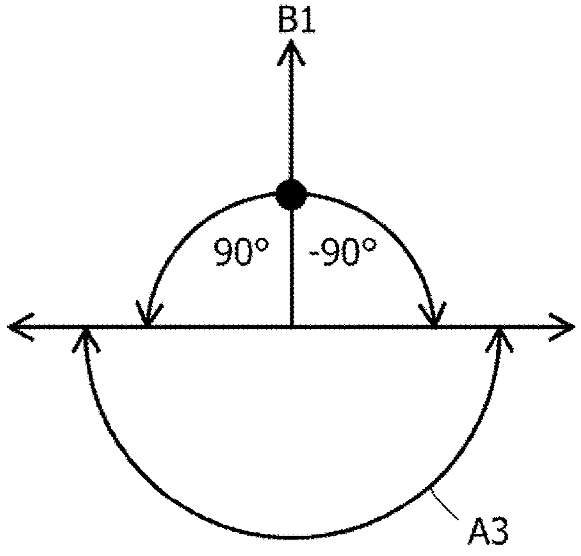
Figure 23B:
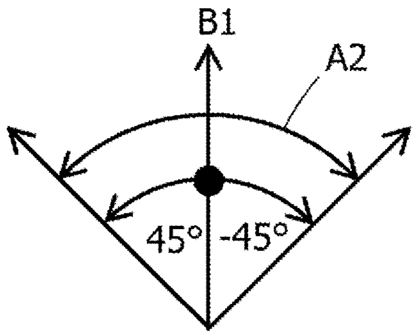

Here, meanings of the same direction and an opposite direction will be described with reference to FIGS. 23A to 23D. FIGS. 23A to 23D are schematic diagrams showing the same direction and the opposite direction in the present invention. The fact that two directions are in the same direction does not indicate that the two directions face in exactly the same direction, but that the two directions have directional components in the same direction. That is, in FIG. 23A, when an angle formed by a predetermined direction with respect to a reference direction B1 is in a range A1 between −90 degrees and 90 degrees not including −90 degrees and 90 degrees, the two directions are defined as in the same direction. Further, as shown in FIG. 23B, when an angle formed by two directions is in a range A2 between 45 degrees and −45 degrees, the components in the same direction become stronger, and thus it is more effective for effects of the present invention, which will be described later.

Figure 23D:
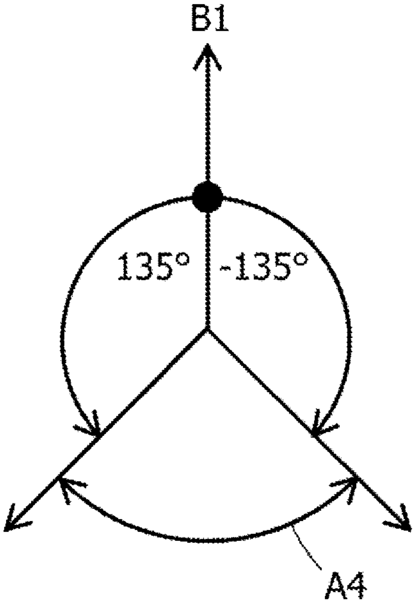

On the other hand, the opposite direction indicates that two directions have directional components in opposite directions. That is, in FIG. 23C, when an angle formed by a predetermined direction with respect to the reference direction B1 is in a range A3 between 90 degrees and −90 degrees not including 90 degrees and −90 degrees, the two directions are defined as in opposite directions. Also, as shown in FIG. 23D, when the angle formed by the two directions is in a range A4 between 135 degrees and −135 degrees, the components in the opposite directions become stronger, and thus it is more effective for effects of the present invention, which will be described later.

Figure 24:
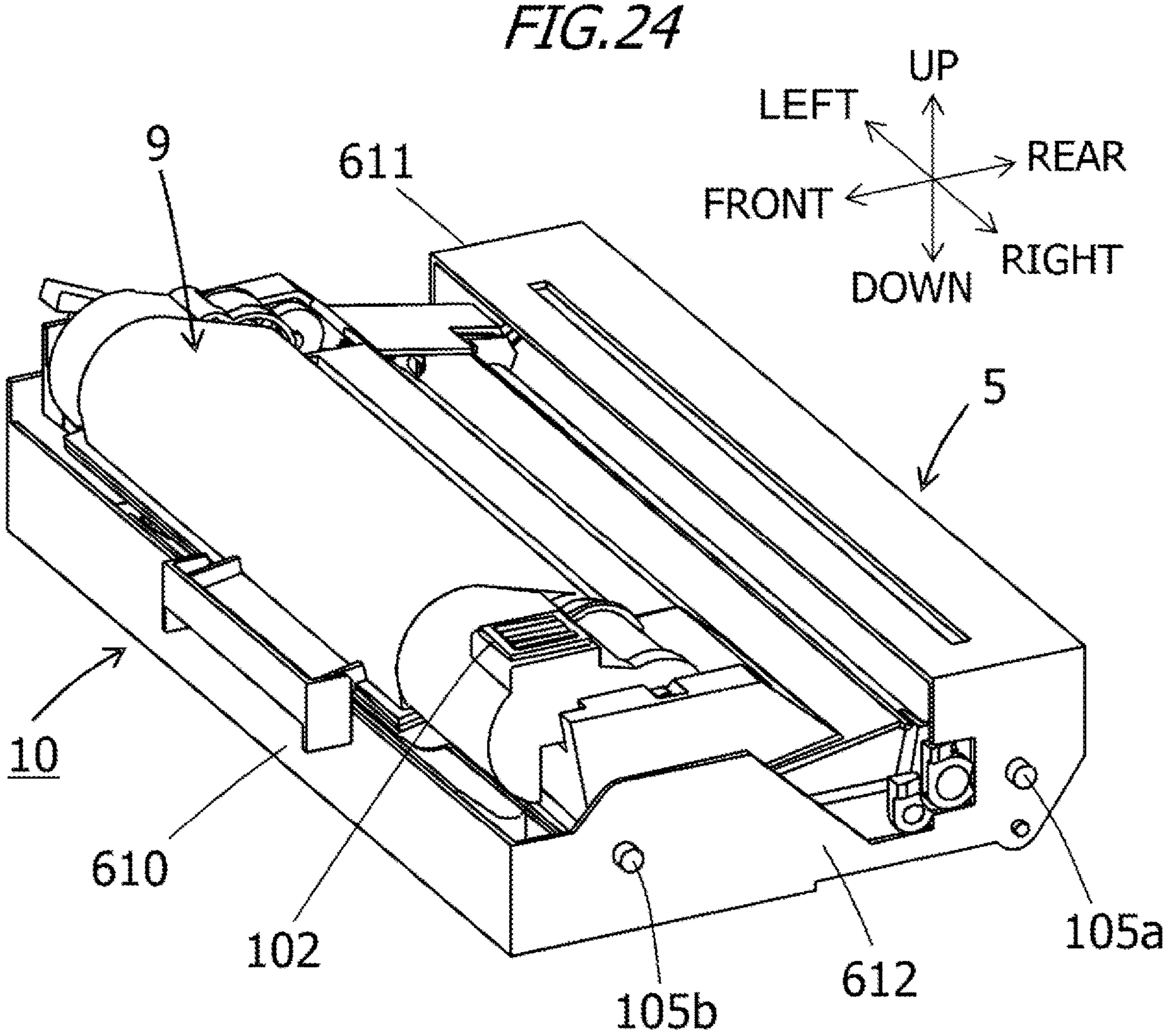
FIG. 24 is a perspective view of the cartridge unit of the first embodiment.
Figure 25:
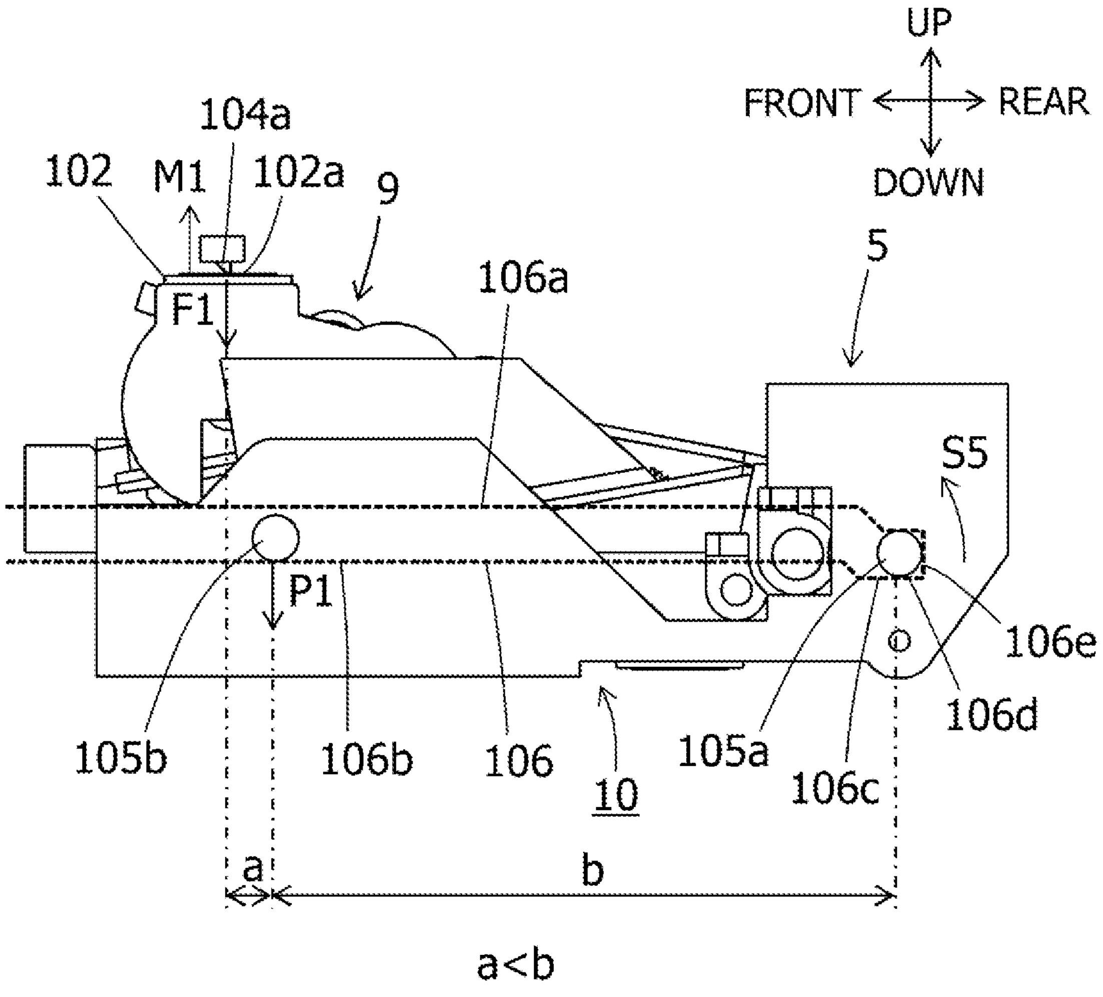
FIG. 25 is a side view of the cartridge unit of the first embodiment.

Next, positioning of the cartridge unit 10 with respect to the apparatus main body 2 will be described with reference to FIGS. 24 and 25. FIG. 24 is a perspective view of the cartridge unit 10 from diagonally above. FIG. 25 is a side view of the cartridge unit 10 from a right side.

The process cartridge 5 of the cartridge unit 10 is provided with a positioned protrusion 105*a* serving as a positioned portion and a positioned protrusion 105*b* serving as a rotation restricted portion. The positioned protrusions 105*a* and 105*b* are provided on front and rear sides of the process cartridge 5 to protrude in the axis direction from the left side wall 611 and the right side wall 612 of the frame 610, respectively. In the attaching direction of the process cartridge 5, the positioned protrusion 105*a* provided on the front side of the process cartridge 5 is provided coaxially with the photosensitive drum 61. As can be seen from FIGS. 12, 15A, 20 and 24, in the present embodiment, the first memory tag 102 is attached to the T side holder R93. However, the first memory tag 102 may be attached to the toner container 910.

The apparatus main body 2 has a guide groove 106 serving as a positioning portion for supporting the positioned protrusions 105*a* and 105*b*. The guide groove 106 is shown by a dotted line in FIG. 25. The cartridge unit 10 moves rearward with respect to the apparatus main body 2 and is attached to the apparatus main body 2. When the cartridge unit 10 is attached, the positioned protrusions 105*a* and 105*b* pass through the inside of the guide groove 106 along the guide groove 106. When the positioned protrusions 105*a* and 105*b* pass through the inside of the guide groove 106, an upper surface 106*a* and a lower surface 106*b* (rotation restricted portions) of the guide groove 106 restrict vertical movement of the positioned protrusions 105*a* and 105*b*. As a result, movement of the cartridge unit 10 in the up and down direction with respect to the apparatus main body 2 at the time of attaching the cartridge unit 10 is restricted. Further, in the posture in which the cartridge unit 10 is used, movement of the cartridge unit 10 in the direction of gravity is restricted.

FIG. 25 shows a state in which the cartridge unit 10 has been attached to the apparatus main body 2 and the cartridge unit 10 has been positioned on the apparatus main body 2. The guide groove 106 has a positioning groove 106*c* formed on an inner side of the guide groove 106 in the attaching direction of the process cartridge 5. The positioning groove 106*c* has a lower surface 106*d* continuous with a lower surface 106*b* of the guide groove 106, and a vertical surface 106*e* extending in the vertical direction from the lower surface 106*d*. A biasing force directed rearward and downward is applied to the process cartridge 5 by a biasing member (not shown) provided on the apparatus main body 2. Due to this biasing force, the positioned protrusion 105*a* comes into contact with the lower surface 106*d* and the vertical surface 106*e* of the positioning groove 106*c*, and the positioned protrusion 105*a* is positioned in the guide groove 106. Further, due to this biasing force, the positioned protrusion 105*b* provided on a rear side of the process cartridge 5 comes into contact with the lower surface 106*b* of the guide groove 106, and the positioned protrusion 105*b* is positioned in the guide groove 106. By determining the position of the positioned protrusion 105*a*, a position of the cartridge unit 10 is determined in a direction orthogonal to the rotation axis of the photosensitive drum 61. On the other hand, by determining the position of the positioned protrusion 105*b*, the cartridge unit 10 is restricted from rotating around the positioned protrusion 105*a*. In other words, the posture of the cartridge unit 10 is determined. More specifically, the positioned protrusion 105*a* is restricted from moving in the horizontal direction and the vertical direction by the guide groove 106. Movement of the positioned protrusion 105*b* in the vertical direction is restricted by the guide groove 106. As described above, the cartridge unit 10 is positioned in the apparatus main body 2. In addition, the opposite side of the cartridge unit 10 in the longitudinal direction is also positioned by the same configuration. Also, the positioned protrusion 105*a* may be configured to be subjected to rearward and upward biasing forces due to a biasing member (not shown) provided on the apparatus main body 2. In this case, due to this biasing force, the positioned protrusion 105*a* comes into contact with an upper surface (on a side opposite to the lower surface 106*d*) of the positioning groove 106*c* and the vertical surface 106*e*, and the positioned protrusion 105*a* is positioned in the guide groove 106.

Here, the direction F1 of the pressing force from the first main body memory contact 104*a* acting on the first memory contact 102*a* described above is the same as the direction P1 in which the positioned protrusion 105*b* comes into contact with the lower surface 106*b* of the guide groove 106. That is, the normal direction M1 of the first memory contact surface facing in the direction in which the first memory contact 102*a* is exposed (the same as the normal direction M1 of the first contact arrangement surface) faces in the opposite direction to the direction (pressing direction) P1 in which the positioned protrusion 105*b* comes into contact with the guide groove 106. As a result, the pressing force direction F1 and the positioning direction P1 become the same direction. The positioned protrusion 105*b* comes into contact with the lower surface 106*b* to restrict the rotation around the positioned protrusion 105*a*. Further, in FIG. 25, the distance b in the front to rear direction between the position of the positioned protrusion 105*a* and the position of the positioned protrusion 105*b* is set to be larger than the distance a in the front to rear direction between the position of the positioned protrusion 105*b* and a position of a line along the pressing force direction F1. Also, the distance a is equal to the distance in the front to rear direction between the position of the positioned protrusion 105*b* and the position at which the first memory contact 102*a* and the first main body memory contact 104*a* come into contact with each other. That is, a relationship between the position of the positioned protrusion 105*a*, the position of the positioned protrusion 105*b*, and the position of the line along the pressing force direction F1 in the front to rear direction becomes the distance a<the distance b. In addition, in the front to rear direction, the position at which the first memory contact 102*a* and the first main body memory contact 104*a* come into contact with each other is located at a position farther from the positioned protrusion 105*a* than the positioned protrusion 105*b* is. Moreover, as can be seen from FIG. 25, the distance between the first memory contact 102*a* and the positioned protrusion 105*a* is longer than the distance between the positioned protrusion 105*b* and the positioned protrusion 105*a*.

Effects of the first embodiment will be described below. First, the effect of arrangement of the first memory tag 102 in the axis direction will be described. The first memory tag 102 is provided on the same side as the discharge opening 94A of the toner cartridge 9 in the axis direction and is provided on the side opposite to the lift mechanism 760 of the toner cartridge 9. Since the lift mechanism 760 is a part directly operated by the user who uses the printer (image forming apparatus), it is necessary to keep the lift mechanism 760 clean so that it does not stain the user's hands. For this reason, the lift mechanism 760 is disposed on the side opposite to the discharge opening 94A in the axis direction to separate the lift mechanism 760 from the discharge opening 94A of the toner cartridge 9 at which toner stains are likely to occur.

Further, if the first memory contact 102*a* becomes dirty, information transmission between the apparatus main body 2 and the first memory tag 102 may become unstable, and it is also necessary to prevent the first memory contact 102*a* from becoming dirty. For this reason, by disposing the first memory tag 102 on the side opposite to the lift mechanism 760 in the axis direction, it is possible to prevent the first memory contact 102*a* from becoming dirty due to the user accidentally touching the first memory contact 102*a* when operating the lift mechanism 760.

As described above, usability can be improved by preventing toner stains on the user's hands. Further, by preventing the user from accidentally touching the first memory contact 102*a*, it is possible to prevent the first memory contact 102*a* from becoming dirty and to reliably transmit information between the apparatus main body 2 and the first memory tag 102.

Next, the effect of arrangement of the first memory tag 102 in a cross-sectional direction perpendicular to the axis direction will be described. The first memory tag 102 is disposed such that the direction F1 of the pressing force received by the first memory contact 102*a* from the first main body memory contact 104*a* of the apparatus main body 2 is the same as the rotating direction S4 when the toner cartridge 9 is attached. With the pressing force from the first main body memory contact 104*a*, the toner cartridge 9 can be stably pressed in the attaching direction (rotating direction S4) on the process cartridge 5. Therefore, the position accuracy of the toner cartridge 9 with respect to the process cartridge 5 can be improved. In addition, by improving the position accuracy of the toner cartridge 9, the position accuracy of the first memory contact 102*a* with respect to the first main body memory contact 104*a* is improved, and thus both can be reliably electrically connected and certainty of information transmission can be improved.

Next, another effect regarding the configuration of the first embodiment will be described. As described above, the lift mechanism 760 has a function of preventing the toner cartridge 9 from coming off the process cartridge 5. Accordingly, on the side on which the lift mechanism 760 is disposed in the axis direction, the position accuracy of the toner cartridge 9 with respect to the process cartridge 5 can be ensured by the lift mechanism 760. On the other hand, in a case in which the first memory tag 102 is disposed on the side on which the lift mechanism 760 is not disposed in the axis direction, the toner cartridge 9 is stably pressed in the attaching direction (rotating direction S4) due to the pressing force on the first memory contact 102*a*, instead of the lift mechanism 760. The position accuracy of the toner cartridge 9 with respect to the process cartridge 5 can be ensured due to the pressing force on the first memory contact 102*a*. As a result, the first memory contact 102*a* and the first main body memory contact 104*a* can be reliably electrically connected, and the certainty of information transmission can be improved.

Further, the effect regarding the arrangement of the first memory tag 102 will be described. The first memory tag 102 is disposed such that the direction F1 of the pressing force received by the first memory contact 102*a* from the first main body memory contact 104*a* is in the same direction as the direction P1 in which the positioned protrusion 105*b* comes into contact with the guide groove 106 which is the positioning portion of the apparatus main body 2. As a result, since the positioned protrusion 105*b* of the process cartridge 5 can reliably come into contact with the lower surface 106*b* of the guide groove 106 due to the pressing force, positioning of the process cartridge 5 with respect to the apparatus main body 2 can be performed more reliably.

In FIG. 25, the relationship between the position of the positioned protrusion 105*a*, the position of the positioned protrusion 105*b*, and the position of the line along the pressing force direction F1 in the front to rear direction becomes the distance a<the distance b. Due to the pressing force received by the first memory contact 102*a* from the first main body memory contact 104*a*, an upward rotational moment indicated by arrow S5 in FIG. 25 is generated in the positioned protrusion 105*a* with the contacted position between the positioned protrusion 105*b* and the guide groove 106 as a fulcrum. As described above, the biasing force directed downward and rearward is applied to the cartridge unit 10 by the biasing member (not shown) provided on the apparatus main body 2 for positioning on the apparatus main body 2. However, in a case in which a force of the rotational moment S5 acting in the direction opposite to the direction of the biasing force is large, the positioning of the cartridge unit 10 may become unstable. Therefore, the relationship between the position of the positioned protrusion 105*a*, the position of the positioned protrusion 105*b*, and the position of the line along the pressing force direction F1 in the front to rear direction is set to be the distance a<the distance b. For this reason, the force of the rotational moment (S5) can be inhibited to be small with respect to the pressing force received by the first memory contact 102*a* from the first main body memory contact 104*a*. As a result, the positioning of the cartridge unit 10 with respect to the apparatus main body 2 can be stabilized. As described above, the pressing force of the first main body memory contact 104*a* generates a moment in the direction in which the positioned protrusion 105*a* is biased upward. Therefore, in a case in which the biasing force directed upward and rearward is applied to the positioned protrusion 105*a* and the cartridge unit 10 is positioned, the pressing force of the first main body memory contact 104*a* can assist with the upward positioning of the positioned protrusion 105*a*.

Second Embodiment

Next, a second embodiment will be described. In the second embodiment, parts that are different from those of the first embodiment will be described in detail. Unless otherwise specified, the second embodiment has the same configuration as the first embodiment, and thus the same components as those in the first embodiment will be denoted by the same reference numerals, and detailed description thereof will be omitted.

Figure 26:
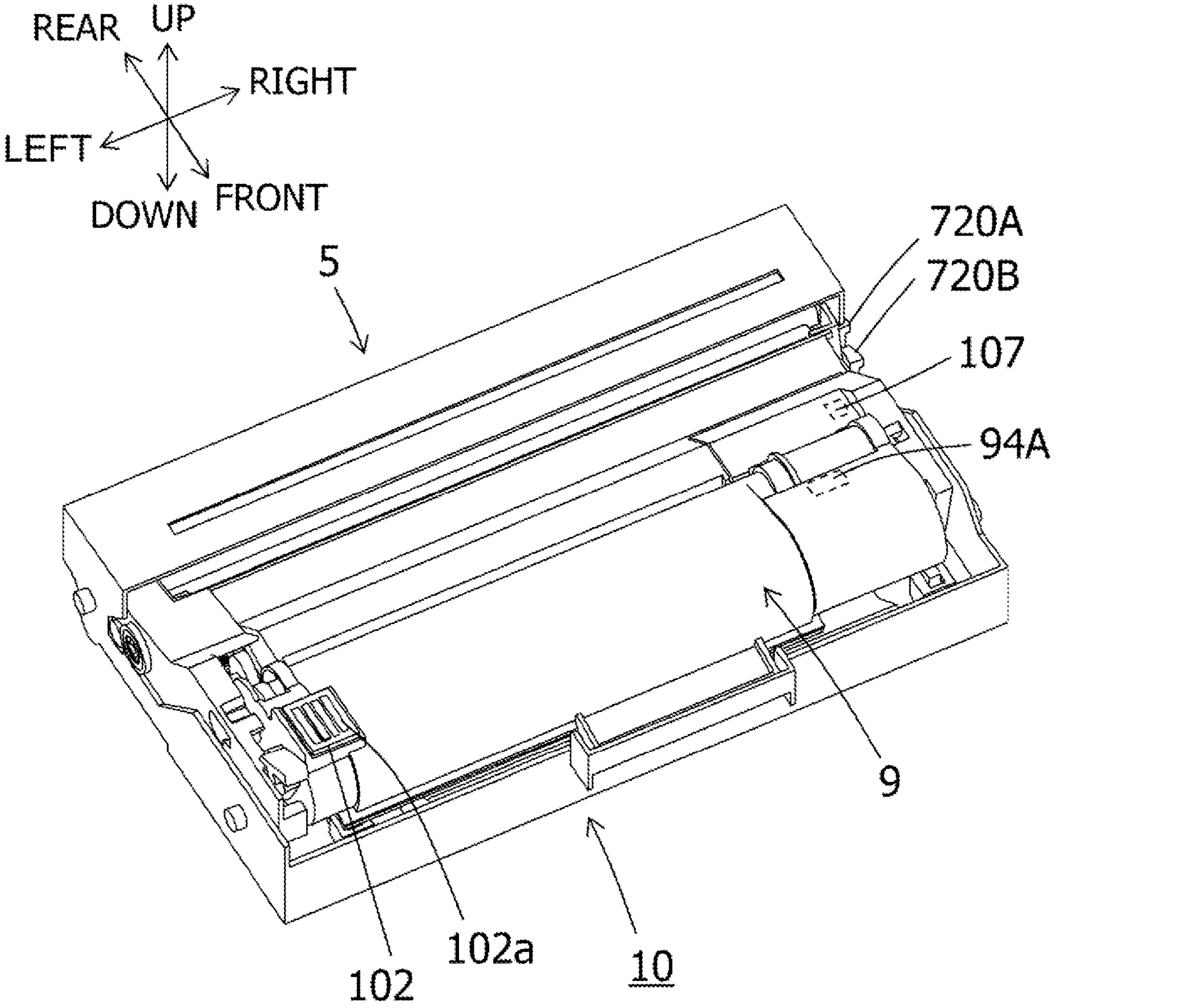
FIG. 26 is a perspective view of a cartridge unit of a second embodiment.
Figure 27:
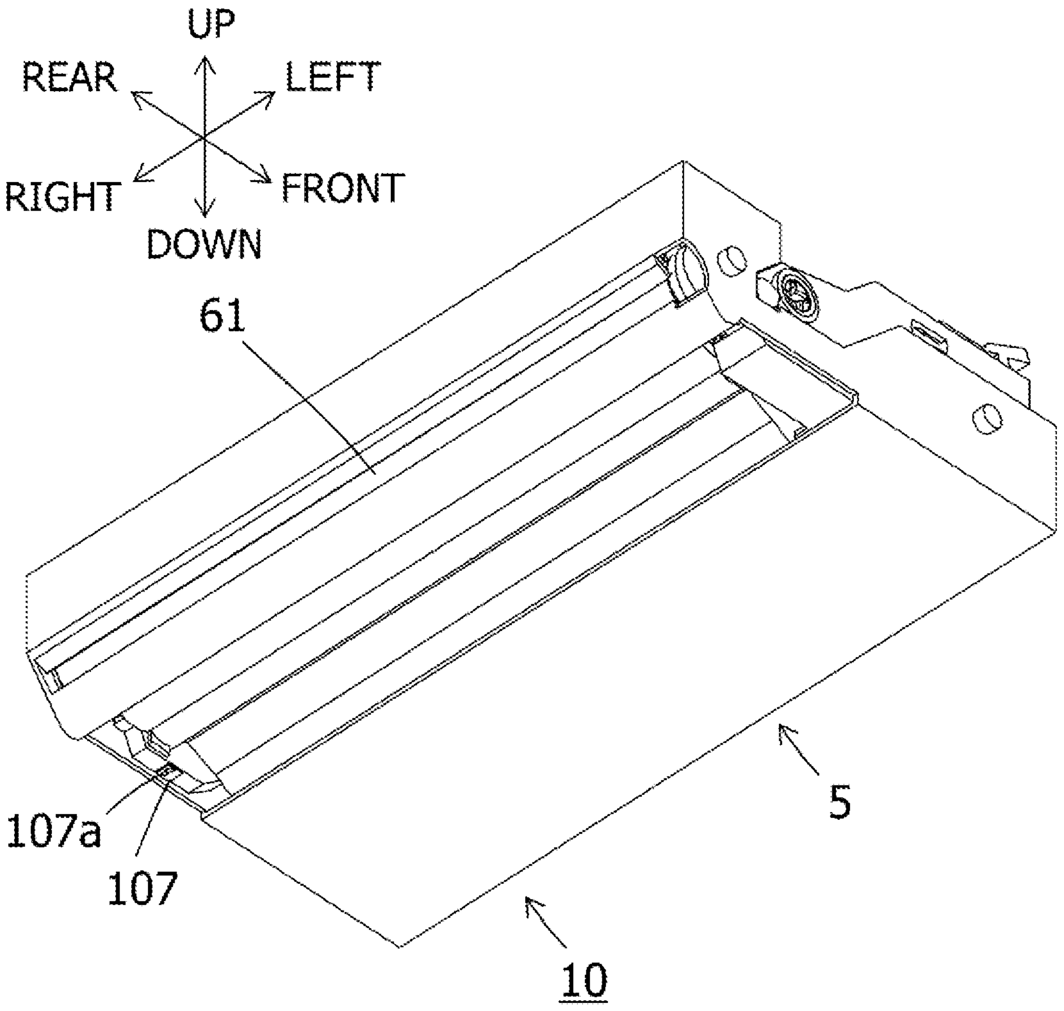
FIG. 27 is a perspective view of the cartridge unit of the second embodiment.

An arrangement of the memory tags will be described with reference to FIGS. 26 and 27. FIG. 26 is a perspective view of the cartridge unit 10 from diagonally above, and FIG. 27 is a perspective view of the cartridge unit 10 from diagonally below. As shown in FIG. 27, a second memory tag 107 is provided on a right side of the lower surface of the process cartridge 5. The cartridge unit 10 has the second memory tag 107 as the second storage member of the process cartridge 5 and the first memory tag 102 as the first storage member of the toner cartridge 9. The second memory tag 107 in the second embodiment is miniaturized more than the second memory tag 101 in the first embodiment described above. The number of the second memory contacts 101*a* in the second embodiment is two, which is less than the four second memory contacts 101*a* described above. The second memory tag 107 of the second embodiment can store and transmit various information in the same manner as the second memory tag 101 described above.

As shown in FIG. 26, the first memory tag 102 is provided on a left side of the upper surface of the toner cartridge 9. Further, the discharge opening 94A of the toner cartridge 9 and the electrical contacts 720A and 720B of the process cartridge 5 are provided on a right side of the cartridge unit 10. That is, the first memory tag 102 is provided on the side opposite to the discharge opening 94A of the toner cartridge 9 and the electrical contacts 720A and 720B of the process cartridge in the axis direction. Therefore, in the longitudinal direction (axis direction) of the toner cartridge 9, the discharge opening 94A is disposed on one end side with respect to the center of the toner cartridge 9, and the first memory tag 102 is disposed on the other end side opposite to the one end side with respect to the center of the toner cartridge 9. In addition, the second memory tag 107 is disposed on one end side with respect to the center of the cartridge unit 10 in the axis direction. The position of the first memory tag 102 in the present embodiment is the same as the position of the first memory tag 102 in the first embodiment in the front to rear direction and the left to right direction. As can be seen from FIG. 26, the first memory tag 102 is disposed at a position separated from the discharge opening forming member 94 and the discharge side shutter 95. In the present embodiment, as can be seen from FIGS. 12, 15A and 26, the first memory tag 102 is attached to the T side holder L92. However, the first memory tag 102 may be attached to the toner container 910.

The effects of the second embodiment will be described below. In the second embodiment, by using the miniaturized second memory tag 107, it is possible to dispose the second memory tag 107 even in a small space of the process cartridge 5. In addition, the first memory tag 102 is disposed on the side opposite to the discharge opening 94A of the toner cartridge 9 in the axis direction, and the first memory tag 102 is separated from the discharge opening 94A at which toner stains are likely to occur, so that the toner stains of the first memory contact 102*a* can be prevented. Further, the first memory tag 102 is disposed on the side opposite to the electrical contacts 720A and 720B in the axis direction, and the first memory tag 102 is separated from the electrical contacts 720A and 720B. For that reason, the first memory tag 102 can be released from influence of electrical noise generated from the electrical contacts 720A and 720B. As a result, stability of information transmission can be improved.

Other configurations of the second embodiment will be described. The memory tags may be disposed as follows. As shown in FIG. 26, the first memory tag 102 may be provided on the left side of the upper surface of the toner cartridge 9, and as shown in FIG. 21, the second memory tag 101 may be provided on the left side of the lower surface of the process cartridge 5. By doing so, the second memory tag 101 and the first memory tag 102 can be provided on the sides opposite to the electrical contacts 720A and 720B in the axis direction, and thus they can be released from the influence of electrical noise generated from the electrical contacts 720A and 720B. As a result, the stability of information transmission can be improved. That is, the second memory tag 107 can be disposed on the other end side with respect to the center of the toner cartridge 9.

Third Embodiment

Next, a third embodiment will be described. In the third embodiment, parts that are different from those of the above-described embodiments will be described in detail. Unless otherwise specified, the third embodiment has the same configuration as each embodiment, and thus the same components as those in each embodiment will be denoted by the same reference numerals, and detailed description thereof will be omitted.

Figure 28:
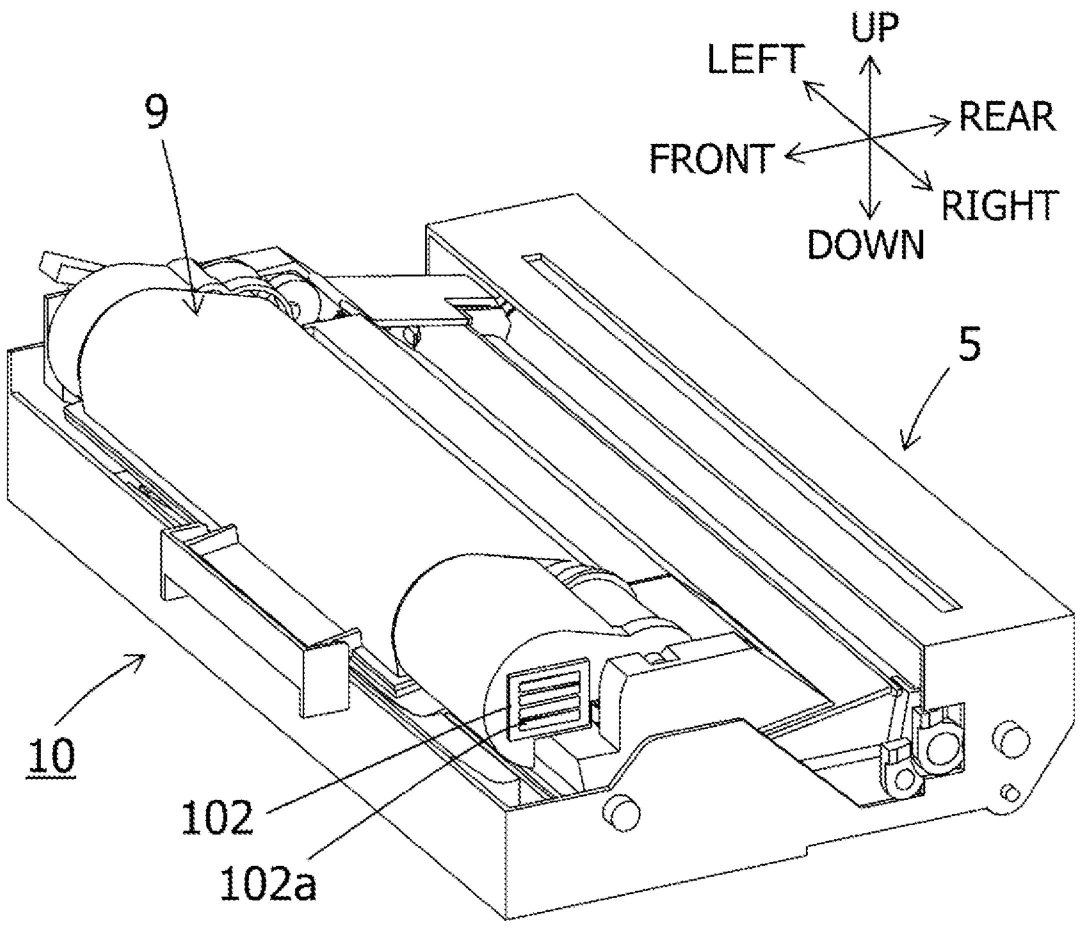
FIG. 28 is a perspective view of a cartridge unit of a third embodiment.

An arrangement of the memory tags will be described with reference to FIG. 28. FIG. 28 is a perspective view of the cartridge unit 10 from diagonally above. The toner cartridge 9 has an end surface (a right end surface in FIG. 28) extending in a direction crossing the axis direction at an end portion in the axis direction (a right end portion in FIG. 28). In the present embodiment, the right end surface extends in a direction orthogonal to the longitudinal direction of the toner cartridge 9. However, the right side surface may be inclined with respect to a plane orthogonal to the longitudinal direction of the toner cartridge 9. The first memory tag 102 is disposed on the right end surface of the toner cartridge 9 such that the first contact arrangement surface and the first memory contact surface of the first memory contact 102*a* face rightward with respect to the axis direction. That is, in the axis direction, the first contact arrangement surface and the first memory contact surface of the first memory contact 102*a* are disposed to face the outside of the toner cartridge 9. In addition, the first memory contact 102*a* is disposed at a position at which the first memory contact 102*a* is inserted inside the cartridge unit 10 toward the left in the axis direction. Further, as in the second embodiment, in the axis direction, the first memory tag 102 is disposed on one end side with respect to the center of the cartridge unit 10, and the second memory tag 107 is disposed on the other end side opposite to the one end side with respect to the center of the cartridge unit 10. As can be seen from FIGS. 12, 15A and 28, the first memory tag 102 is attached to the T side holder R93. Also, the second memory tag 107 can also be disposed on one end side with respect to the center of the toner cartridge 9.

Figure 29:
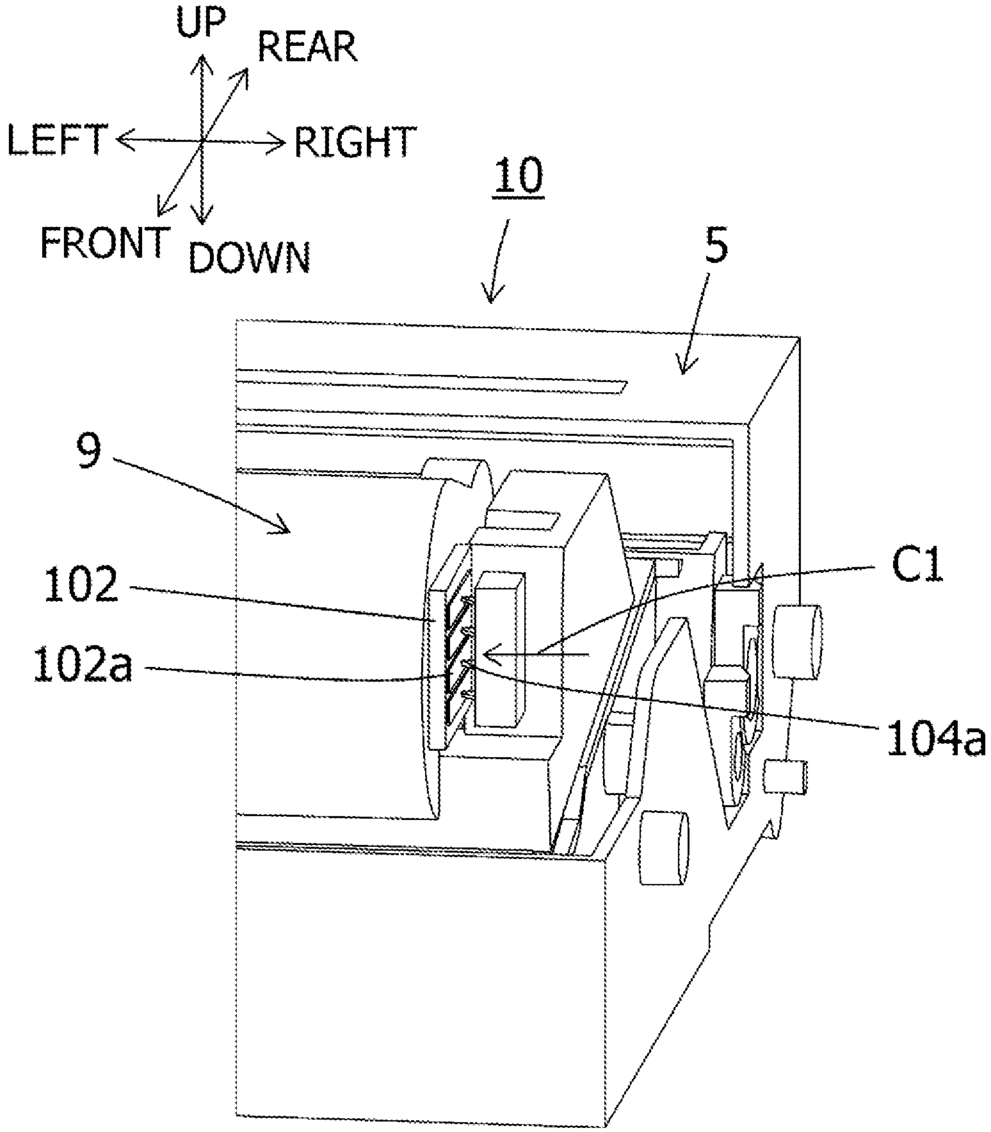
FIG. 29 is a perspective view of the cartridge unit of the third embodiment and a first main body memory contact.

FIG. 29 is a perspective view showing a state in which the cartridge unit 10 is attached to the apparatus main body 2 and the first memory contact 102*a* is in contact with the first main body memory contact 104*a*. After the cartridge unit 10 is attached to the apparatus main body 2, the first main body memory contact 104*a* is moved leftward in the axis direction (in a direction of arrow C1 in FIG. 29) by a mechanism (not shown) provided in the apparatus main body 2. As a result, the first memory contact 102*a* and the first main body memory contact 104*a* can be satisfactorily electrically connected to each other.

Effects of the third embodiment will be described. The first memory tag 102 is disposed on the side end surface of the toner cartridge 9 such that the first contact arrangement surface and the first memory contact surface of the first memory contact 102*a* face in the axis direction. This eliminates the need to dispose the first memory tag 102 on the upper surface of the toner cartridge 9. For this reason, the cartridge unit 10 and the apparatus main body 2 can be miniaturized in the up and down direction. Miniaturizing the apparatus body 2 in the up and down direction is particularly effective in reducing a size of the entire apparatus in the up and down direction in a multifunctional printer in which a document reading apparatus is disposed on an upper portion of the apparatus main body 2.

Fourth Embodiment

Next, a fourth embodiment will be described. In the fourth embodiment, parts that are different from those of the above-described embodiments will be described in detail. Unless otherwise specified, the fourth embodiment has the same configuration as each embodiment, and thus the same components as those in each embodiment will be denoted by the same reference numerals, and detailed description thereof will be omitted.

Figure 30:
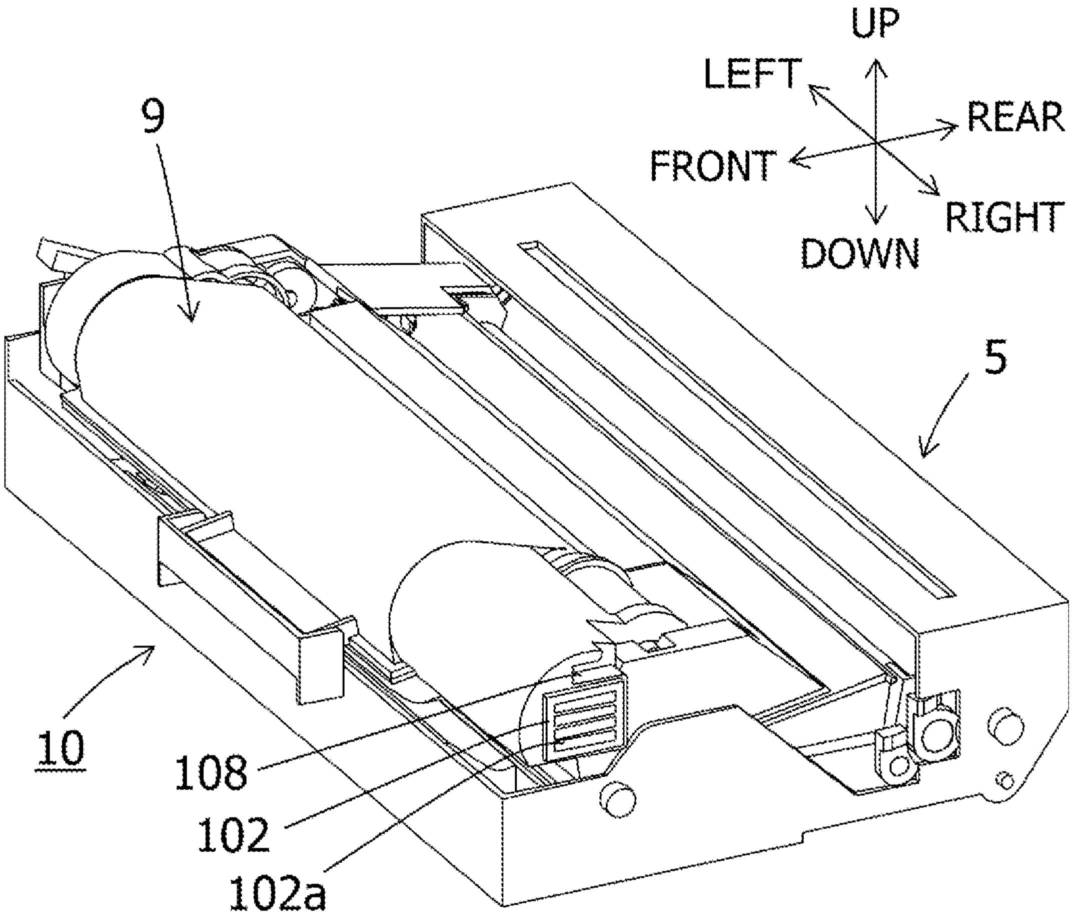
FIG. 30 is a perspective view of a cartridge unit of a fourth embodiment.
Figure 31:
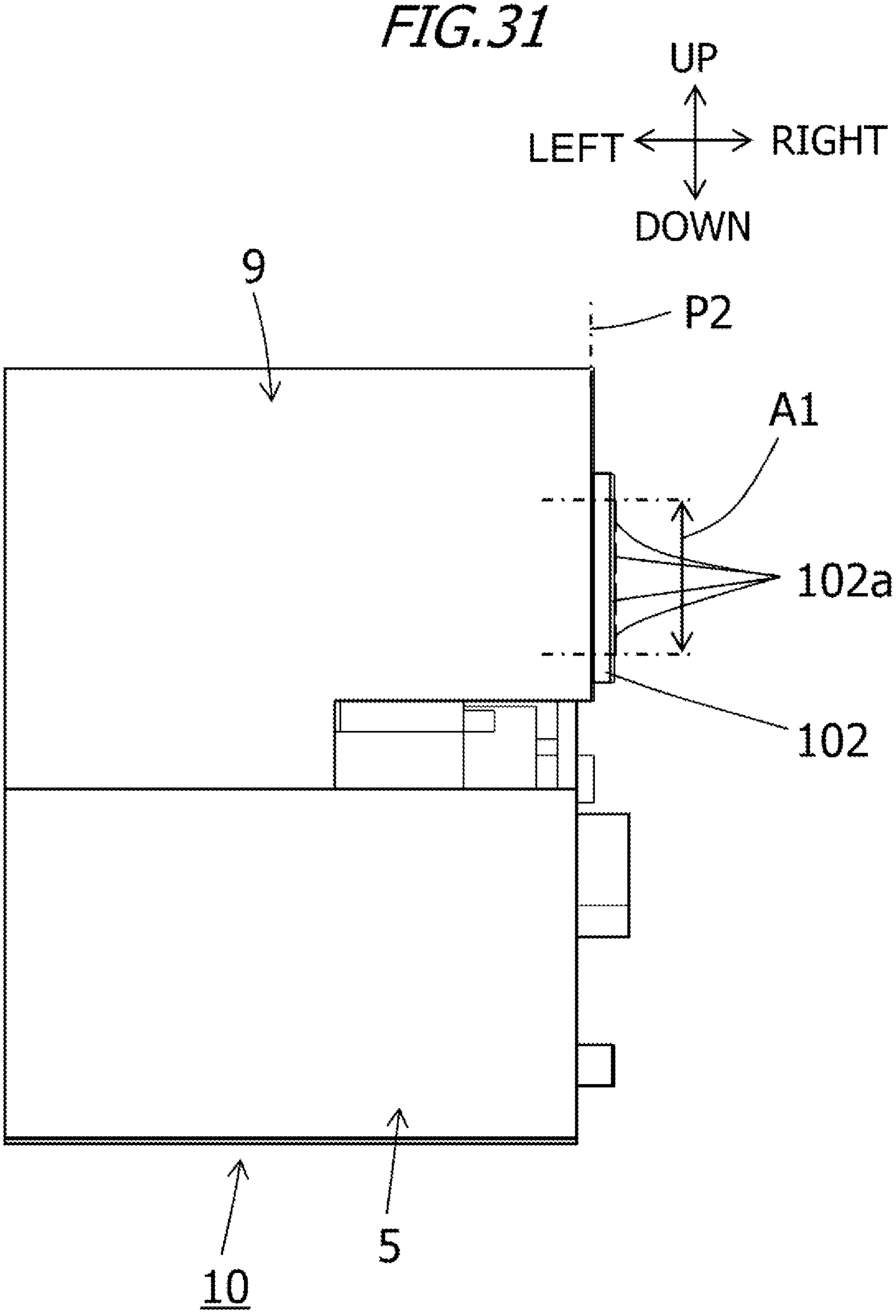
FIG. 31 is a front view of the cartridge unit of the fourth embodiment in an attaching direction.

An arrangement of the memory tags will be described with reference to FIGS. 30 and 31. FIG. 30 is a perspective view of the cartridge unit 10 from diagonally above. FIG. 31 is a front view of the cartridge unit 10 in the attaching direction. Similar to the third embodiment, the toner cartridge 9 has an end surface (right end surface in FIG. 30) extending in a direction crossing the axis direction at an end portion in the axis direction (right end portion in FIG. 30). Similar to the third embodiment, the first memory tag 102 is disposed such that the first contact arrangement surface and the first memory contact surface of the first memory contact 102*a* are directed rightward with respect to the axis direction on the right end surface of the toner cartridge 9. Further, when viewed in the attaching direction of the cartridge unit 10, the first memory tag 102 is disposed such that the first memory contact 102*a* is located on an outermost side of the cartridge unit 10 in the axis direction. To be precise, when the cartridge unit 10 is attached, the first memory contact 102*a* is located on the outermost side of the cartridge unit 10 in the axis direction in an area through which the first memory tag 102 passes. Explaining with reference to FIG. 31, when viewed in the attaching direction of the cartridge unit 10, an area A1 is defined as an area in which the first memory contact 102*a* is provided in the direction perpendicular to the axis direction. In this case, the first memory contact 102*a* is disposed such that the first memory contact 102*a* is located further outward and rightward in the area A1 than an outermost position P2 on a right side of the cartridge unit 10 in the axis direction excluding the first memory tag 102. That is, the first memory contact 102*a* is disposed at the most protruding position of the toner cartridge 9 or the cartridge unit 10 toward the outside in the axis direction. Also, when the cartridge unit 10 is attached, there may be a portion located outside the area through which the first memory tag 102 passes in the axis direction with respect to the first memory contact 102*a*. Further, with respect to the attaching direction of the cartridge unit 10, there may be a portion located outside the first memory contact 102*a* in the axis direction in an area on an upstream side of the first memory tag 102. As can be seen from FIGS. 12, 15A and 30, the first memory tag 102 is attached to the T side holder R93.

Figure 32:
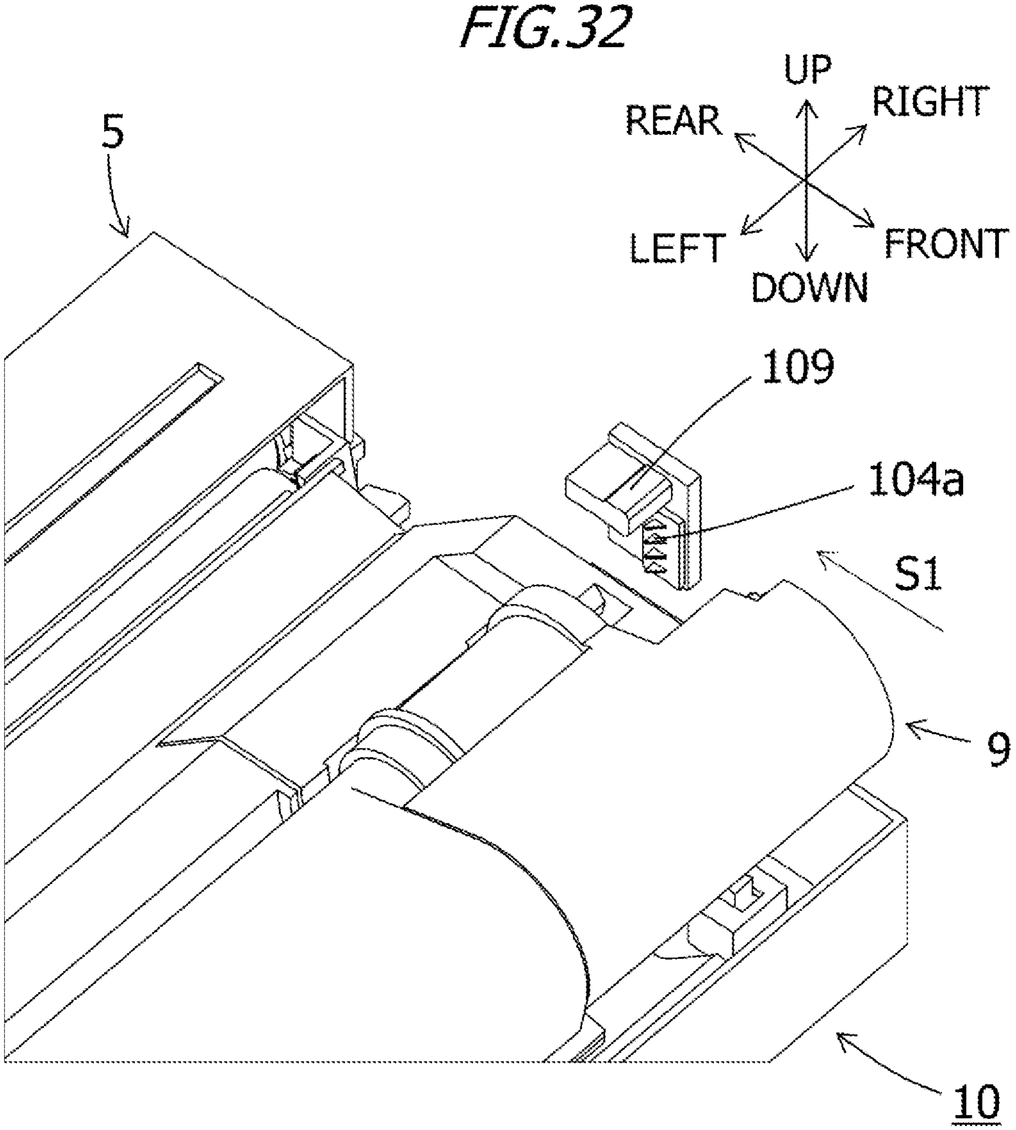
FIG. 32 is a perspective view of the cartridge unit of the fourth embodiment attached to an apparatus main body.
Figure 33:
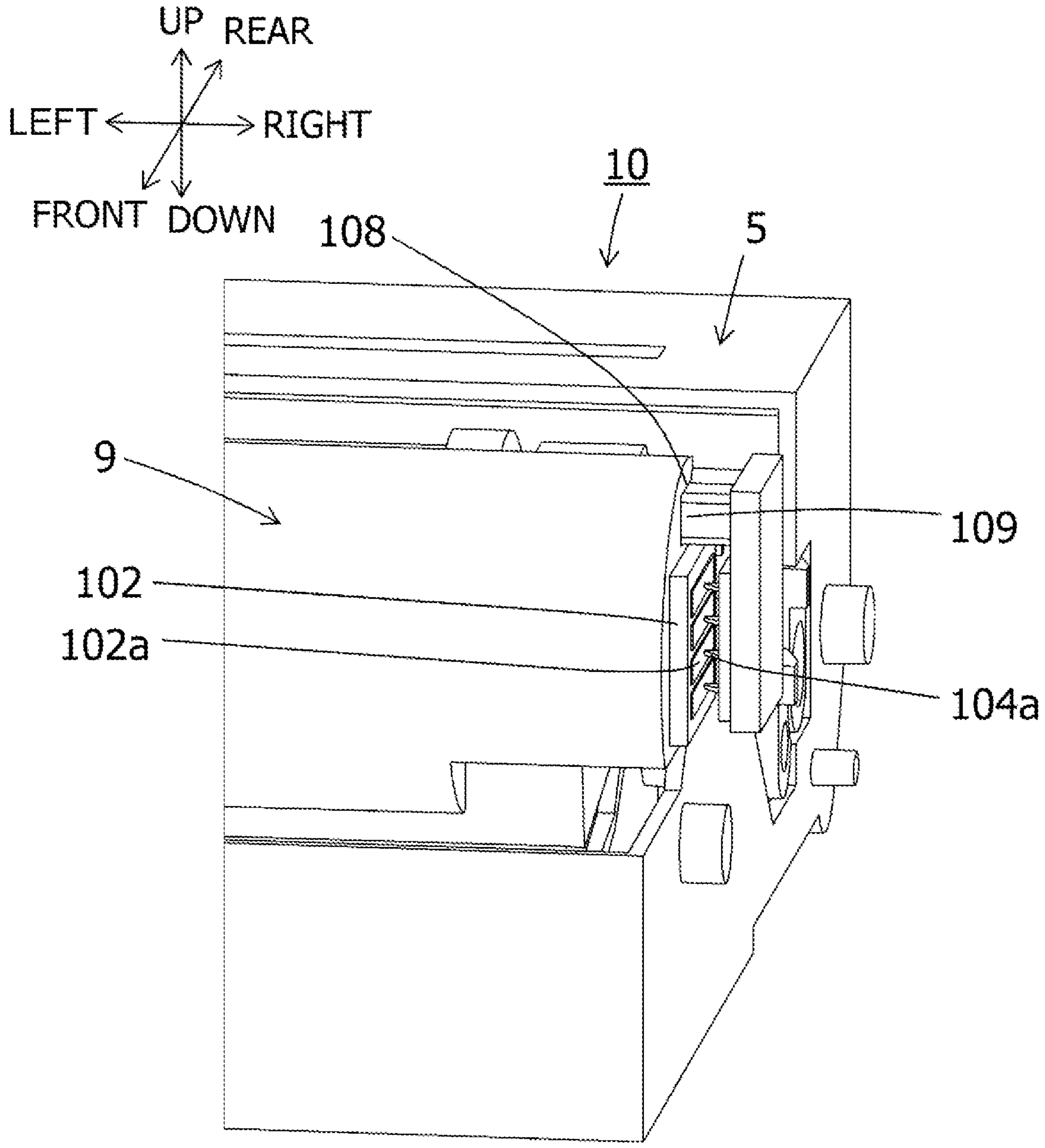
FIG. 33 is a perspective view of the cartridge unit of the fourth embodiment and the first main body memory contact.

FIG. 32 is a perspective view showing a state during attaching when the cartridge unit 10 is attached to the apparatus main body 2. FIG. 33 is a perspective view showing a state in which the cartridge unit 10 is attached to the apparatus main body 2 and the first memory contact 102*a* is in contact with the first main body memory contact 104*a*. In this way, the first memory contact 102*a* and the first main body memory contact 104*a* come into contact with each other through the operation of moving the cartridge unit 10 in the attaching direction (arrow S1 direction) when the cartridge unit 10 is attached. As a result, the first memory contact 102*a* and the first main body memory contact 104*a* are electrically connected to each other. Further, in the fourth embodiment, unlike the third embodiment described above, the apparatus main body 2 is not provided with a mechanism for moving the first main body memory contact 104*a* in the C1 direction (see FIG. 29). However, as in the third embodiment, the apparatus main body 2 may be provided with the mechanism for moving the first main body memory contact 104*a* in the C1 direction (see FIG. 29).

Next, positioning of the first main body memory contacts 104*a* will be described with reference to FIGS. 30, 32, and 33. The first main body memory contacts 104*a* are configured to be movable in the vertical direction. As shown in FIG. 30, the toner cartridge 9 is provided with a positioning groove 108 which is a positioning portion of the first main body memory contacts 104*a*. The positioning groove 18 determines positions of the first main body memory contacts 104*a*. On the other hand, as shown in FIG. 32, a positioned protrusion 109, which is a positioned portion that engages with the positioning groove 108, is provided on the apparatus main body 2 side. The first main body memory contacts 104*a* are positioned with respect to the first memory contacts 102*a* by engaging the positioning groove 108 shown in FIG. 33 with the positioned protrusion 109 in the up and down direction (vertical direction), which is a direction in which a plurality of first memory contacts 102*a* are arranged. The first main body memory contacts 104*a* are positioned with respect to the first memory contacts 102*a* such that the plurality of first memory contacts 102*a* are arranged in a row and a plurality of first main body memory contacts 104*a* are arranged in a row in the vertical direction in the posture when the cartridge unit 10 is used. More specifically, the first main body memory contacts 104*a* are positioned in a direction crossing the attaching direction of the cartridge unit 10 and in a direction crossing the rotational axis direction of the photosensitive drum 61.

Effects of the fourth embodiment will be described below. When viewed in the attaching direction of the cartridge unit 10, the first memory tag 102 is disposed on the toner cartridge 9 such that the first memory contacts 102*a* are located on the outermost side of the cartridge unit 10 in the axis direction. As a result, the first memory contacts 102*a* and the first main body memory contacts 104*a* can be appropriately electrically connected to each other through the operation of attaching the cartridge unit 10 on the apparatus main body 2. According to the present configuration, it is not necessary to provide a moving mechanism for the first main body memory contacts 104*a*, unlike the third embodiment, so that the configuration of the apparatus main body 2 can be simplified.

Also, the toner cartridge 9 is provided with the positioning portion with the first main body memory contacts 104*a*. Thus, the positioning accuracy between the first memory contacts 102*a* and the first main body memory contacts 104*a* is improved, so that transmission of information can be reliably performed. Further, by improving the positioning accuracy, sizes of the first contact arrangement surface and the first memory contact surface of the first memory contact 102*a* can be miniaturized, and thus the entire outer shape of the first memory tag 102 can be miniaturized. In addition, the positioning of the first memory contacts 102*a* and the first main body memory contacts 104*a* is performed in the direction in which the plurality of first memory contacts 102*a* are arranged. As a result, since it is possible to reduce sizes of the plurality of first memory contacts 102*a*, the size of the first memory tag 102 can be reduced more effectively.

Fifth Embodiment

Next, a fifth embodiment will be described. In the fifth embodiment, parts that are different from those of the above-described embodiments will be described in detail. Unless otherwise specified, the fifth embodiment has the same configuration as each embodiment, and thus the same components as those in each embodiment will be denoted by the same reference numerals, and detailed description thereof will be omitted.

Figure 34:
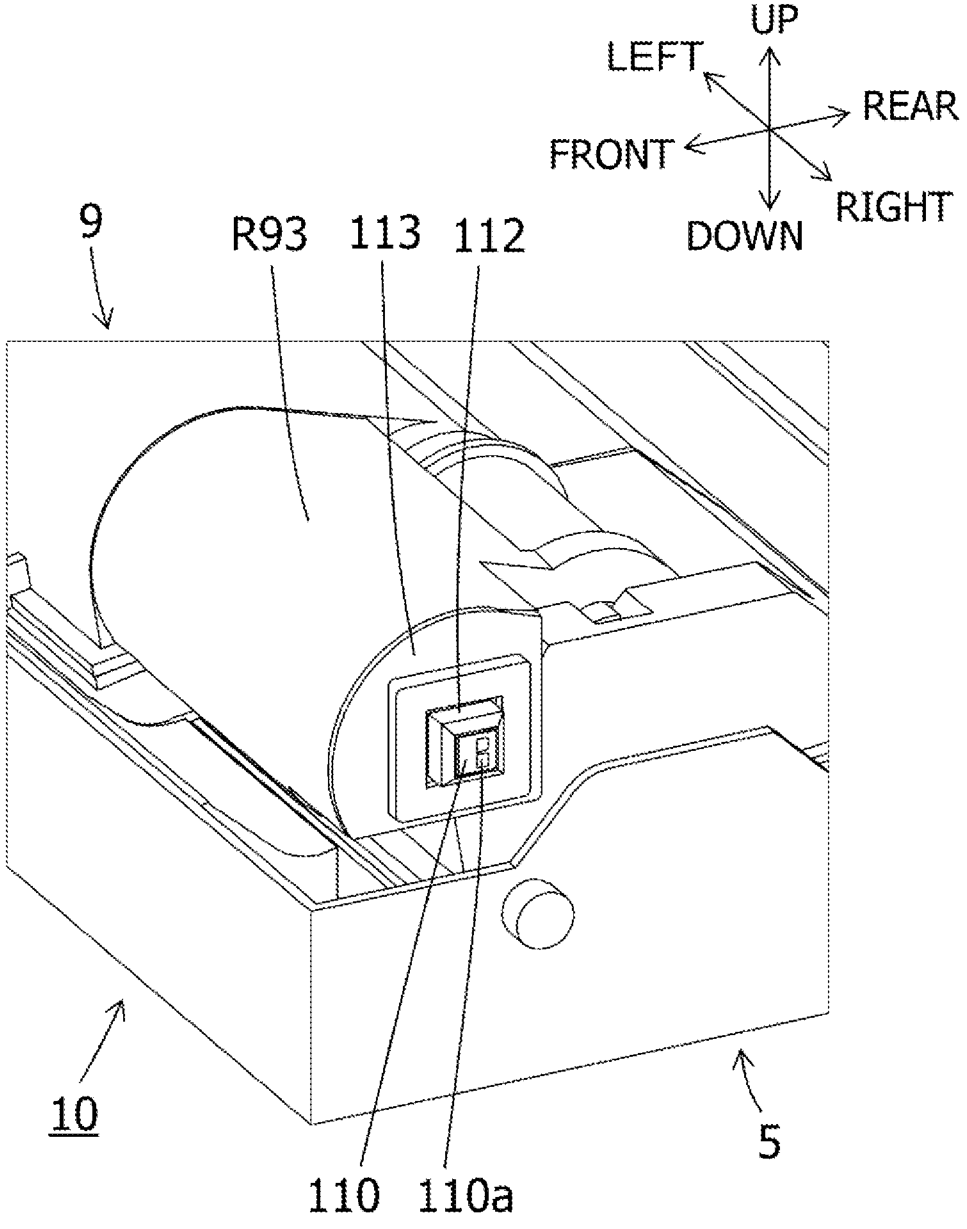
FIG. 34 is a perspective view of a cartridge unit of a fifth embodiment.

An arrangement of the memory tags will be described with reference to FIG. 34. FIG. 34 is a perspective view of the cartridge unit 10 from diagonally above. Similar to the third and fourth embodiments, the toner cartridge 9 has an end surface (right end surface in FIG. 34) extending in the direction crossing the axis direction at the end portion in the axis direction (right end portion in FIG. 34). Similar to the third and fourth embodiments, a first memory tag 110 is disposed on the right end surface of the toner cartridge 9 such that a first contact arrangement surface and a first memory contact surface of a first memory contact 110*a* are directed rightward in the axis direction. That is, in the axis direction, the first contact arrangement surface and the first memory contact surface of the first memory contact 110*a* are disposed to face the outside of the toner cartridge 9. The first memory tag 110 in the fifth embodiment is miniaturized more than the first memory tag 102 in each of the above-described embodiments, and the number of the first memory contacts 110*a* of the fifth embodiment is smaller than the number of the first memory contacts 102*a*. Further, the first memory tag 110 of the fifth embodiment can store and transmit various information like the first memory tag 102.

Support of Memory Tag

Figure 35:
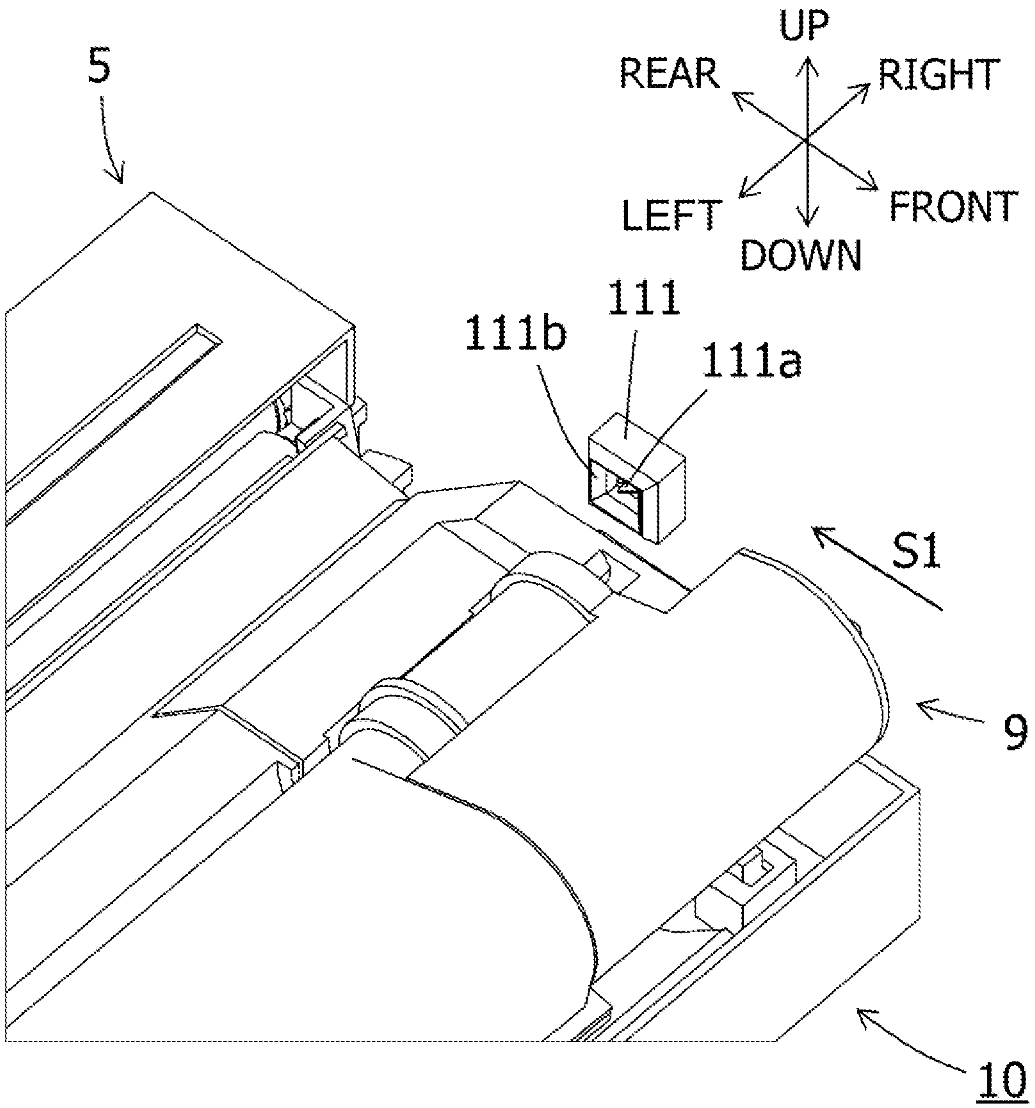
FIG. 35 is a perspective view of the cartridge unit of the fifth embodiment attached to the apparatus main body.
Figure 36:
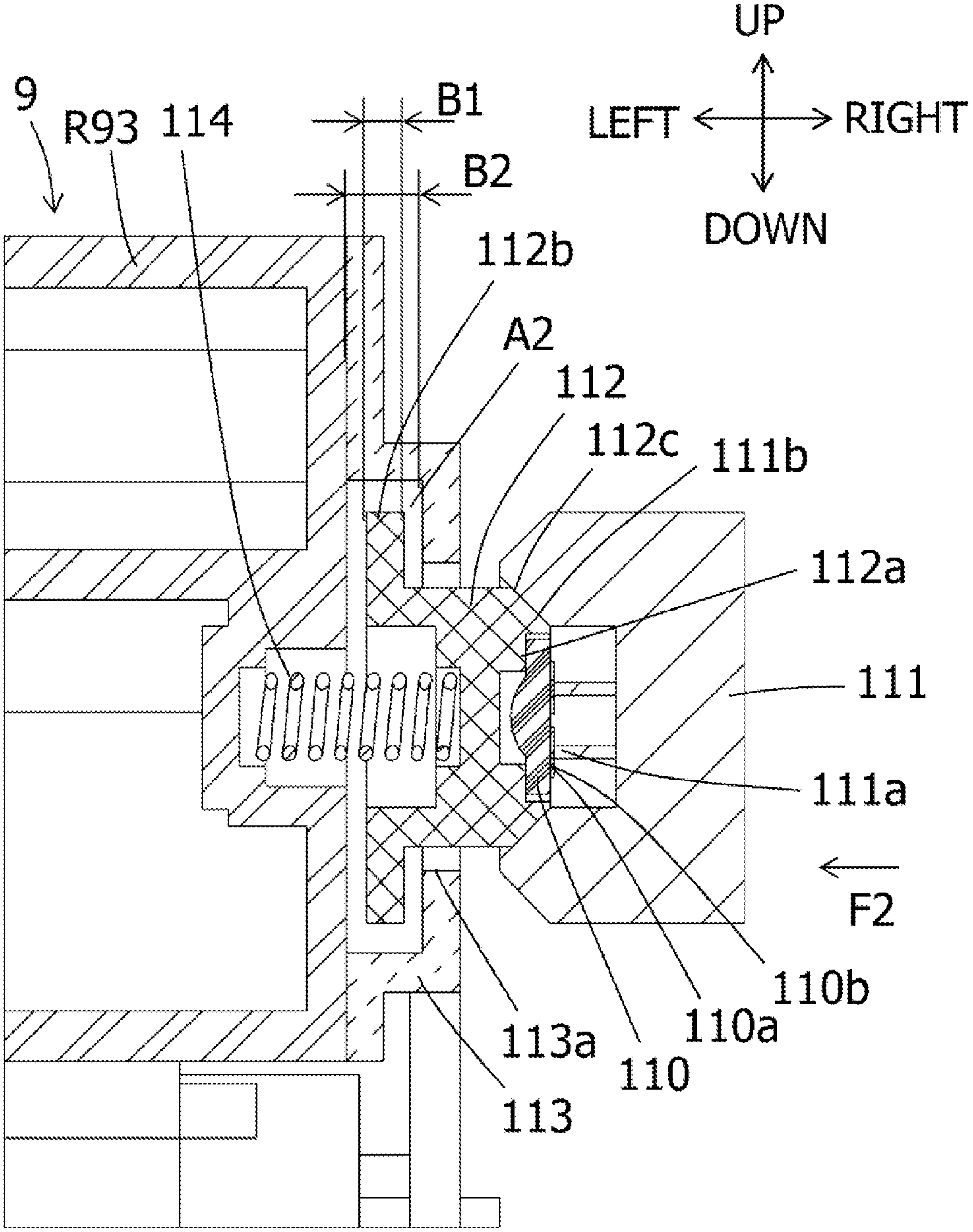
FIG. 36 is a cross-sectional view of the surroundings of a first memory tag of the fifth embodiment.

A support configuration of the first memory tag 110 will be described with reference to FIGS. 35 and 36. FIG. 35 is a perspective view showing a state during attaching when the cartridge unit 10 is attached to the apparatus main body 2. FIG. 36 is a cross-sectional view showing a state in which the cartridge unit 10 is attached to the apparatus main body 2 and the first memory contact 110*a* is in contact with a first main body memory contact 111*a*.

As shown in FIG. 36, the first memory tag 110 is supported by a memory support base 112 serving as a supporting portion using a fixing means such as double-sided tape. The memory support base 112 has a fixing portion 112*a* for fixing the first memory tag 110 and a restricting portion 112*b* formed to protrude in the up and down direction and the front to rear direction. The toner cartridge 9 has the T side holder R93 and a memory cover 113 fixed to the T side holder R93 using a fixing means such as a screw (not shown). The T side holder R93 and the memory cover 113 are examples of a first frame.

The first memory tag 110 supported by the memory support base 112 is exposed to the outside through a hole portion 113*a* formed in the memory cover 113. By forming the hole portion 113*a* such that the hole portion 113*a* is larger than the outer shape of the memory support base 112, the memory support base 112 can move in the up and down direction and the front to rear direction with respect to the side holder R93 and the memory cover 113. The restricting portion 112*b* of the memory support base 112 is disposed in a space A2 provided between the T side holder R93 and the memory cover 113. In the axis direction, a width B1 of the restricting portion 112*b* in the left to right direction is formed to be smaller than a width B2 of a space between the T side holder R93 and the memory cover 113.

A compression spring 114 is provided between the memory support base 112 and the T side holder R93 to press the memory support base 112 rightward. In a state in which the cartridge unit 10 is not attached to the apparatus main body 2, the restricting portion 112*b* of the memory support base 112 comes into contact with an inner surface of the memory cover 113 due to a biasing force of the compression spring 114, and thus rightward movement of the memory support base 112 is restricted. In a case in which a leftward external force F2 larger than the biasing force of the compression spring 114 is generated on the memory support base 112, the restricting portion 112*b* of the memory support base 112 comes into contact with an outer surface of the T side holder R93, and thus leftward movement of the memory support base 112 is restricted. On the other hand, movement of the memory support base 112 in the up and down direction and the front to rear direction is restricted when the hole portion 113*a* of the memory cover 113 comes into contact with the memory support base 112.

As described above, the memory support base 112 is movable with respect to the toner cartridge 9 in three directions of the up and down direction, the front to rear direction, and the left to right direction, but the memory support base 112 is supported such that the movement is restricted by a predetermined amount of movement. For example, the axis direction is defined as a first direction (left to right direction), a direction perpendicular to the first direction (left to right direction) is defined as the second direction (up and down direction), and a direction perpendicular to the second direction (up and down direction) is defined as a third direction (front to rear direction). Further, for example, the axis direction is defined set to the first direction (left to right direction), a direction perpendicular to the first direction (left to right direction) is defined as the second direction (front to rear direction), and a direction perpendicular to the second direction (front to rear direction) is defined as the third direction (up and down direction). In these cases, the memory support base 112 is configured to be movable in each direction of the first direction, the second direction, and the third direction with respect to the side holder R93 and the memory cover 113.

Next, a positioning configuration of the first memory tag 110 will be described with reference to FIGS. 35 and 36. The apparatus main body 2 is provided with the first memory contact holder 111 that supports the first main body memory contact 111*a*. An inclined inner wall surface 111*b* is formed on the first memory contact holder 111 to surround the first main body memory contact 111*a*. The memory support base 112 has an inclined surface 112*c* formed to come into contact with the inclined inner wall surface 111*b* in order to position the memory support base 112 with respect to the first memory contact holder 111. The inclined surface 112*c* is formed to surround the fixing portion 112*a* of the memory support base 112.

When the cartridge unit 10 is attached to the apparatus main body 2, as shown in FIG. 36, the biasing force of the compression spring 114 causes the inclined surface 112*c* of the memory support base 112 to come into contact with the inclined inner wall surface 111*b* of the first memory contact holder 111. In addition, with the first memory contact 110*a* positioned with respect to the first main body memory contact 111*a*, the first memory contact 110*a* comes into contact with the first main body memory contact 111*a*. At this time, a gap is formed between the memory support base 112 and the hole portion 113*a* of the memory cover 113 in the up and down direction and the front to rear direction. Further, gaps are formed in the left to right direction between the restricting portion 112*b* of the memory support base 112 and the T side holder R93, and between the restricting portion 112*b* and the memory cover 113. As a result, the memory support base 112 is positioned with respect to the first memory contact holder 111 in each direction of the up and down direction, the front to rear direction, and the left to right direction. As described above, the first memory contact 110*a* and the first main body memory contact 111*a* are accurately positioned with each other in three directions of the up and down direction, the front to rear direction, and the left to right direction.

Effects of the fifth embodiment will be described below. The memory support base 112 of the first memory tag 110 is supported on the toner cartridge 9 to be movable in three directions of the up and down direction, the front to rear direction, and the left to right direction. In addition, when the cartridge unit 10 is attached, the memory support base 112 on which the first memory tag 110 is supported is positioned in the three directions with respect to the first memory contact holder 111. That is, the first memory contact 110*a* and the first main body memory contact 111*a* are accurately positioned with each other in the three directions. As a result, the positioning accuracy between the first memory contact 110*a* and the first main body memory contact 111*a* can be improved in the up and down direction and the front to rear direction in which the first contact arrangement surface and a first memory contact surface 110*b* of the first memory contact 110*a* extend. For this reason, the first memory contact 110*a* and the first main body memory contact 111*a* can be reliably and electrically connected, and thus the certainty of information transmission can be improved. Further, since the sizes of the first contact arrangement surface and the first memory contact surface 110*b* can be reduced by improving the positioning accuracy, the first memory tag 110 can be miniaturized.

Further, the positioning accuracy between the first memory contact 110*a* and the first main body memory contact 111*a* can be improved in the left to right direction that is the normal direction of the first contact arrangement surface and the first memory contact surface 110*b* of the first memory contact 110*a*. For that reason, since the contact pressure between the first memory contact 110*a* and the first main body memory contact 111*a* can be made appropriate to inhibit damage to the mutual contacts when they are contacted, the certainty of information transmission can be improved.

Sixth Embodiment

Next, a sixth embodiment will be described. In the sixth embodiment, parts that are different from those of the above-described embodiments will be described in detail. Unless otherwise specified, the sixth embodiment has the same configuration as each embodiment, and thus the same components as those in each embodiment will be denoted by the same reference numerals, and detailed description thereof will be omitted.

Figure 37:
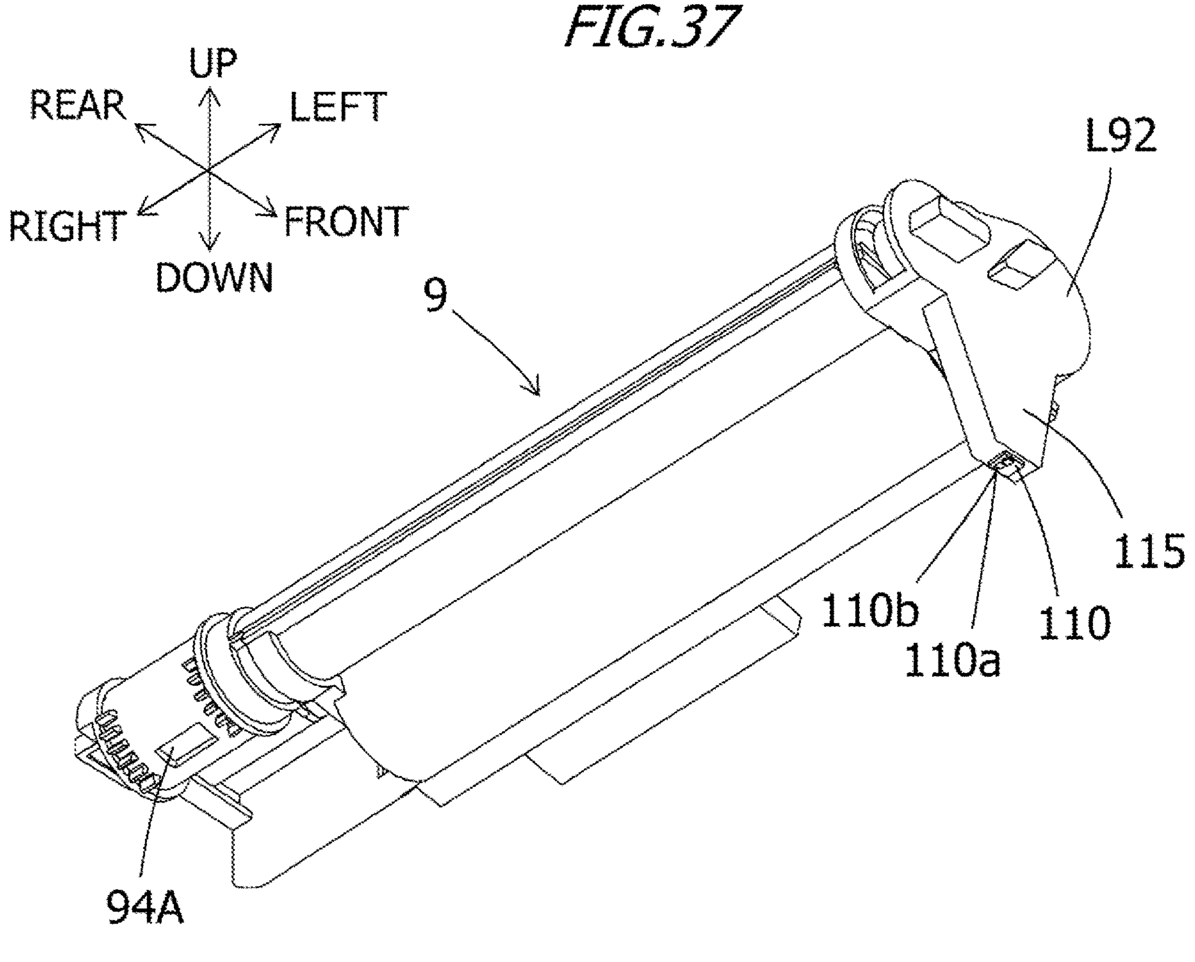
FIG. 37 is a perspective view of a toner cartridge of a sixth embodiment.
Figure 38:
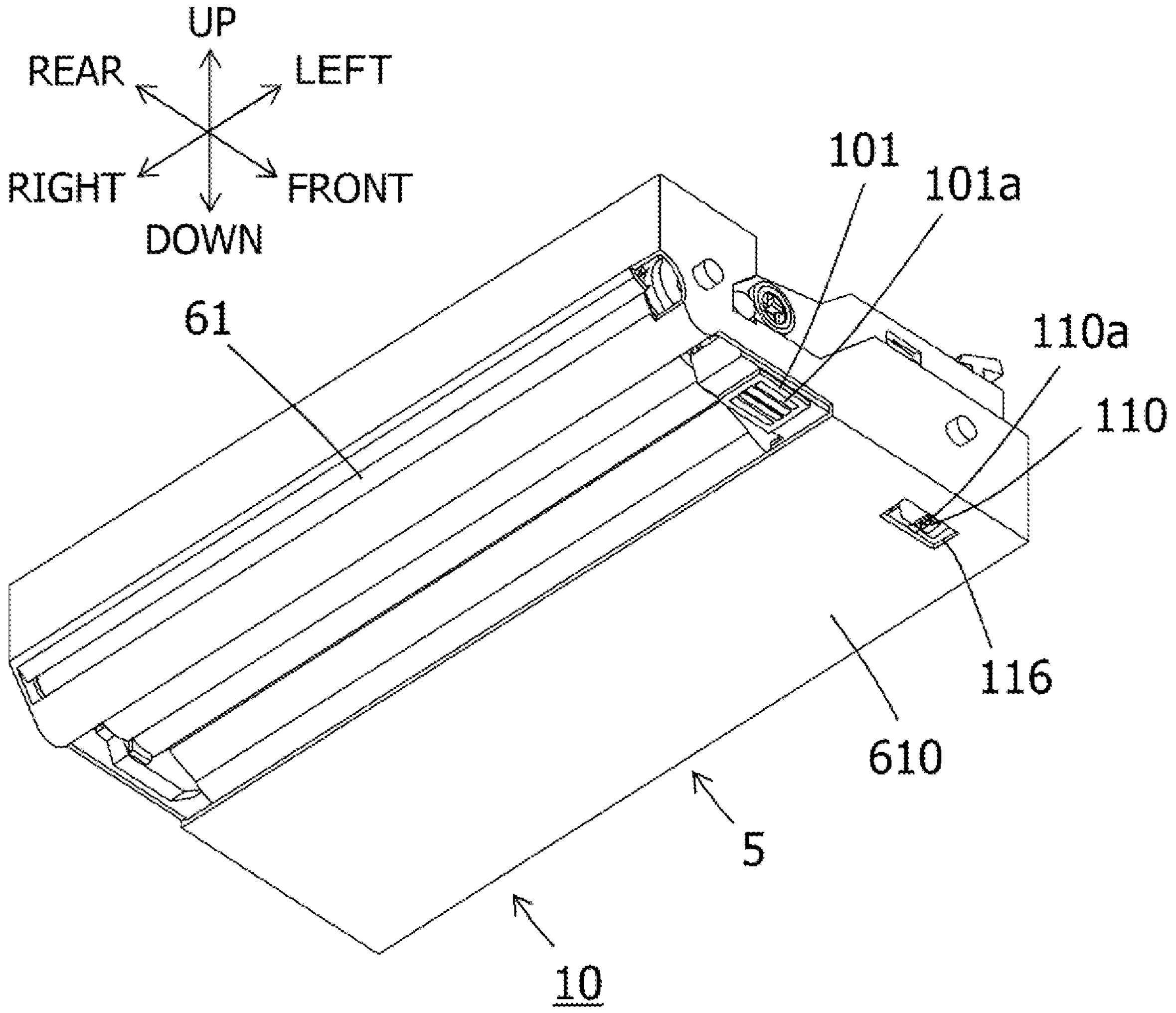
FIG. 38 is a perspective view of a cartridge unit of the sixth embodiment.

An arrangement of the memory tags will be described with reference to FIGS. 37 and 38. FIGS. 37 and 38 are perspective views of the toner cartridge 9 and the cartridge unit 10 from diagonally below. A protruded portion 115 projecting downward is formed on the T side holder L92 of the toner cartridge 9. The first memory tag 110 is disposed at a tip of the protruded portion 115 such that the first contact arrangement surface and the first memory contact surface 110*b* of the first memory contact 110*a* face downward. The first memory tag 110 is provided on a left side of the toner cartridge 9. Further, the toner cartridge 9 is provided with the above-mentioned discharge opening 94A on the right side of the toner cartridge 9. Therefore, in the longitudinal direction (axis direction) of the toner cartridge 9, the discharge opening 94A is disposed on one end side with respect to the center of the toner cartridge 9, and the first memory tag 110 is disposed on the other end side opposite to the one end side with respect to the center of the toner cartridge 9.

FIG. 38 shows a state of the cartridge unit 10 in which the toner cartridge 9 is attached to the process cartridge 5. The first memory tag 110 is disposed such that the first memory contact 110*a* is exposed to the outside from an opening portion 116 formed in the frame 610 of the process cartridge 5. As shown in FIG. 38, the second memory tag 101 and the first memory tag 110 are provided on the left side of the lower surface of the cartridge unit 10.

Figure 39:
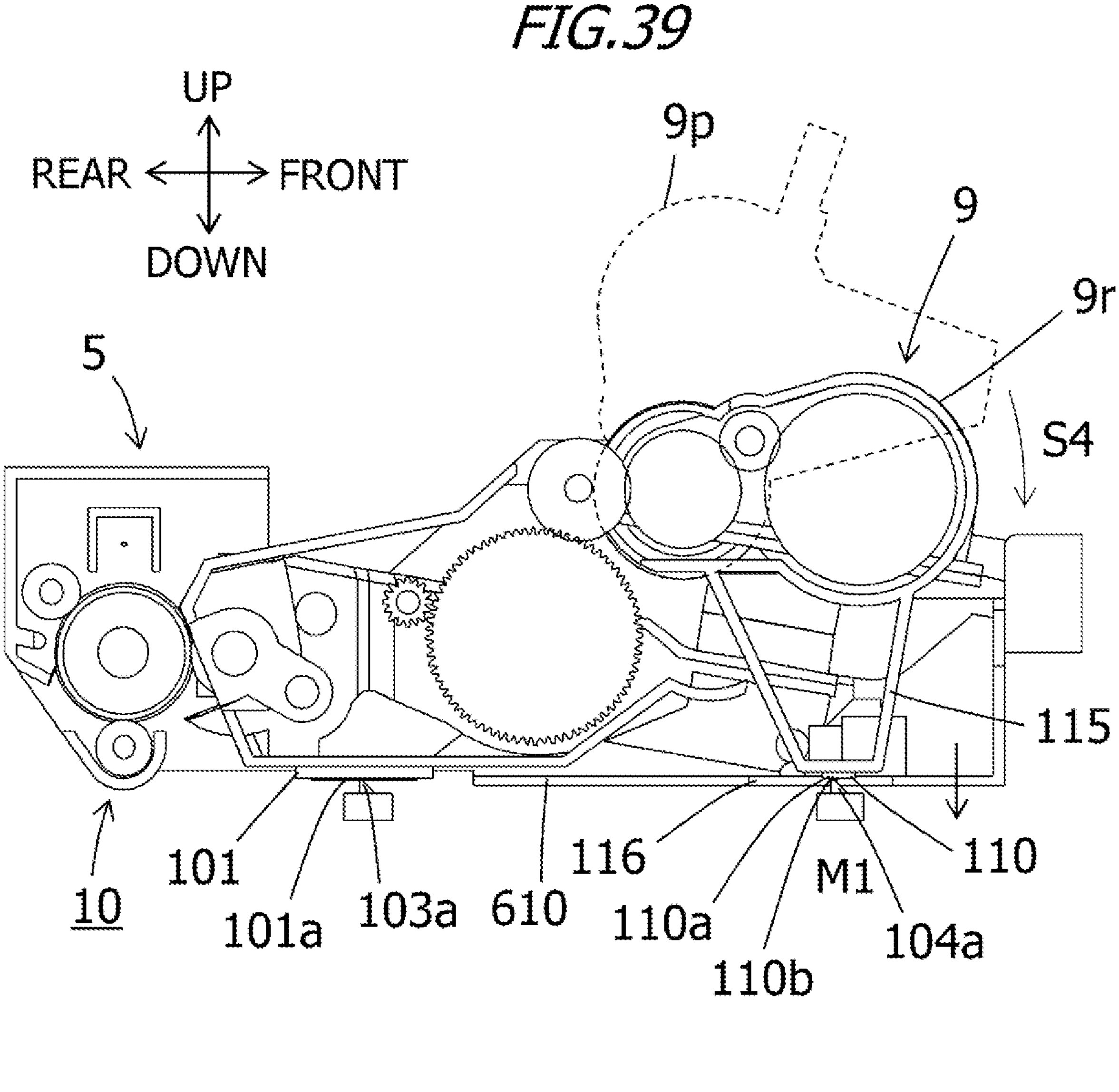
FIG. 39 is a cross-sectional view of the cartridge unit of the sixth embodiment.

Further, an arrangement of the first memory tag 110 will be described with reference to FIG. 39. FIG. 39 is a cross-sectional view of the cartridge unit 10 from a left side.

As described above, the toner cartridge 9 is attached to the process cartridge 5 by rotating the toner cartridge 9 with respect to the process cartridge 5. The position 9*p* of the toner cartridge 9 before rotation is shown by a dotted line in FIG. 39. In addition, the rotating direction of the toner cartridge 9 is indicated by arrow S4 in FIG. 39. The rotating direction S4 of the toner cartridge 9 is the attaching direction of the toner cartridge 9 with respect to the process cartridge 5. FIG. 39 shows the position 9*r* of the toner cartridge 9 when the toner cartridge 9 is rotated and the toner cartridge 9 is attached to the process cartridge 5. With the toner cartridge 9 in contact with the process cartridge 5, the toner cartridge 9 moves from the position 9*p* (first position) to the position 9*r* (second position), and the toner cartridge 9 is positioned on the process cartridge 5. The position 9*r* (second position) of the toner cartridge 9 when the toner cartridge 9 is positioned with respect to the process cartridge 5 is the fully attached position or the positioning position of the toner cartridge 9 with respect to the process cartridge 5.

The first memory tag 110 has the first contact arrangement surface on which the first memory contact 110*a* is disposed. The apparatus main body 2 has the first main body memory contact 104*a* that comes into contact with the first memory contact 110*a* when the cartridge unit 10 is attached to the apparatus main body 2. The first memory contact 110*a* has the first memory contact surface that comes into contact with the first main body memory contact 104*a*. The first memory contact 110*a* has the first memory contact surface 110*b* extending parallel to the front to rear direction and the left to right direction. The first memory contact surface 110*b* of the first memory contact 110*a* may be formed at the same height as the first contact arrangement surface of the first memory tag 110. There may be a step between the first contact arrangement surface of the first memory tag 110 and the first memory contact surface 110*b* of the first memory contact 110*a*. The first contact arrangement surface of the first memory tag 110 and the first memory contact surface 110*b* of the first memory contact 110*a* are exposed from the opening portion 116 of the process cartridge 5.

On the first contact arrangement surface, the normal direction M1 of the first contact arrangement surface and the first memory contact surface 110*b* facing in the direction in which the first memory contact 110*a* is exposed faces in the same direction as the rotating direction S4. That is, the first contact arrangement surface and the first memory contact surface 110*b* are disposed to face in the same direction as the direction in which the toner cartridge 9 is attached (rotating direction S4). Therefore, the normal direction M1 of the first contact arrangement surface and the first memory contact surface 110*b* faces in the direction (rotating direction S4) in which the toner cartridge 9 is directed from the position 9*p* (first position) to the position 9*r* (second position). In other words, the first contact arrangement surface of the first memory tag 110 and the first memory contact surface 110*b* of the first memory contact 110*a* faces in the direction (rotating direction S4) in which the toner cartridge 9 is directed from the position 9*p* (first position) to the position 9*r* (second position).

Figure 40:
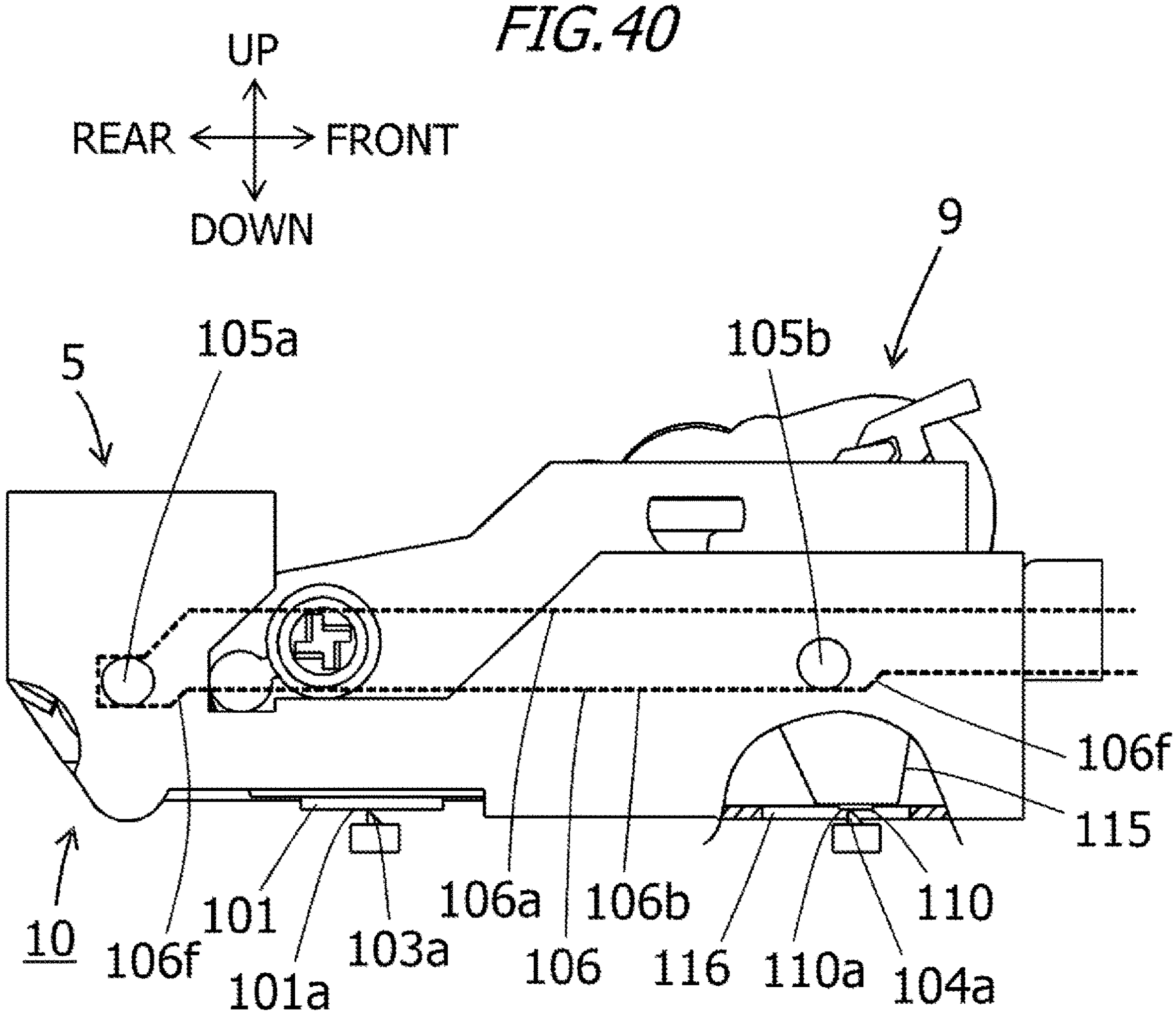
FIG. 40 is a side view of the cartridge unit of the sixth embodiment.

Next, attaching the cartridge unit 10 on the apparatus main body 2 will be described with reference to FIGS. 39 and 40. FIG. 40 is a side view showing a relationship between the cartridge unit 10 and an attaching guide. When the cartridge unit 10 is attached to the apparatus main body 2, as shown in FIG. 39, the second memory contact 101*a* of the second memory tag 101 is electrically connected to a second main body memory contact 103*a* on the apparatus main body 2 side, and thus transmission of information is performed. Further, when the cartridge unit 10 is attached to the apparatus main body 2, as shown in FIG. 39, the first memory contact 110*a* of the first memory tag 110 is electrically connected to the first main body memory contact 104*a* on the apparatus main body 2 side, and thus transmission of information is performed.

In FIG. 40, the guide groove 106, which is a guide for attaching the cartridge unit 10 to the apparatus main body 2, is shown by a dotted line. The positioned protrusions 105*a* and 105*b* provided on the cartridge unit 10 are guided by the guide groove 106, and the cartridge unit 10 is attached to the apparatus main body 2. The guide groove 106 is formed in a groove shape through which the positioned protrusions 105*a* and 105*b* can pass and has the upper surface 106*a* and the lower surface 106*b*. An inclined surface 106*f* for guiding the cartridge unit 10 downward as the cartridge unit 10 is attached to a deeper side of the apparatus main body 2 when the cartridge unit 10 is attached is formed on the lower surface 106*b* of the guide groove 106. By guiding the cartridge unit 10 downward using the inclined surface 106*f* of the guide groove 106, the second memory contact 101*a* and the first memory contact 110*a* come into contact with the second main body memory contact 103*a* and the first main body memory contact 104*a*, respectively.

Effects of the sixth embodiment will be described below. Effects of the arrangement of the first memory tag 110 in the axis direction will be described. The first memory tag 110 is provided on the side opposite to the discharge opening 94A of the toner cartridge 9 in the axis direction. This makes it possible to prevent toner contamination of the first memory contact 110*a*.

Next, effects of the arrangement of the first memory tag 110 in the cross-sectional direction perpendicular to the axis direction will be described. The first contact arrangement surface and the first memory contact surface 110*b* are disposed to face in the same direction as the direction in which the toner cartridge 9 is attached (rotating direction S4). The frame 610 of the process cartridge 5 to which the toner cartridge 9 is attached is located in the attaching direction of the toner cartridge 9. The opening portion 116 is formed in the frame 610 in order to expose the first memory contact surface 110*b*, which faces in the attaching direction of the toner cartridge 9, from the frame 610 to the outside. As described above, the first memory contact surface 110*b* is exposed downward from the cartridge unit 10 so that it can come into contact with the first main body memory contact 104*a* of the apparatus main body 2.

Further, as described above, the cartridge unit 10 is guided rearward and downward by the attaching guide (guide groove 106) when attached to the apparatus main body 2 and is attached to the apparatus main body 2. Since the first memory contact surface 110*b* is disposed on the lower surface of the cartridge unit 10, the first memory contact surface 110*b* comes into contact with the first main body memory contact 104*a* due to the operation when the cartridge unit 10 is attached. As a result, the first memory contact 110*a* and the first main body memory contact 104*a* can be satisfactorily electrically connected to each other. According to the configuration of the sixth embodiment, since it is unnecessary to provide the apparatus main body 2 with a mechanism for moving the first main body memory contact 104*a* in order to bring the first main body memory contact 104*a* into contact with the first memory contact surface 110*b*, the configuration of the apparatus main body 2 can be simplified.

Seventh Embodiment

Next, a seventh embodiment will be described. In the seventh embodiment, parts that are different from those of the above-described embodiments will be described in detail. Unless otherwise specified, the seventh embodiment has the same configuration as each embodiment, and thus the same components as those in each embodiment will be denoted by the same reference numerals, and detailed description thereof will be omitted.

Figure 41:
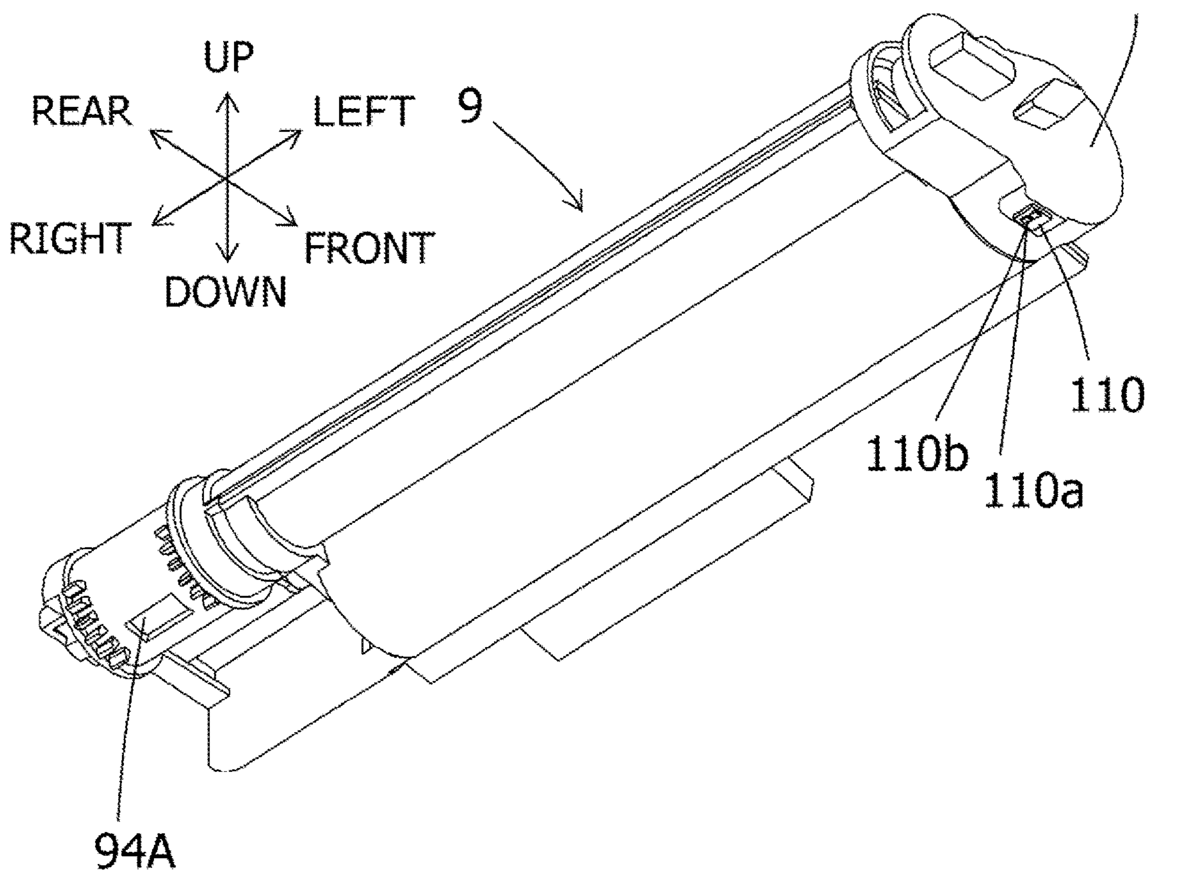
FIG. 41 is a perspective view of a toner cartridge of a seventh embodiment.
Figure 42:
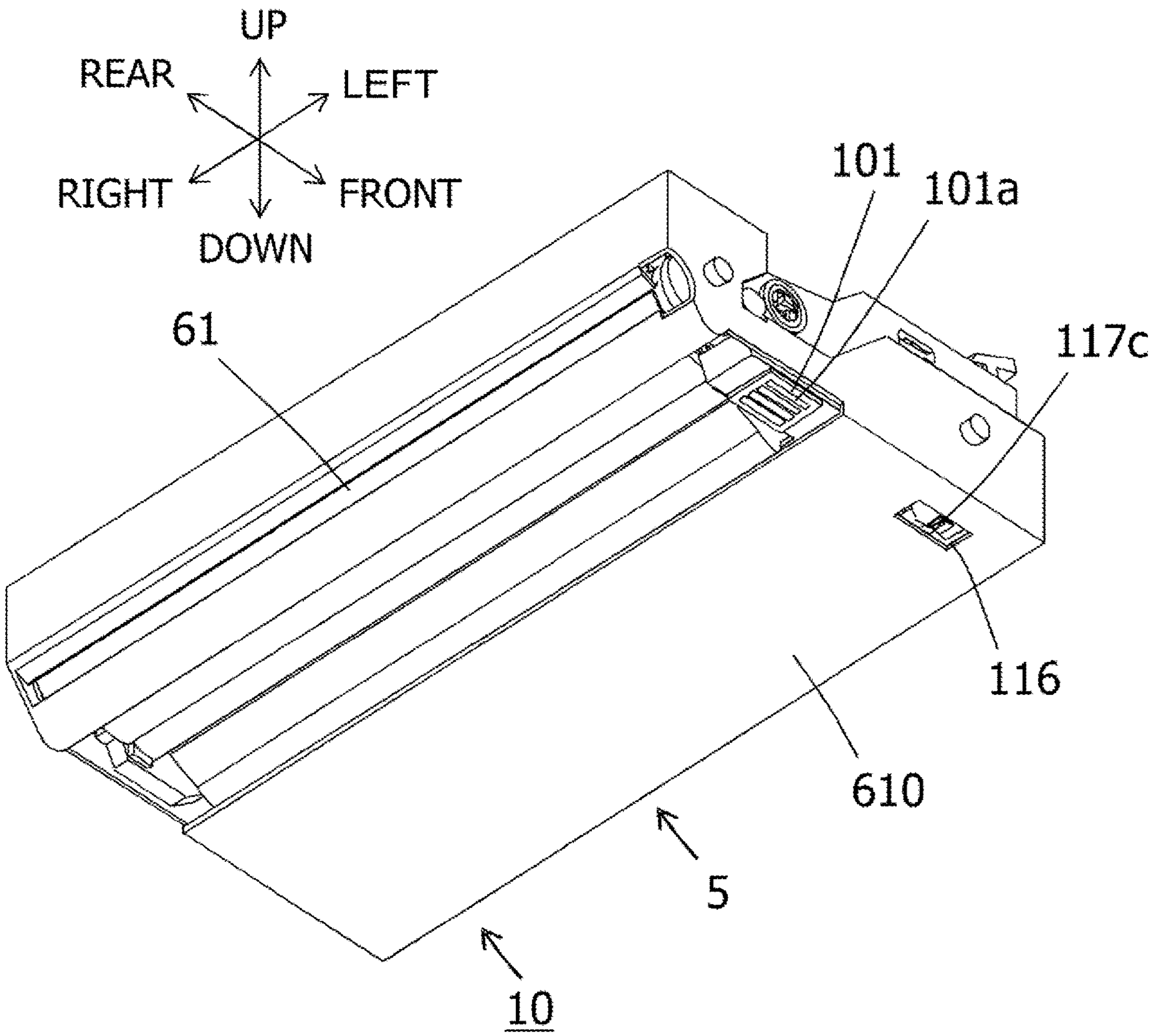
FIG. 42 is a perspective view of a cartridge unit of the seventh embodiment.

An arrangement of the memory tags will be described with reference to FIGS. 41 and 42. FIGS. 41 and 42 are perspective views of the toner cartridge 9 and the cartridge unit 10 from diagonally below. As shown in FIG. 41, the first memory tag 110 is disposed on the T side holder L92 of the toner cartridge 9 such that the first contact arrangement surface and the first memory contact surface 110*b* of the first memory contact 110*a* face downward. The first memory tag 110 is provided on a left side of the toner cartridge 9. Further, the toner cartridge 9 is provided with the above-mentioned discharge opening 94A on a right side of the toner cartridge 9. Therefore, in the longitudinal direction (axis direction) of the toner cartridge 9, the discharge opening 94A is disposed on one end side with respect to the center of the toner cartridge 9, and the first memory tag 110 is disposed on the other end side opposite to the one end side with respect to the center of the toner cartridge 9.

As shown in FIG. 42, the second memory tag 101 is provided on a left side of the lower surface of the cartridge unit 10. Further, a second relay contact 117*c*, which is electrically connected to the first main body memory contact 104*a* when the cartridge unit 10 is attached to the apparatus main body 2, is provided on a left side of the lower surface of the cartridge unit 10. Details of the second relay contact 117*c* will be described later.

Relay Contact of Memory Tag

Figure 43:
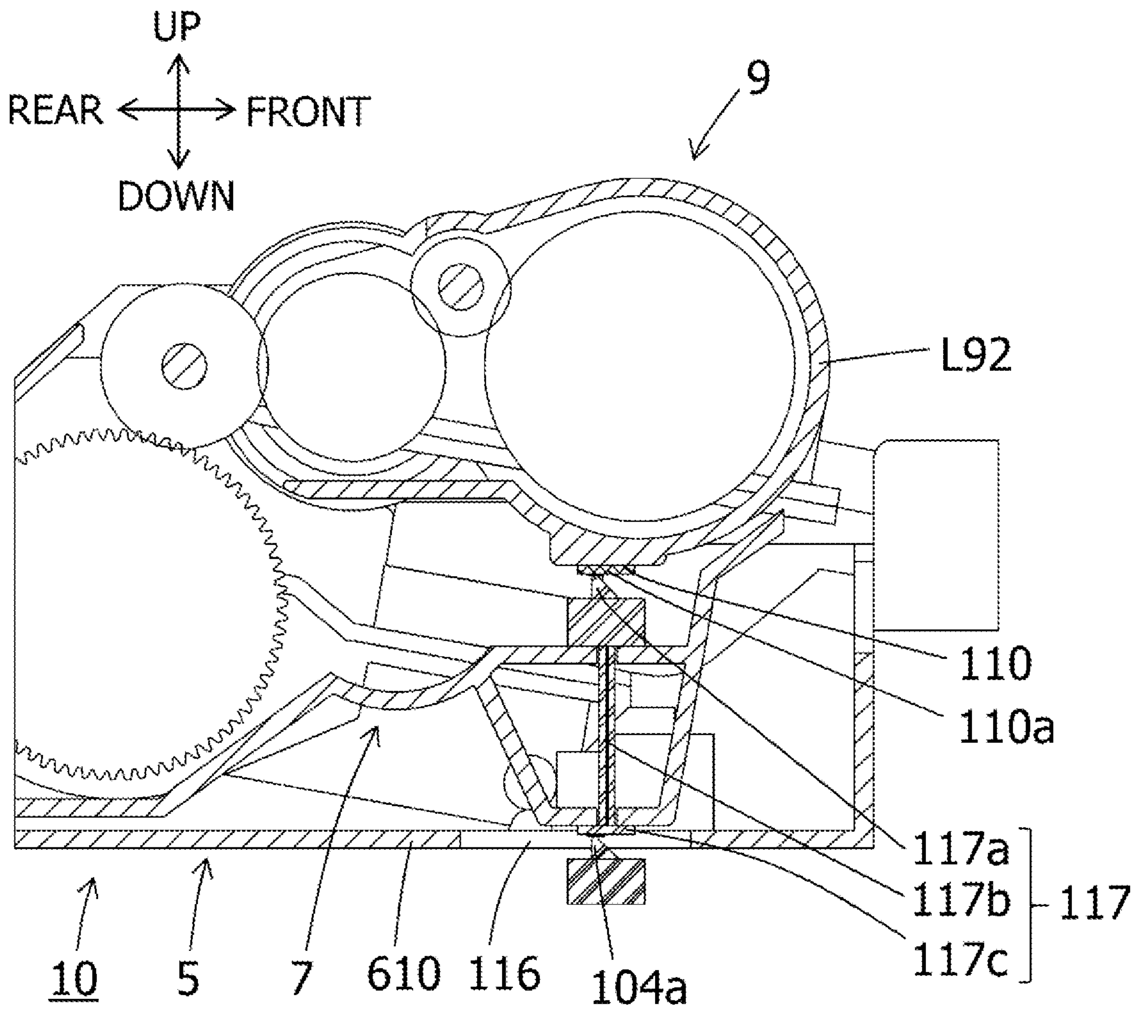
FIG. 43 is a cross-sectional view of the cartridge unit of the seventh embodiment.

A relay contact 117 of the memory tag will be described with reference to FIG. 43. FIG. 43 is a cross-sectional view of the cartridge unit 10. FIG. 43 shows a state in which the toner cartridge 9 is attached to the developing unit 7 of the process cartridge 5 constituting the cartridge unit 10, and further shows a state in which the cartridge unit 10 is attached to the apparatus main body 2. The relay contact 117 is provided in the developing unit 7. The relay contact 117 has a first relay contact 117*a* that is a connection portion with the first memory contact 110*a*, an extension portion 117*b* extending downward from the first relay contact 117*a*, and the second relay contact 117*c* that is a connection portion with the apparatus main body 2. The first relay contact 117*a* and the second relay contact 117*c* are electrically connected to each other by the extension portion 117*b*.

The second relay contact 117*c* is disposed such that the second relay contact 117*c* is exposed to the outside from the opening portion 116 formed in the frame 610 of the process cartridge 5. Thus, the second relay contact 117*c* and the first main body memory contact 104*a* of the apparatus main body 2 can be electrically connected to each other. As described above, the first memory contact 110*a* is electrically connected to the first main body memory contact 104*a* via the relay contact 117. As a result, information stored in the first memory tag 110 can be transmitted to the apparatus main body 2.

Effects of the seventh embodiment will be described below. Effects of the arrangement of the first memory contact 110*a* and the relay contact 117 in the axis direction will be described. The first memory contact 110*a* and the relay contact 117 are provided on the side opposite to the discharge opening 94A of the toner cartridge 9 in the axis direction. As a result, toner contamination of the first memory contact 110*a* and the relay contact 117 can be prevented, and transmission of information to the apparatus main body 2 can be reliably performed.

Next, effects of the arrangement of the second relay contact 117*c* in the cross-sectional direction perpendicular to the axial direction will be described. The second relay contact 117*c* is disposed on the lower surface of the cartridge unit 10. For that reason, as in the case of the sixth embodiment described above, the second relay contact 117*c* and the first main body memory contact 104*a* can be satisfactorily electrically connected due to the operation when the cartridge unit 10 is attached.

Next, effects of providing the relay contact 117 will be described. In the sixth embodiment described above, the toner cartridge 9 is provided with the protruded portion 115 in order to expose the first memory contact 110*a* disposed in the toner cartridge 9 to the outside through the opening portion 116 formed in the frame 610 of the process cartridge 5. In addition, the first memory tag 110 is disposed at the tip of the protruded portion 115. The reason for the arrangement in this way is that the toner cartridge 9 and the opening portion 116 are separated from each other. In the seventh embodiment, since the relay contact 117 is provided between the toner cartridge 9 and the opening portion 116, it is unnecessary to provide the protruded portion 115 on the toner cartridge 9, and the toner cartridge 9 can be miniaturized. Further, by miniaturizing the toner cartridge 9, it is possible to reduce costs including distribution costs of the toner cartridge 9 which is shipped and sold as a single product.

Eighth Embodiment

Next, an eighth embodiment will be described. In the eighth embodiment, parts that are different from those of the above-described embodiments will be described in detail. Unless otherwise specified, the eighth embodiment has the same configuration as each embodiment, and thus the same components as those in each embodiment will be denoted by the same reference numerals, and detailed description thereof will be omitted.

Figure 44:
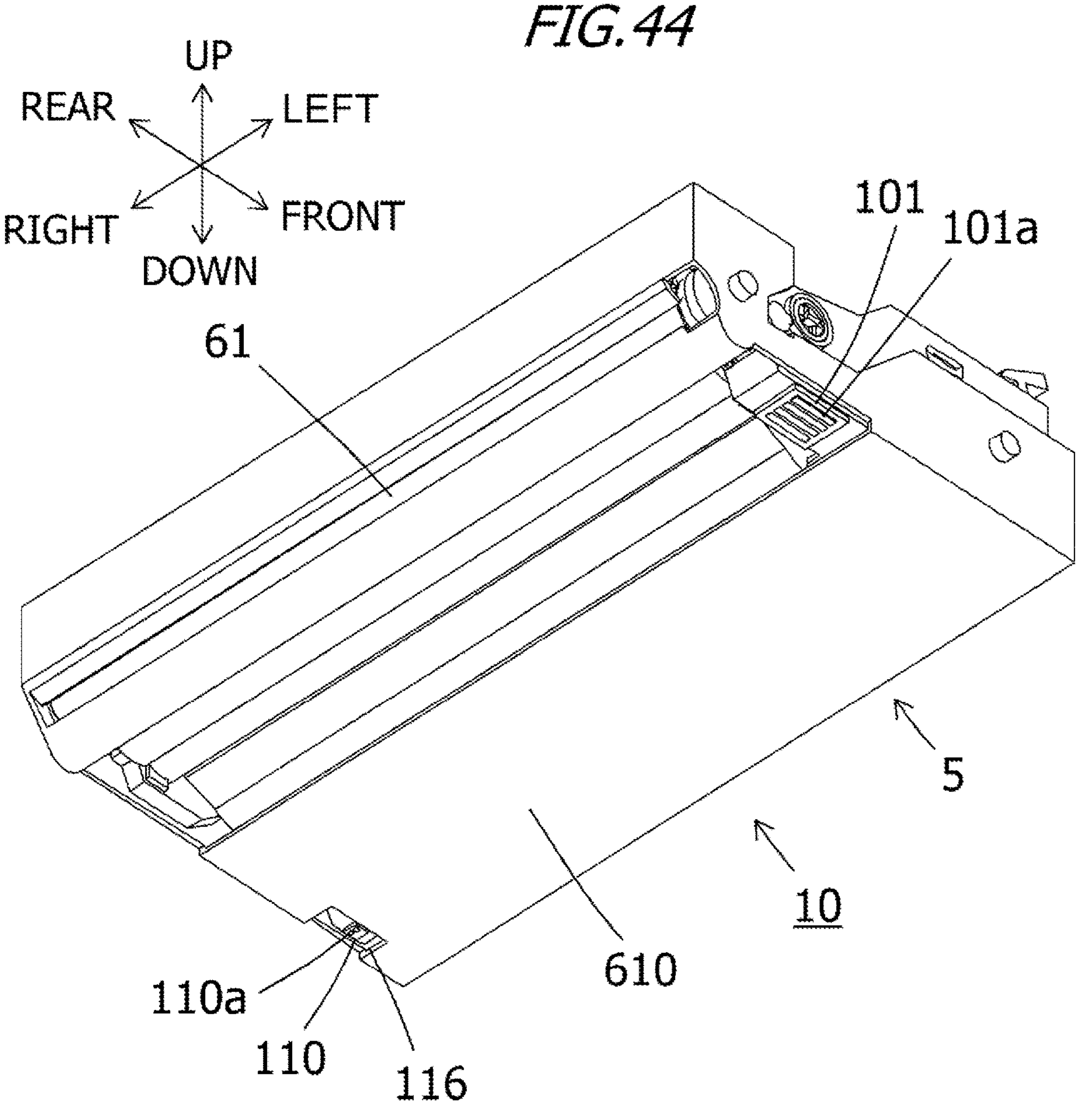
FIG. 44 is a perspective view of a cartridge unit of an eighth embodiment.

An arrangement of the memory tags will be described with reference to FIG. 44. FIG. 44 is a perspective view of the cartridge unit 10 from diagonally below. As shown in FIG. 44, the second memory tag 101 is provided on a left side of the lower surface of the cartridge unit 10. On the other hand, the first memory tag 110 is provided on a right side of the lower surface of the cartridge unit 10. As in the sixth embodiment, the first memory tag 110 is disposed on the lower surface of the toner cartridge 9 such that the first contact arrangement surface and the first memory contact surface 110*b* face downward. The first contact arrangement surface and the first memory contact surface 110*b* are exposed from the opening portion 116 of the frame 610. In other words, in the left to right direction, the first memory tag 110 is disposed on one end side with respect to the center of the cartridge unit 10, and the second memory tag 101 is disposed on the other end side with respect to the center of the cartridge unit 10. Also, the second memory tag 101 can also be disposed on one end side with respect to the center of the toner cartridge 9.

According to the eighth embodiment, as in the sixth embodiment, the second memory tag 101 and the first memory tag 110 are disposed on the lower surface of the cartridge unit 10. Therefore, the second memory contact 101*a* and the first memory contact 110*a* can be satisfactorily electrically connected to the second main body memory contact 103*a* and the first main body memory contact 104*a*, respectively, due to the operation at the time of attaching the cartridge unit 10. Further, as another configuration relating to the eighth embodiment, the first memory contact 110*a* may be the second relay contact 117*c* as in the seventh embodiment. Also in this way, the information of the first memory tag 110 can be satisfactorily transmitted to the apparatus main body 2.

Ninth Embodiment

Next, a ninth embodiment will be described. In the ninth embodiment, parts that are different from those of the above-described embodiments will be described in detail. Unless otherwise specified, the ninth embodiment has the same configuration as each embodiment, and thus the same components as those in each embodiment will be denoted by the same reference numerals, and detailed description thereof will be omitted.

Figure 45:
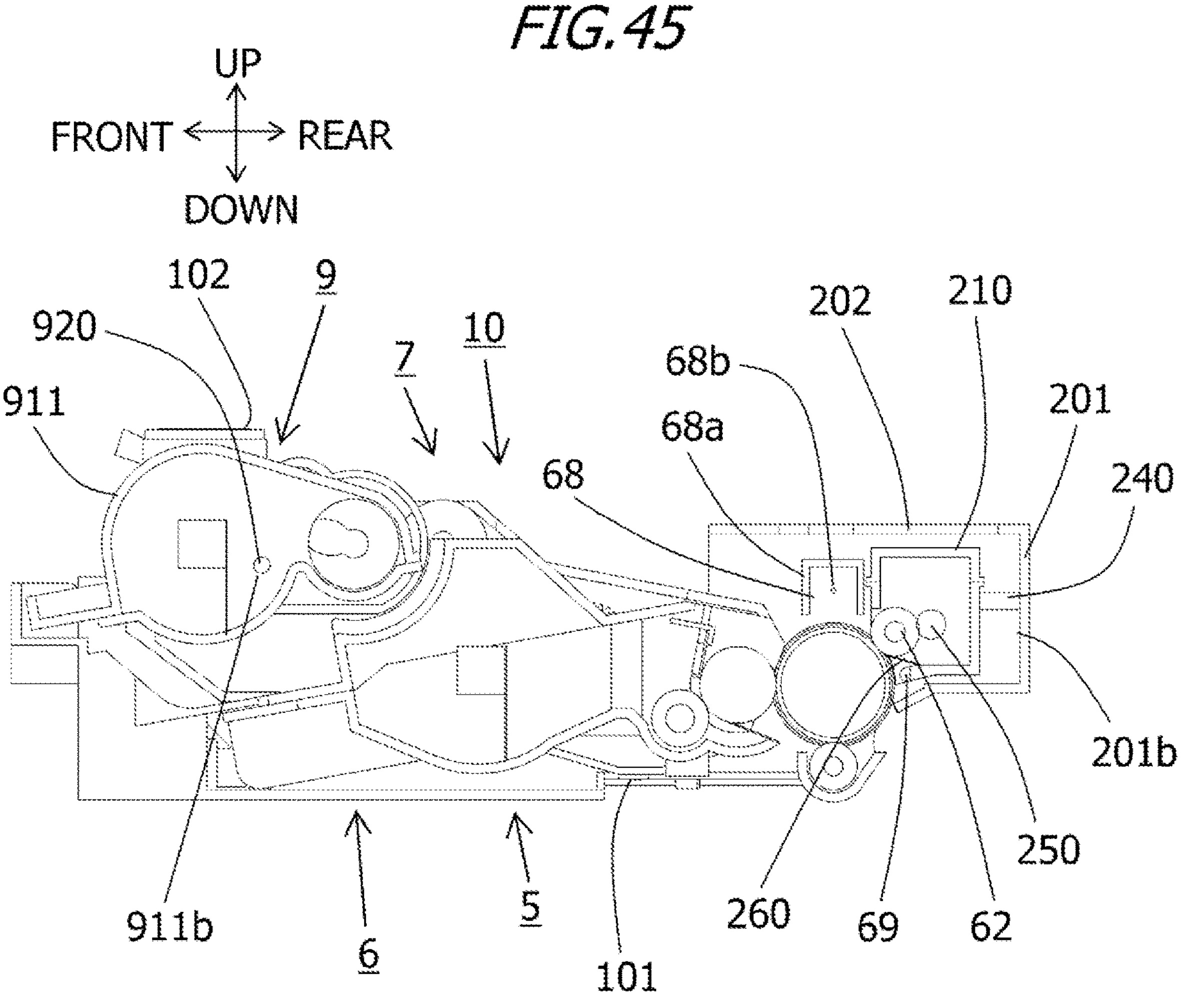
FIG. 45 is a cross-sectional view of a cartridge unit of a ninth embodiment.

FIG. 45 is a cross-sectional view of the cartridge unit 10 according to the ninth embodiment. As shown in FIG. 45, a frame 201 of the photosensitive member unit 6 is provided with a lid member 202, a waste toner unit 210, and the corona charging device 68. The corona charging device 68 includes a wire member 68*a* as a metal member and a frame 68*b* as a metal member, to which different voltage biases are applied from the apparatus main body 2. The developing unit 7 is provided with the second memory tag 101 as the second storage member, and the toner cartridge 9 is provided with the first memory tag 102 as the first storage member. Here, an assembly in which the developing unit 7 is attached to and integrated with the photosensitive member unit 6 is referred to as the process cartridge 5.

Through holes 911*b* are provided in side walls of the container member 911 of the toner cartridge 9 on both sides in the left to right direction, and the through holes 911*b* are closed by transparent lid members 920. The T side holder L92 and the T side holder R93 (see FIG. 12) of the toner cartridge 9 are provided with a holder L through hole 92*g* and a holder R through hole 93*b* (see FIG. 56), respectively, which are coaxial with the through holes 911*b*.

Figure 46A:
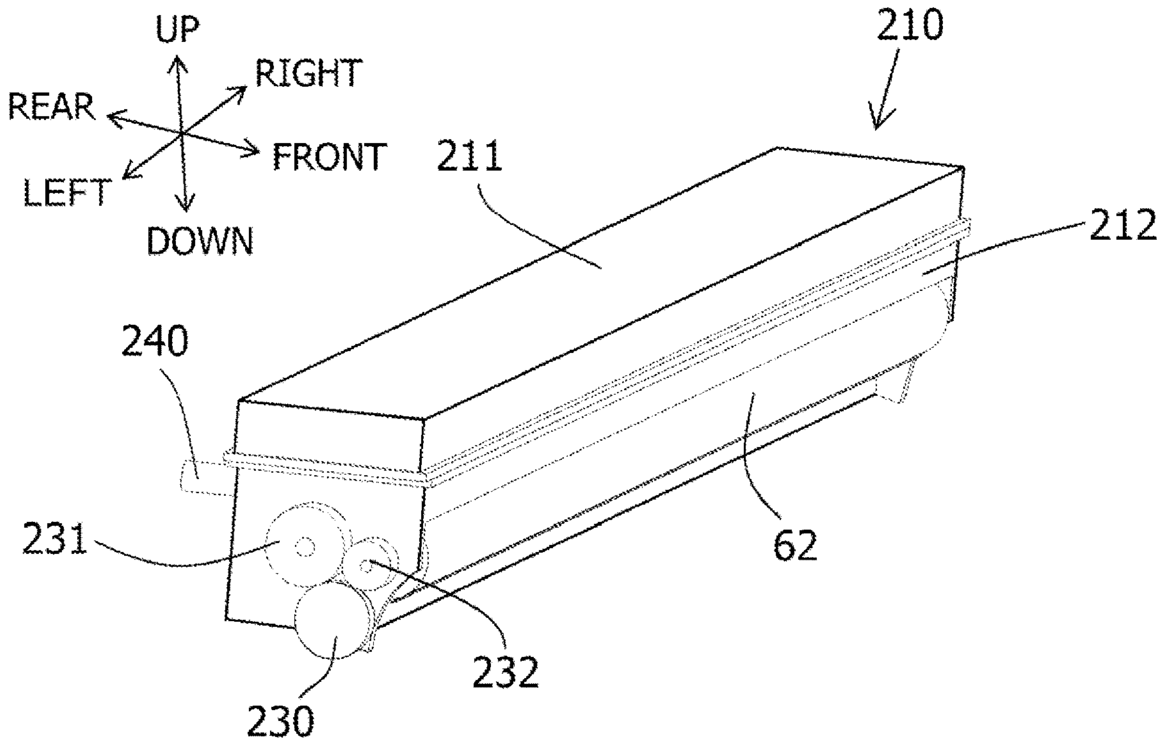
FIGS. 46A and 46B are perspective views of a waste toner unit of the ninth embodiment.
Figure 46B:
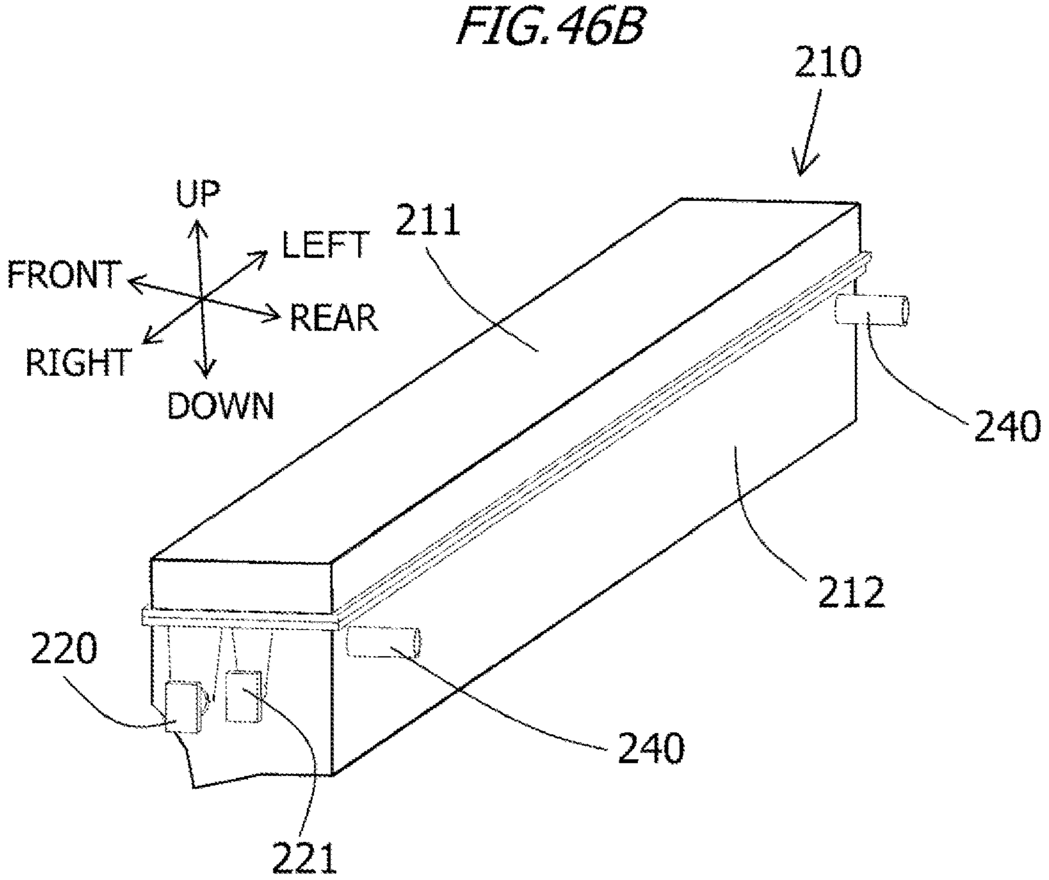
Figure 47A:
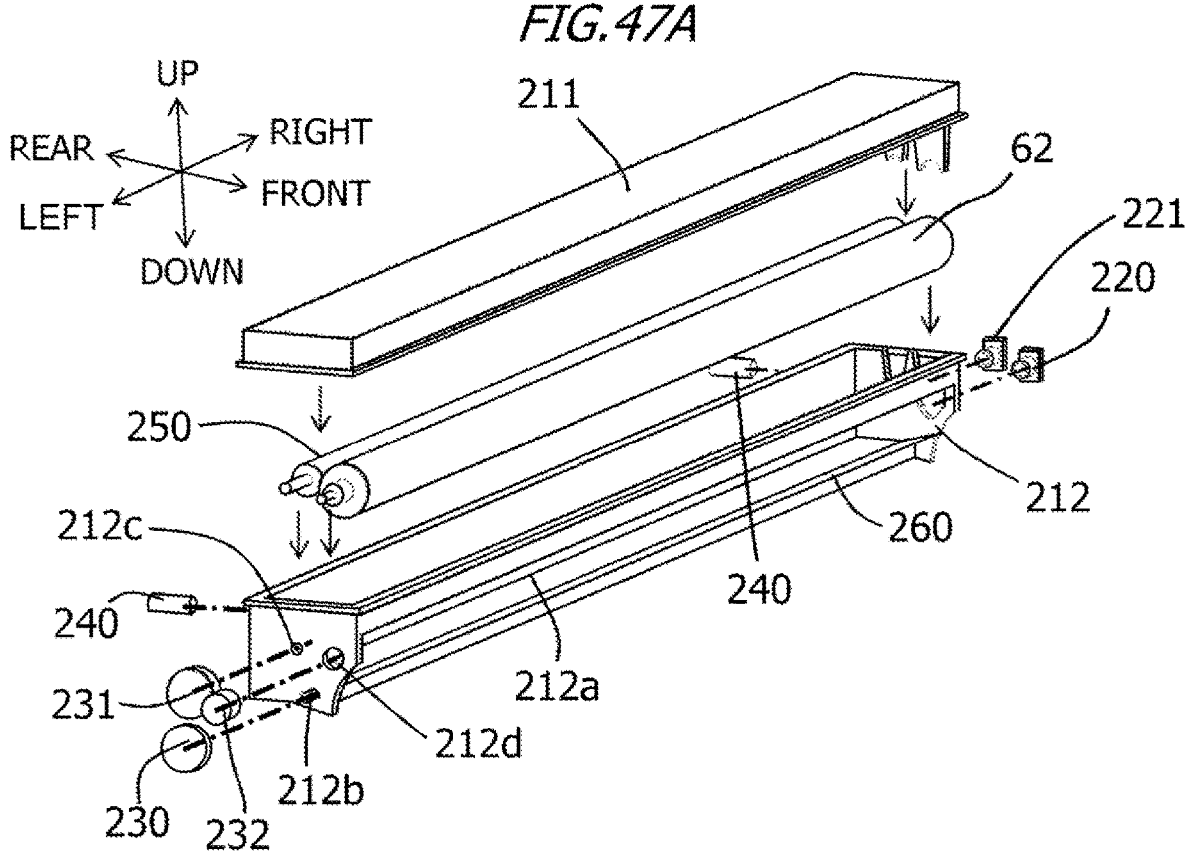
FIGS. 47A and 47B are exploded perspective views of the waste toner unit of the ninth embodiment.
Figure 47B:
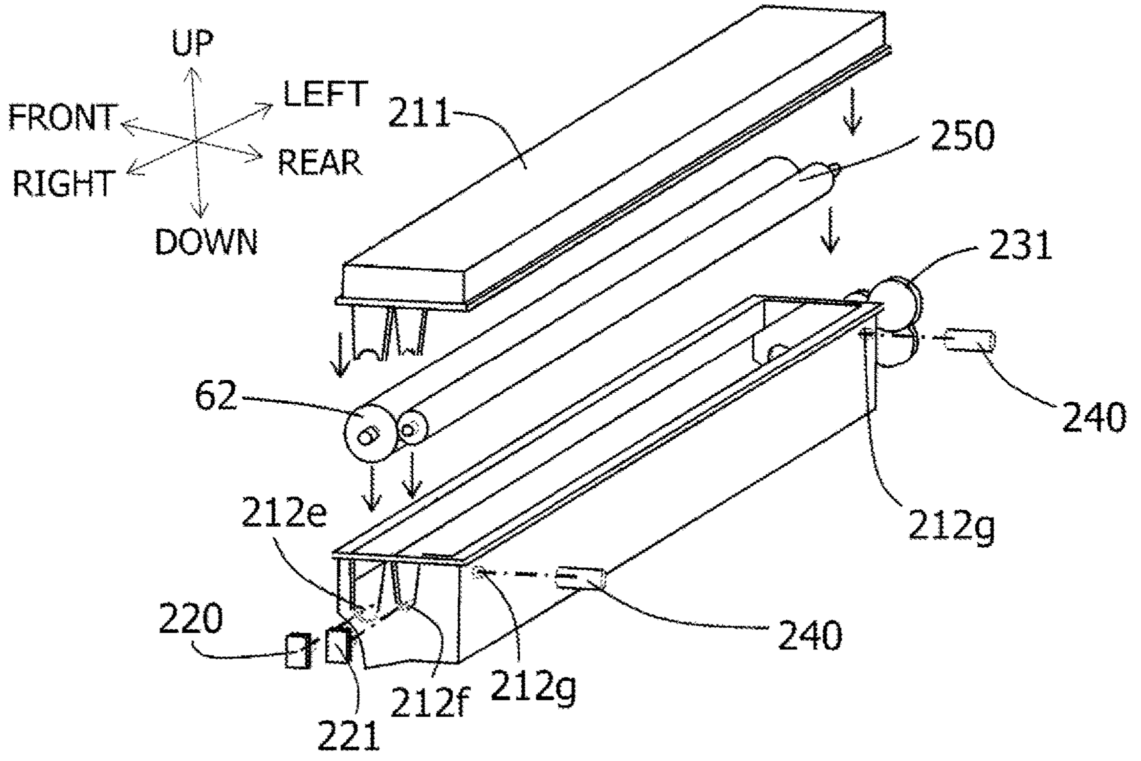

A configuration of the waste toner unit 210 will be described with reference to FIGS. 46A and 46B and FIGS. 47A and 47B. FIGS. 46A and 46B are perspective views of the waste toner unit 210. FIGS. 47A and 47B are exploded perspective views of the waste toner unit 210. The waste toner unit 210 includes a waste toner container 212, a container lid 211, the recovery roller 62 as a first roller, a stripping roller 250 as a second roller, and a biasing member 240. The recovery roller 62 has a metal shaft coated with a conductive sponge member as a roller portion. Further, the stripping roller 250 is made of metal with which a shaft portion and a roller portion are all integrated.

Shaft portions of the recovery roller 62 at both ends are supported by a first shaft hole 212*d* and a second shaft hole 212*e* of the waste toner container 212, and thus the recovery roller 62 is rotatably supported. Further, shaft portions of the stripping roller 250 at both ends are supported by a third shaft hole 212*c* and a fourth shaft hole 212*f* of the waste toner container 212, and thus the stripping roller 250 is rotatably supported. A surface of the recovery roller 62 and a surface of the stripping roller 250 are in contact with each other (see FIG. 45). After the recovery roller 62 and the stripping roller 250 are incorporated into the waste toner container 212, the container lid 211 is fixed to the waste toner container 212.

A recovery roller gear 232 and a stripping roller gear 231 are fixed to left shafts of the recovery roller 62 and the stripping roller 250, respectively. Further, a support shaft 212*b* is provided on a left wall of the waste toner container 212, and a first idler gear 230 is rotatably supported thereon. The first idler gear 230 engages with the photosensitive member gear (first gear) 65 (see FIG. 8) provided on the photosensitive drum 61 to receive a driving force. The driving force from the photosensitive drum 61 is transmitted to the first idler gear 230, the stripping roller gear 231 and the recovery roller gear 232 in order, and thus the recovery roller 62 and the stripping roller 250 are rotationally driven.

A recovery roller electrode 220 and a stripping roller electrode 221 formed of a conductive resin are fixed respectively to right shafts of the recovery roller 62 and the stripping roller 250 to be rotatable and slidable. Two fixing protrusions 212*g* are provided on the outside of a rear side wall of the waste toner container 212, and the biasing member 240 is fixed to each of them. A seal sheet 260 is a sheet-shaped plastic member, which is provided below an opening portion 212*a* of the waste toner container 212. One end side of the seal sheet 260 is fixed to the waste toner container 212, and the other end side is in contact with the recovery roller 62.

Figure 48:
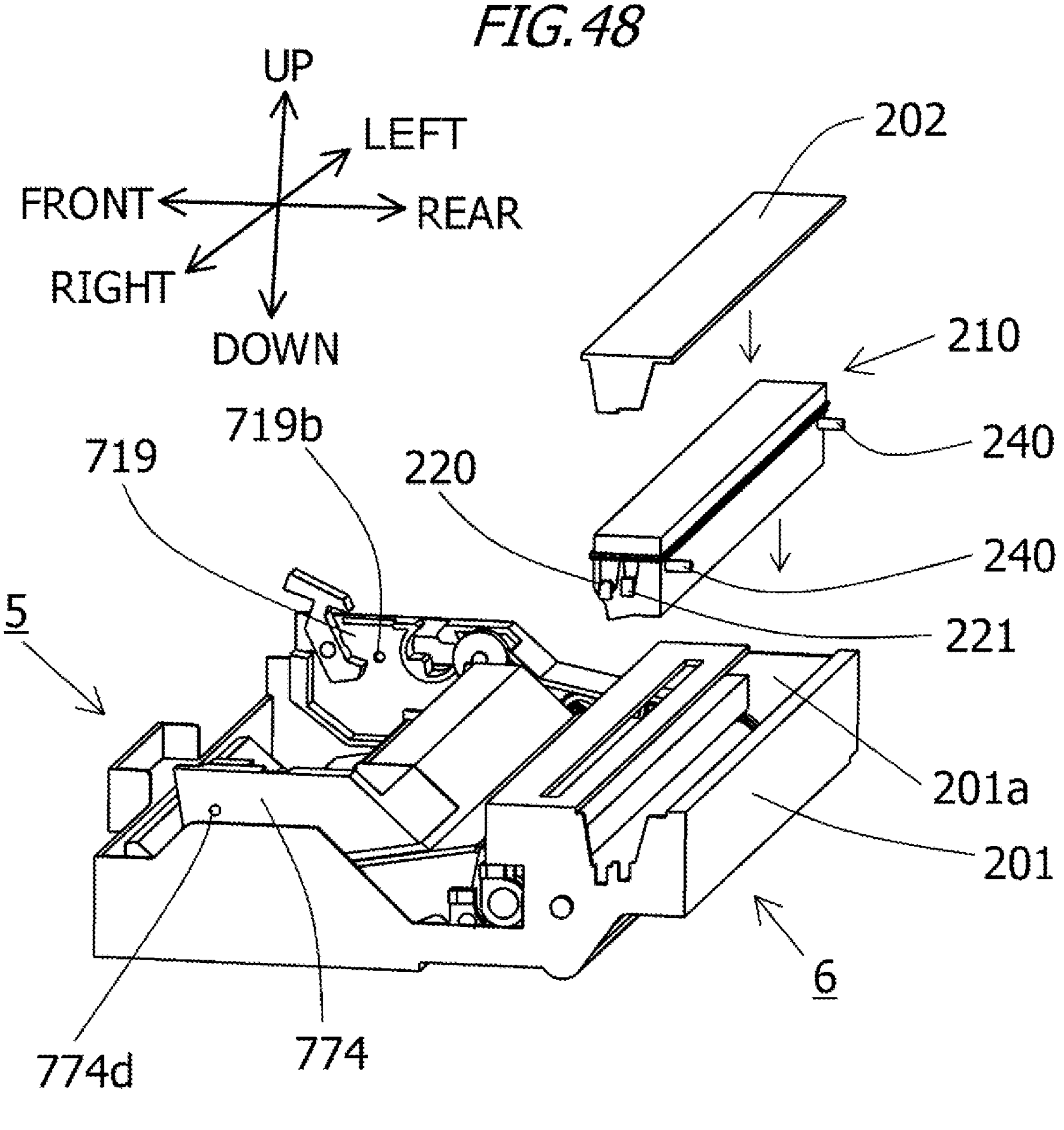
FIG. 48 is an exploded perspective view of a process cartridge of the ninth embodiment.

Attaching the waste toner unit 210 to the photosensitive member unit 6 will be described with reference to FIG. 48. FIG. 48 is a perspective view of the photosensitive member unit 6 and the waste toner unit 210. As shown in FIG. 48, the waste toner unit 210 is attached through an opening hole 201*a* of the frame 201 of the photosensitive member unit 6. After that, the lid member 202 is attached to the frame 201, and the waste toner unit 210 is attached to the photosensitive member unit 6. The waste toner unit 210 is movably held in a direction of the photosensitive drum 61 by a rail (not shown) provided on the frame 201. Further, the biasing member 240 comes into contact with a contact wall 201*b* of the frame 201 (see FIG. 45), and the pressing force thereof biases the recovery roller 62 in the direction of the photosensitive drum 61, thereby bringing a surface of the recovery roller 62 into contact with the surface of the photosensitive drum 61.

Predetermined voltages are applied to the recovery roller 62 and the stripping roller 250 from the apparatus main body 2 via the recovery roller electrode 220 and the stripping roller electrode 221, respectively. The recovery roller 62 collects paper dust and toner adhering to the surface of the photosensitive drum 61. Further, the stripping roller 250 strips off the paper dust and toner adhering to the surface of the recovery roller 62. The stripped toner is collected in the waste toner container 212. The seal sheet 260 prevents the collected toner from leaking from a lower portion of the opening portion 212*a* of the waste toner container 212 and the recovery roller 62.

Figure 49:
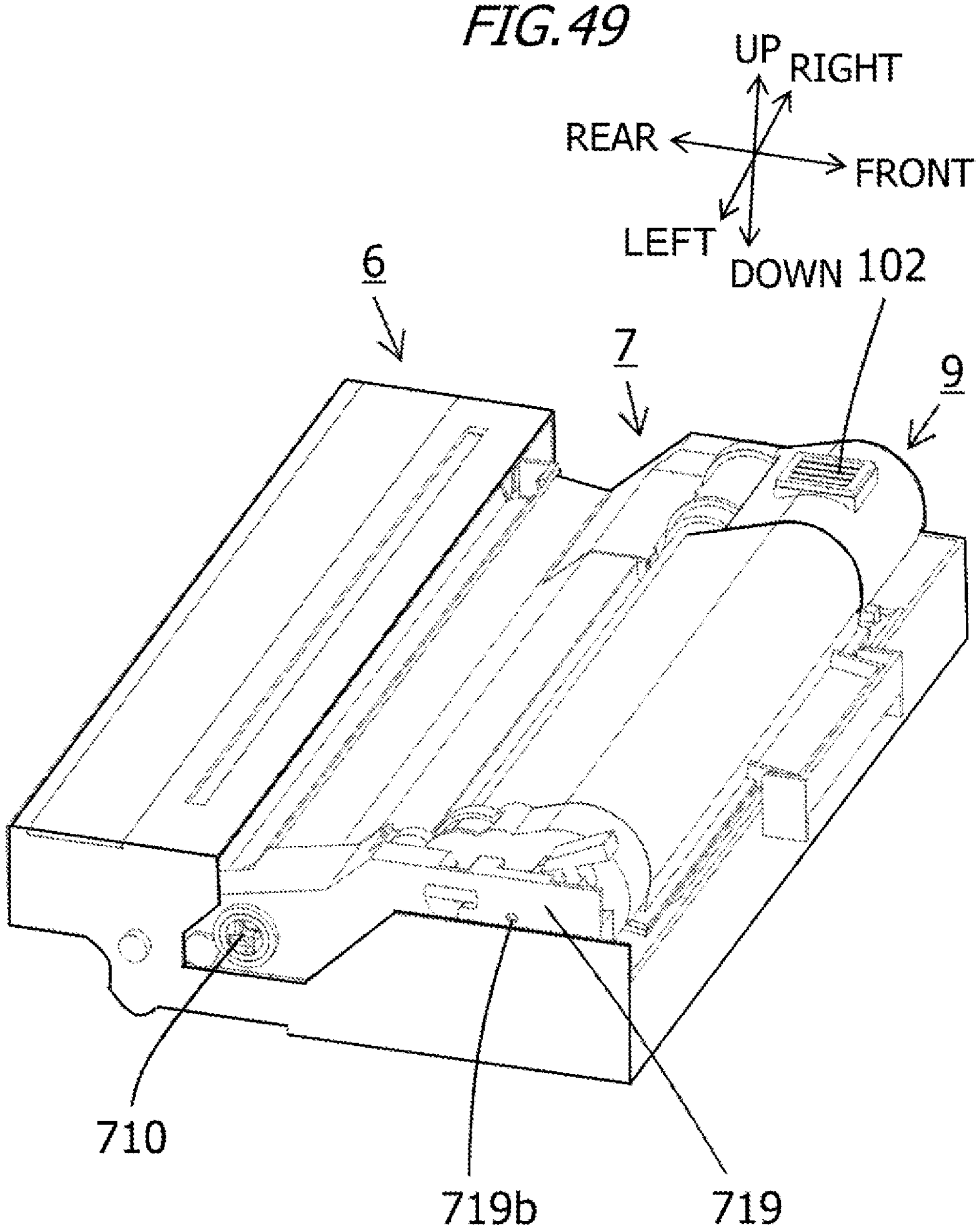
FIG. 49 is a perspective view of the cartridge unit of the ninth embodiment.
Figure 50:
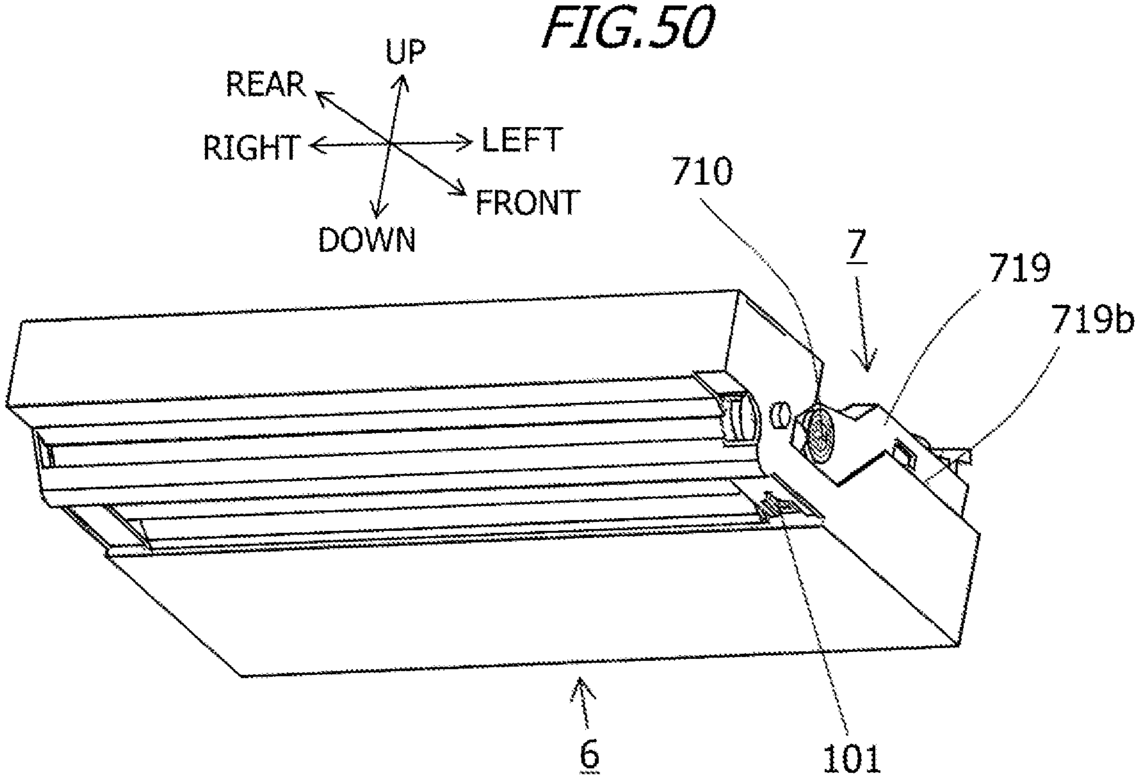
FIG. 50 is a perspective view of the cartridge unit of the ninth embodiment.

FIGS. 49 and 50 are perspective views of the cartridge unit 10 according to the ninth embodiment. As shown in FIG. 49, the first memory tag 102 is provided on the upper surface of the toner cartridge 9 on the discharge opening 94A (see FIG. 13) side. As shown in FIG. 50, the second memory tag 101 is provided at a lower portion of the developing unit 7 on the developing coupling 710 (see FIGS. 4 and 9) side.

Figure 51:
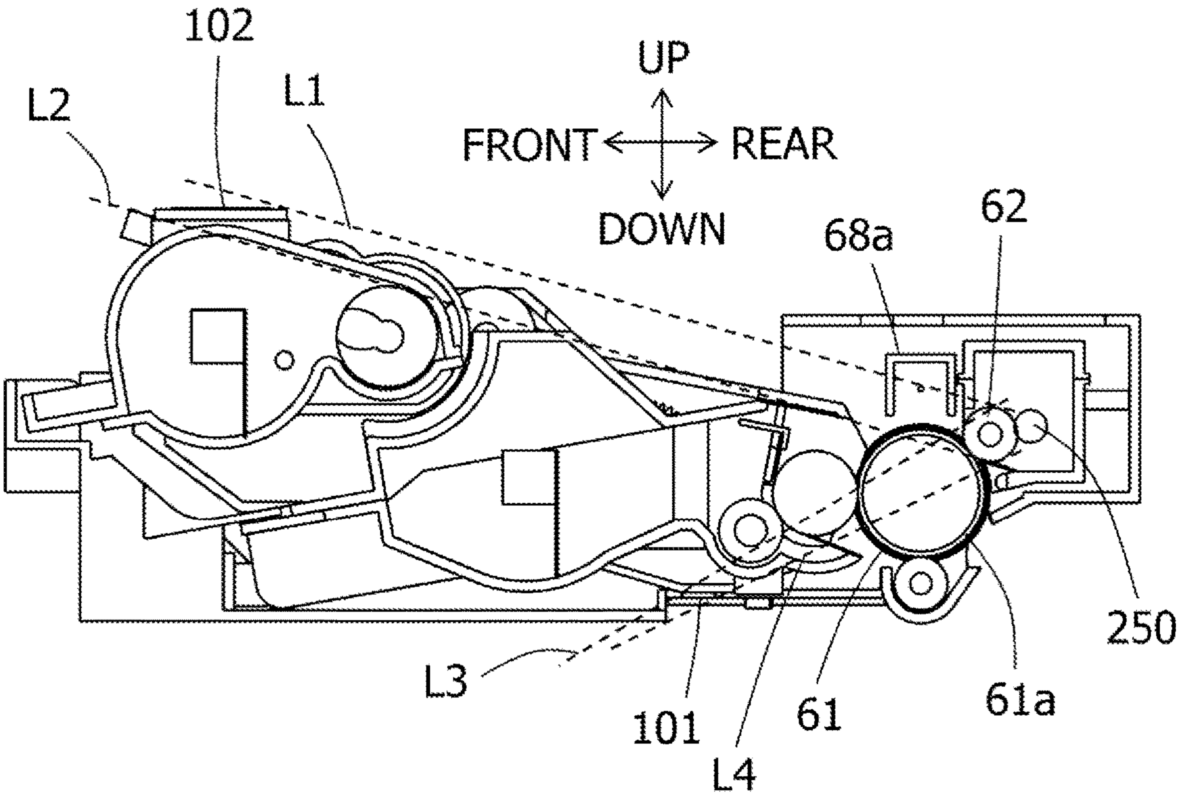
FIG. 51 is a cross-sectional view of the cartridge unit of the ninth embodiment.

An arrangement of components of the cartridge unit 10 according to the ninth embodiment will be described with reference to FIGS. 51 to 54. FIGS. 51 to 54 are cross-sectional views of the cartridge unit 10. As shown in FIG. 51, a drum cylinder (aluminum tube) 61*a* of the photosensitive drum 61 and a metal frame 68*a* of the corona charger 68 are provided in a projection range (a range between line segments L1 and L2) from the recovery roller 62 toward an outer contour of the first memory tag 102 in the cross-sectional direction. The aluminum tube 61*a* and the metal frame 68*a* are made of a metal. When viewed in the axis direction, the line segment L1 is a tangent line (first tangent line) that passes through one end of the first memory tag 102 and is in contact with the recovery roller 62. The line segment L2 is a tangent line (second tangent line) that passes through the other end of the first memory tag 102 and is in contact with the recovery roller 62. The aluminum tube 61*a* of the photosensitive drum 61 and the metal frame 68*a* of the corona charger 68 overlap the region partitioned by or surrounded by the line segment L1, the line segment L2, the first memory tag 102, and the recovery roller 62.

According to the configuration shown in FIG. 51, even in a case in which electromagnetic noise is generated from the recovery roller 62 to which electric power is supplied from the apparatus main body 2, the electromagnetic noise toward the first memory tag 102 is electromagnetically shielded by the metal aluminum tube 61*a* and the metal frame 68*a*. For this reason, the electromagnetic noise which is derived from the recovery roller 62 and radiated to the first memory tag 102 is reduced, and thus the operation of the first memory tag 102 is stabilized.

Similarly, as shown in FIG. 51, the aluminum tube 61*a* is provided in a projection range (a range between line segments L3 and L4) from the recovery roller 62 toward an outer contour of the second memory tag 101 in the cross-sectional direction. When viewed in the axis direction, the line segment L3 is a tangent line that passes through one end of the second memory tag 101 and is in contact with the recovery roller 62. The line segment LA is a tangent line that passes through the other end of the second memory tag 101 and is in contact with the recovery roller 62. The aluminum tube 61*a* of the photosensitive drum 61 overlaps the region partitioned by or surrounded by the line segment L3, the line segment LA, the second memory tag 101, and the recovery roller 62. According to the configuration shown in FIG. 51, even if electromagnetic noise is generated from the recovery roller 62 to which electric power is supplied from the apparatus main body 2, the electromagnetic noise directed to the second memory tag 101 is electromagnetically shielded by the metal aluminum tube 61*a*. For this reason, the electromagnetic noise which is derived from the recovery roller 62 and radiated to the second memory tag 101 is reduced, and thus the operation of the second memory tag 101 is stabilized.

Figure 52:
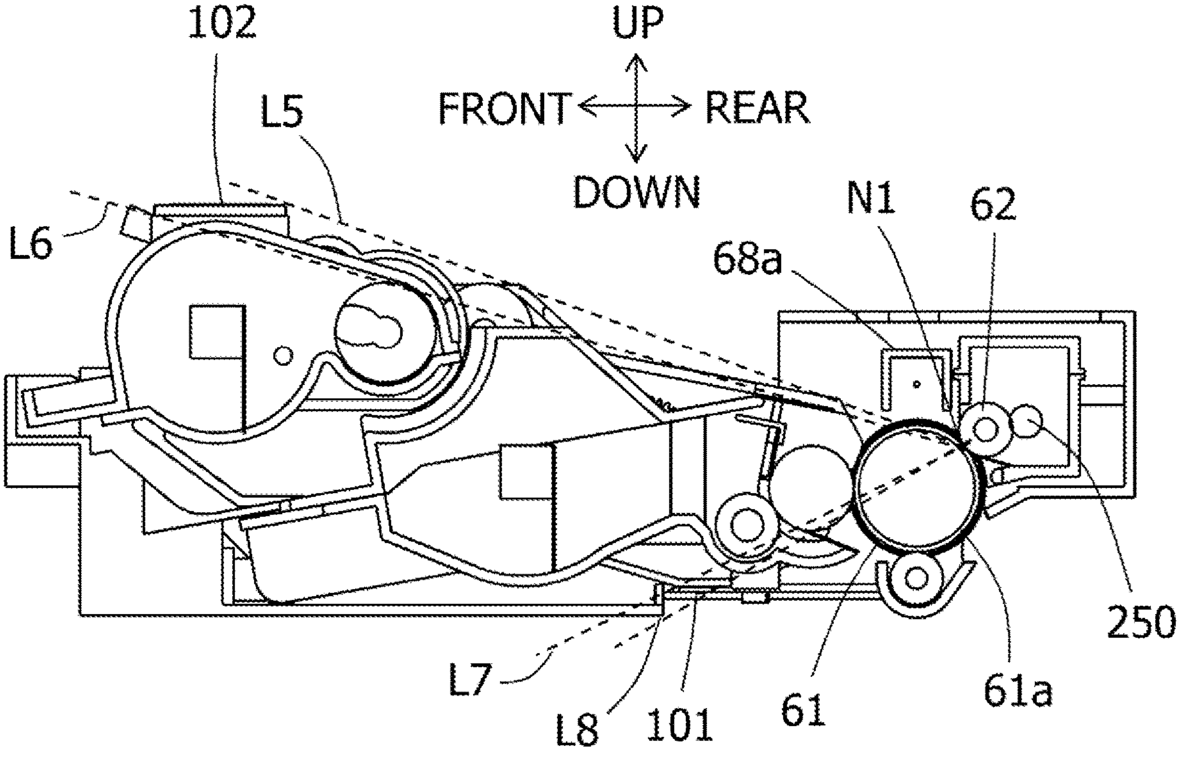
FIG. 52 is a cross-sectional view of the cartridge unit of the ninth embodiment.

As shown in FIG. 52, the aluminum tube 61*a* is provided in a projection range (a range between line segments L5 and L6) from a contact region N1 between the recovery roller 62 and the photosensitive drum 61 toward the outer contour of the first memory tag 102 in the cross-sectional direction. The recovery roller 62 comes into contact with the photosensitive drum 61 at the contact region N1 (a first contact point). When viewed in the axis direction, the line segment L5 is a straight line (a first straight line) connecting one end of the first memory tag 102 to the contact region N1, and the line segment L6 is a straight line (a second straight line) connecting the other end of the first memory tag 102 to the contact region N1. The aluminum tube 61*a* overlaps the region partitioned or surrounded by the line segment L5, the line segment L6, and the first memory tag 102. According to the configuration shown in FIG. 52, even in a case in which electromagnetic noise is generated from the contact region N1 between the recovery roller 62 and the photosensitive drum 61 to which electric power is supplied from the apparatus main body 2, the electromagnetic noise directed to the first memory tag 102 is electromagnetically shielded by the aluminum tube 61*a*. For this reason, the electromagnetic noise which is derived from the contact region N1 between the recovery roller 62 and the photosensitive drum 61 and radiated to the first memory tag 102 is reduced, and thus the operation of the first memory tag 102 is stabilized.

Similarly, as shown in FIG. 52, the aluminum tube 61*a* is provided in a projection range (a range between line segments L7 and L8) from the contact region N1 between the recovery roller 62 and the photosensitive drum 61 toward the outer contour of the second memory tag 101 in the cross-sectional direction. When viewed in the axis direction, the line segment L7 is a straight line connecting one end of the second memory tag 101 to the contact region N1, and the line segment L8 is a straight line connecting the other end of the second memory tag 101 to the contact region N1. The aluminum tubes 61*a* overlaps the region partitioned by or surrounded by the line segment L7, the line segment L8, and the second memory tag 101. According to the configuration shown in FIG. 52, even in a case in which electromagnetic noise is generated from the contact region N1 between the recovery roller 62 and the photosensitive drum 61 to which electric power is supplied from the apparatus main body 2, the electromagnetic noise directed to the second memory tag 101 is electromagnetically shielded by the aluminum tube 61*a*. For this reason, the electromagnetic noise which is derived from the contact region N1 between the recovery roller 62 and the photosensitive drum 61 and radiated to the second memory tag 101 is reduced, and thus the operation of the second memory tag 101 is stabilized.

Figure 53:
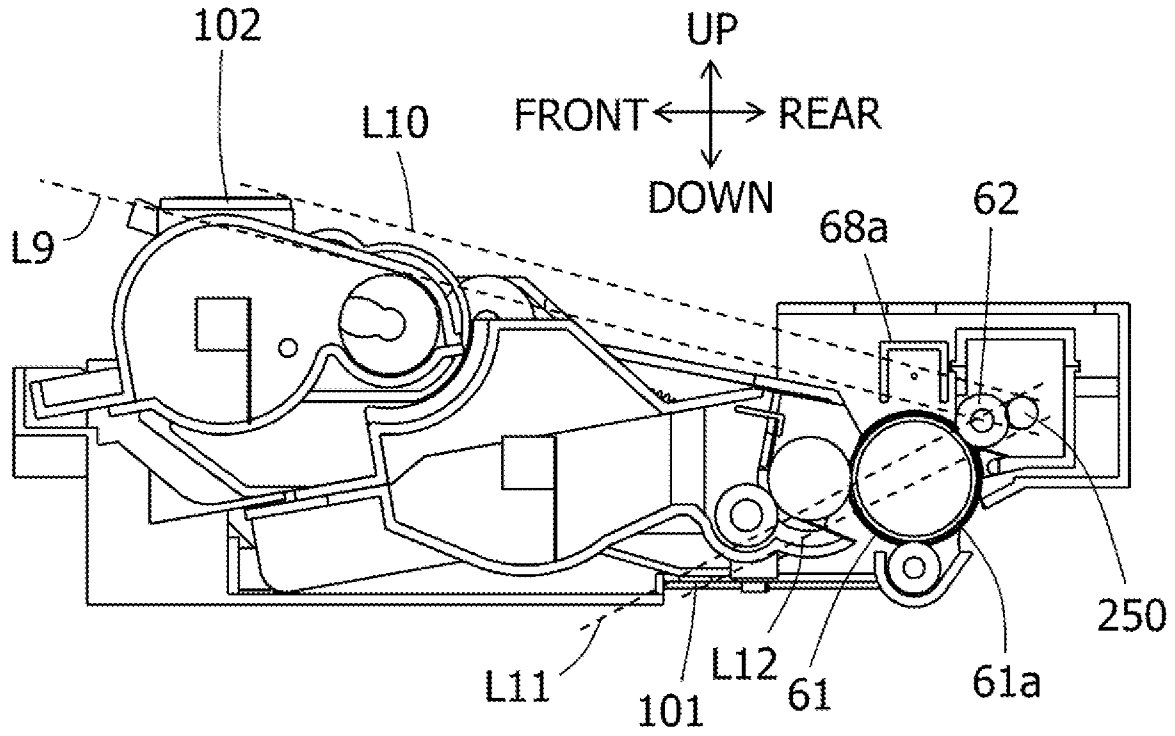
FIG. 53 is a cross-sectional view of the cartridge unit of the ninth embodiment.

As shown in FIG. 53, the metal frame 68*a* of the corona charger 68 is provided in a projection range (a range between line segments L9 and L10) from the stripping roller 250 toward the outer contour of the first memory tag 102 in the cross-sectional direction. The stripping roller 250 comes into contact with the recovery roller 62. When viewed in the axis direction, the line segment L10 is a tangent line (a third tangent line) that passes through one end of the first memory tag 102 and is in contact with the stripping roller 250, and the line segment L9 is a tangent line (a fourth tangent line) that passes through the other end of the first memory tag 102 and is in contact with the stripping roller 250. The metal frame 68*a* of the corona charging device 68 overlaps the region partitioned or surrounded by the line segment L9, the line segment L10, the first memory tag 102, and the stripping roller 250. According to the configuration shown in FIG. 53, even in a case in which electromagnetic noise is generated from the stripping roller 250 to which electric power is supplied from the apparatus main body 2, the electromagnetic noise directed to the first memory tag 102 is electromagnetically shielded by the metal frame 68*a*. For this reason, the electromagnetic noise which is derived from the stripping roller 250 and radiated to the first memory tag 102 is reduced, and thus the operation of the first memory tag 102 is stabilized.

Similarly, as shown in FIG. 53, the aluminum tube 61*a* is provided in a projection range (a range between line segments L11 and L12) from the stripping roller 250 toward the outer contour of the second memory tag 101 in the cross-sectional direction. When viewed in the axis direction, the line segment L11 is a tangent line that passes through one end of the second memory tag 101 and is in contact with the stripping roller 250, and the line segment L12 is a tangent line that passes through the other end of the first memory tag 102 and is in contact with the stripping roller 250. The aluminum tube 61*a* overlaps the region partitioned or surrounded by the line segment L11, the line segment L12, the second memory tag 101, and the stripping roller 250.

According to the configuration shown in FIG. 53, even in a case in which electromagnetic noise is generated from the stripping roller 250 to which electric power is supplied from the apparatus main body 2, the electromagnetic noise directed to the second memory tag 101 is electromagnetically shielded by the aluminum tube 61*a*. For this reason, the electromagnetic noise which is derived from the stripping roller 250 and radiated to the second memory tag 101 is reduced, and thus the operation of the second memory tag 101 is stabilized.

Figure 54:
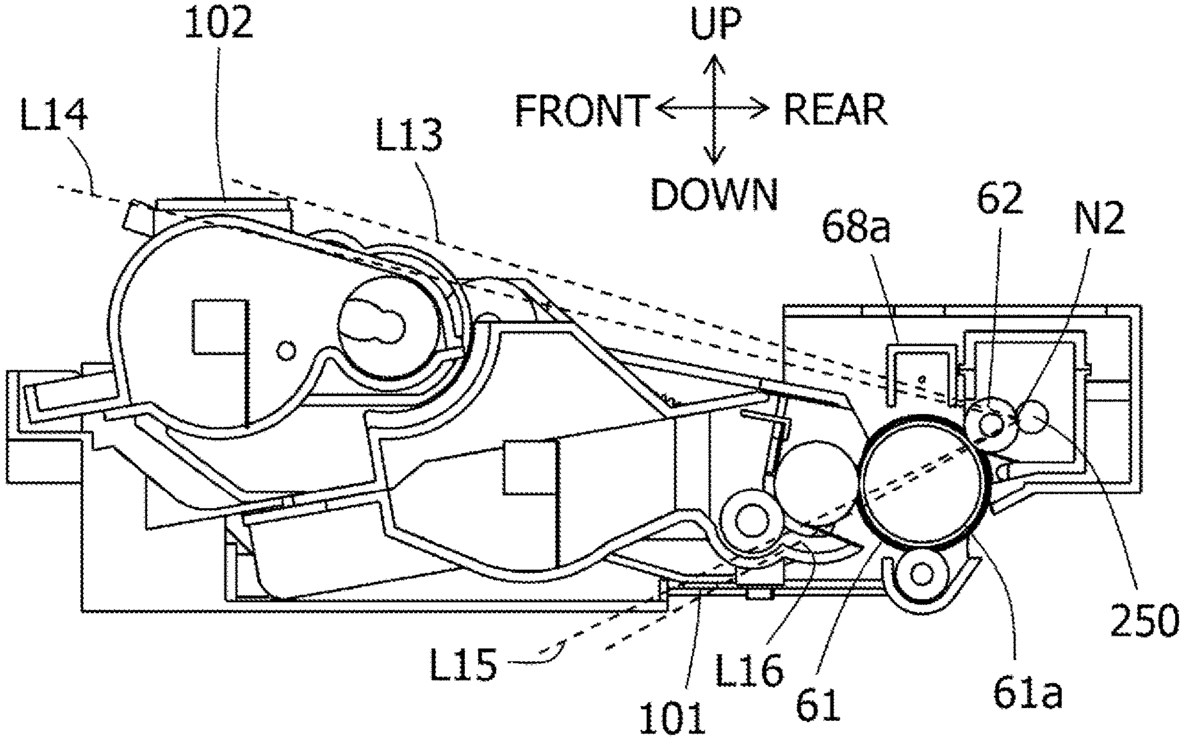
FIG. 54 is a cross-sectional view of the cartridge unit of the ninth embodiment.

As shown in FIG. 54, the metal frame 68*a* is provided in a projection range (a range between line segments L13 and L14) from a contact region N2 between the stripping roller 250 and the recovery roller 62 toward the outer contour of the first memory tag 102 in the cross-sectional direction. The stripping roller 250 comes into contact with the recovery roller 62 at the contact region N2 (a second contact point). When viewed in the axis direction, the line segment L13 is a straight line (a third straight line) connecting one end of the first memory tag 102 to the contact region N2, and the line segment L14 is a straight line (a fourth straight line) connecting the other end of the first memory tag 102 to the contact region N2. The metal frame 68*a* overlaps the region partitioned by or surrounded by the line segment L13, the line segment L14, and the first memory tag 102. According to the configuration shown in FIG. 54, even in a case in which electromagnetic noise is generated from the contact region N1 between the stripping roller 250 and the recovery roller 62 to which electric power is supplied from the apparatus main body 2, the electromagnetic noise directed to the first memory tag 102 is electromagnetically shielded by the metal frame 68*a*. For this reason, the electromagnetic noise which is derived from the contact region N2 between the stripping roller 250 and the recovery roller 62 and radiated to the first memory tag 102 is reduced, and the thus operation of the first memory tag 102 is stabilized.

Similarly, as shown in FIG. 54, the aluminum tube 61*a* is provided in a projection range (a range between line segments L15 and L16) from the contact region N2 between the stripping roller 250 and the recovery roller 62 toward the outer contour of the second memory tag 101 in the cross-sectional direction. When viewed in the axis direction, the line segment L15 is a straight line connecting one end of the first memory tag 102 to the contact region N2, and the line segment L16 is a straight line connecting the other end of the first memory tag 102 to the contact region N2. The aluminum tube 61*a* overlaps the region partitioned or surrounded by the line segment L15, the line segment L16, and the first memory tag 102. According to the configuration shown in FIG. 54, even in a case in which electromagnetic noise is generated from the contact region N2 between the stripping roller 250 and the recovery roller 62 to which electric power is supplied from the apparatus main body 2, the electromagnetic noise directed to the second memory tag 101 is electromagnetically shielded by the aluminum tube 61*a*. For this reason, the electromagnetic noise which is derived from the contact region N2 between the stripping roller 250 and the recovery roller 62 and radiated to the second memory tag 101 is reduced, and thus the operation of the second memory tag 101 is stabilized.

Figure 55:
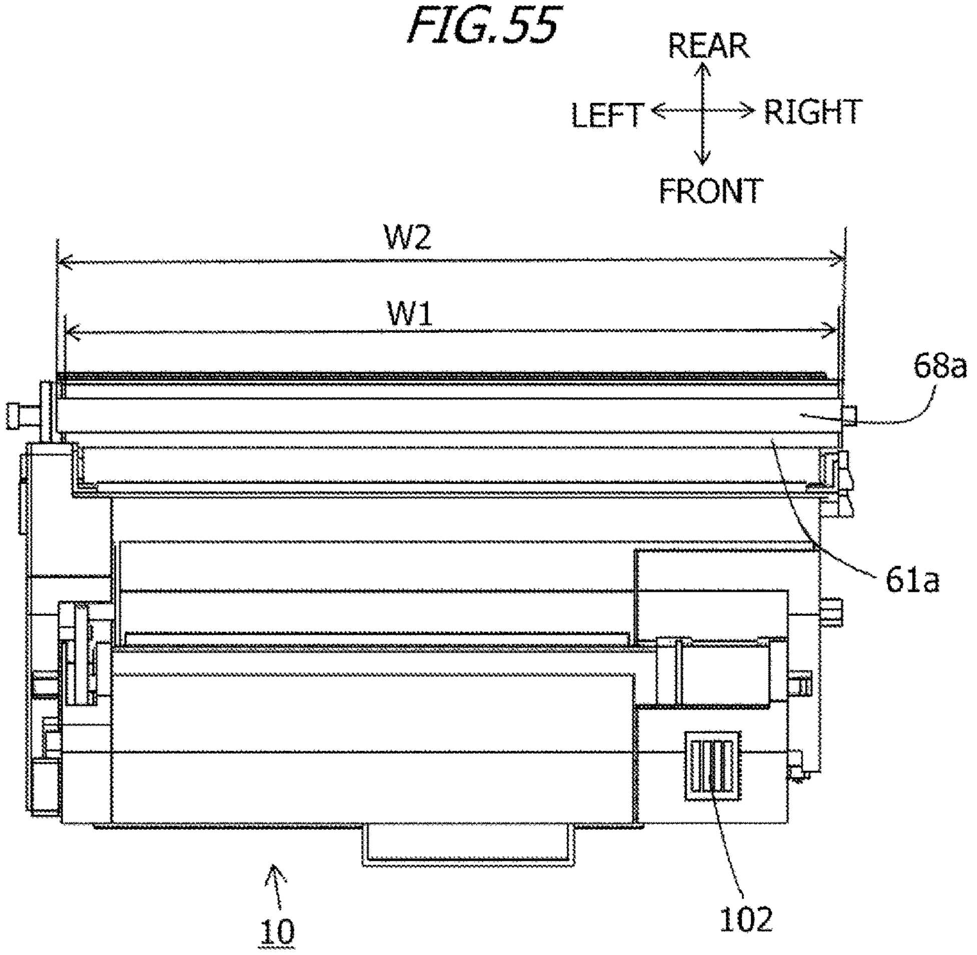
FIG. 55 is a top view of the cartridge unit of the ninth embodiment.

An arrangement of components of the cartridge unit 10 according to the ninth embodiment will be described with reference to FIG. 55. FIG. 55 is a diagram of the cartridge unit 10 when viewed from above. In FIG. 55, some components are omitted for convenience of explanation. As shown in FIG. 55, the first memory tag 102 is disposed inward (in a range indicated by arrow W1 in FIG. 55) from both end portions of the aluminum tube 61*a* of the photosensitive drum 61 in the axis direction (left to right direction of the cartridge unit 10). Similarly, the first memory tag 102 is disposed inward (in a range indicated by arrow W2 in FIG. 55) from both end portions of the metal frame 68*a* of the corona charging device 68 in the axis direction.

Further, the roller portions of the recovery roller 62 and the stripping roller 250 are disposed inward (in the range indicated by the arrow W1 in FIG. 55) from both end portions of the aluminum tube 61*a* of the photosensitive drum 61. Similarly, they are disposed inward (in the range of arrow W2 in FIG. 55) from both end portions of the metal frame 68*a* of the corona charging device 68. With this configuration, electromagnetic shielding is performed against electromagnetic noise radiation from all positions in the left to right direction, such as from the recovery roller 62 and the stripping roller 250 and from the contact regions N1 and N2 of the respective rollers, toward the first memory tag 102 described above. For this reason, the operation of the first memory tag 102 is stable.

The second memory tag 101 may be disposed at a position similar to the position of the first memory tag 102 in the left to right direction. With this configuration, electromagnetic shielding is performed against electromagnetic noise radiation from all positions in the left to right direction such as from the recovery roller 62 and the stripping roller 250 and from the contact regions N1 and N2 of the respective rollers. For this reason, the operation of the second memory tag 101 is stable.

Figure 56:
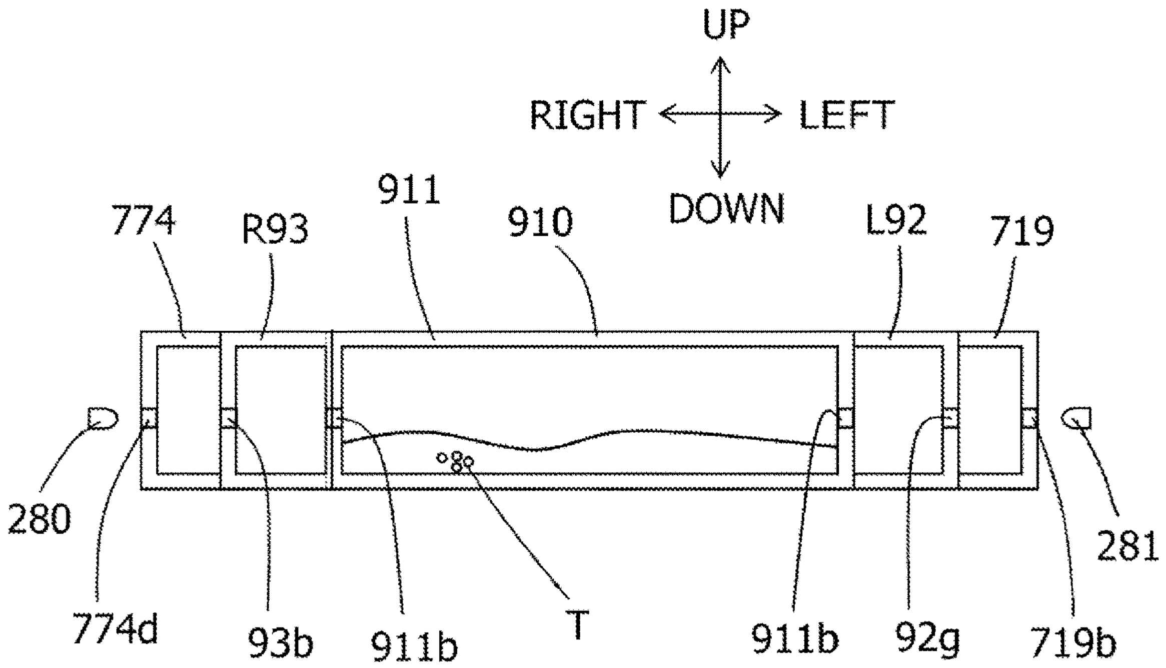
FIG. 56 is a schematic cross-sectional view of the cartridge unit of the ninth embodiment.

Here, a configuration for detecting an amount of toner in the toner cartridge 9 will be described. As shown in FIG. 48, the side holder 719 of the developing unit 7 is provided with a side holder through hole 719*b*, and the receiving port cover 774 is provided with a receiving port cover through hole 774*d*. FIG. 56 is a schematic cross-sectional view of a toner amount detection unit of the cartridge unit 10 in the left to right direction. The side holder through hole 719*b*, the receiving port cover through hole 774*d*, the through holes 911*b* of the container member 911 (see FIG. 45), the holder L through hole 92*g*, and the holder R through hole 93*b* are coaxially disposed in the left to right direction in FIG. 56. When the cartridge unit 10 is attached to the apparatus main body 2, a light emitting element 280 is provided on one end side of the toner container 910, and a light receiving element 281 is provided on the other end side of the toner container 910. Light from the light emitting element 280 passes through the toner container 910 of the toner cartridge 9 and is detected by the light receiving element 281.

An amount of light detected by the light receiving element 281 and a change in the amount of light over time vary depending on an amount of residual toner T agitated in the toner container 910. The amount of residual toner T in the toner cartridge 9 can be detected by changing detection light of the light receiving element 281. According to this configuration, when the amount of toner in the toner cartridge 9 becomes low, the user can be notified and replacement of the toner cartridge 9 can be prompted. Further, the first memory tag 102 stores information related to the amount of toner T accommodated in the toner cartridge 9.

Tenth Embodiment

Next, a tenth embodiment will be described. In the tenth embodiment, parts that are different from those of the above-described embodiments will be described in detail. Unless otherwise specified, the tenth embodiment has the same configuration as each embodiment, and thus the same components as those in each embodiment will be denoted by the same reference numerals, and detailed description thereof will be omitted. In the tenth embodiment, the arrangement of the first memory tag 102 of the ninth embodiment is changed.

Figure 57:
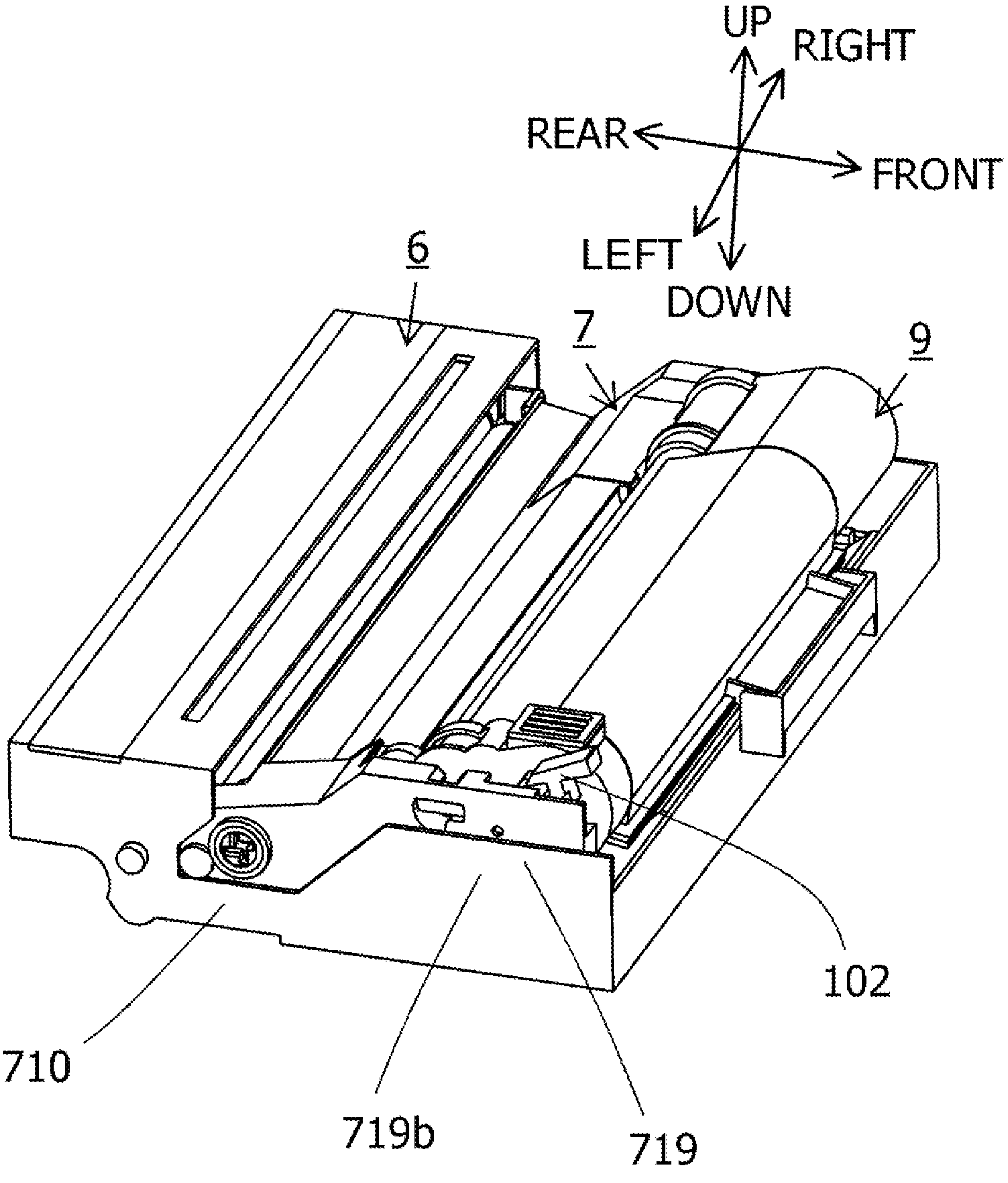
FIG. 57 is a perspective view of a cartridge unit of a tenth embodiment.

FIG. 57 is a perspective view of the cartridge unit 10 according to the tenth embodiment. As shown in FIG. 57, in the up and down direction, the first memory tag 102 is provided on the upper surface of the toner cartridge 9 on a side opposite to a side on which the discharge opening 94A (see FIG. 13) of the toner cartridge 9 is disposed. The position of the first memory tag 102 in the cross-sectional direction is the same as that of the ninth embodiment (see FIGS. 51 to 54). With this configuration, when the user attaches and detaches the toner cartridge 9 to and from the process cartridge 5, it is possible to prevent the first memory tag 102 from being contaminated by the toner scattered from the discharge opening 94A. By doing so, it is possible to prevent information transmission between the first memory tag 102 and the apparatus main body 2 from becoming unstable due to toner contamination of the first memory contact 102*a*. Further, since the arrangement of the components in the cross-sectional direction is the same as that of the ninth embodiment, electromagnetic shielding is performed against electromagnetic noise radiation from the recovery roller 62 and the stripping roller 250.

Further, in the tenth embodiment, the first memory tag 102 is provided on the side opposite to the recovery roller electrode 220 (see FIG. 48) and the stripping roller electrode 221 (see FIG. 48) in the left to right direction (axis direction). Electrodes (not shown) of the apparatus main body 2 come into contact with the recovery roller electrode 220 and the stripping roller electrode 221, and thus a power supply unit receives electric power supplied to the recovery roller 62 and the stripping roller 250 from the apparatus main body 2. The power supply unit is provided on a side opposite to the first memory tag 102 in the left to right direction (axis direction). In the axis direction, the power supply unit is disposed on one end side with respect to the center of the cartridge unit 10, and the first memory tag 102 is disposed on the other end side opposite to the one end side with respect to the center of the cartridge unit 10. With this configuration, a distance between the power supply unit and the first memory tag 102 can be increased. By doing so, even in a case in which electromagnetic noise is generated at electrode contact regions, a distance from a generation source to the first memory tag 102 is increased, and thus the influence of electromagnetic noise on the first memory tag 102 can be reduced. Therefore, the operation of the first memory tag 102 is stable.

According to the present invention, in a case in which a toner cartridge includes a storage member, the storage member can be appropriately disposed.

As described above, the present application includes the following configurations.

(Configuration 1)

A cartridge unit comprising:

a first unit which includes a photosensitive drum, a developing roller, a first supporting portion, and a second supporting portion; and a second unit which is configured to be attachable to and detachable from the first unit, the second unit including a first supported portion supported by the first supporting portion, a second supported portion supported by the second supporting portion, and a first storage member that stores information, and the second unit configured to supply developer to the first unit, the first storage member including a first storage element, a first memory contact electrically connected to the first storage element, and a first contact arrangement surface on which the first memory contact is disposed, wherein the second unit is configured to rotate from a first position to a second position in a state in which the first supported portion is supported by the first supporting portion and the second supported portion is supported by the second supporting portion so that the second unit is positioned with respect to the first unit, the second unit rotate from the first position to the second position such that the first supported portion and the second supported portion are rotation centers of the second unit, and a normal direction of the first contact arrangement surface faces toward a direction in which the first memory contact is exposed, the normal direction of the first contact arrangement surface faces toward a direction opposite to a direction in which the second unit is directed from the first position to the second position.

(Configuration 2)

The cartridge unit according to configuration 1, wherein the second unit includes a developer discharge opening for discharging the developer to the first unit, and the developer discharge opening and the first storage member are disposed on one end side with respect to a center of the second unit in a longitudinal direction of the second unit.

(Configuration 3)

The cartridge unit according to configuration 2, wherein the first unit includes an operation member which moves the second unit in a direction in which the second unit is detached from the first unit, and the operation member is disposed on the other end side opposite to the one end side with respect to the center of the second unit in the longitudinal direction of the second unit.

(Configuration 4)

The cartridge unit according to configuration 1, wherein the second unit includes a developer discharge opening for discharging the developer to the first unit, the developer discharge opening is disposed on one end side with respect to a center of the second unit in a longitudinal direction of the second unit, and the first storage member is disposed on the other end side opposite to the one end side with respect to the center of the second unit.

(Configuration 5)

A cartridge unit which is attachable to and detachable from an apparatus main body of an image forming apparatus, the apparatus main body including a positioning portion and a rotation restricting portion, the cartridge unit comprising:

a first unit which includes a photosensitive drum and a developing roller;

a second unit which is configured to be attachable to and detachable from the first unit, the second unit including a first storage member that stores information, and the second unit configured to supply developer to the first unit, the first storage member including a first storage element, a first memory contact electrically connected to the first storage element, and a first contact arrangement surface on which the first memory contact is disposed;

a positioned portion which comes into contact with the positioning portion; and a rotation restricted portion which comes into contact with the rotation restricting portion and restricts rotation around the positioned portion, wherein the first contact arrangement surface faces toward a direction opposite to a direction in which the rotation restricted portion is pressed against the rotation restricting portion.

(Configuration 6)

The cartridge unit according to configuration 5, wherein the second unit has a developer discharge opening for discharging the developer to the first unit, and the developer discharge opening and the first storage member are disposed on one end side with respect to a center of the second unit in a longitudinal direction of the second unit.

(Configuration 7)

The cartridge unit according to configuration 6, further comprising a support member provided in the first unit in order to support the second unit on the first unit, wherein the support member is disposed on the other end side opposite to the one end side with respect to the center of the second unit in the longitudinal direction of the second unit.

(Configuration 8)

The cartridge unit according to configuration 5, wherein the second unit includes a developer discharge opening for discharging the developer to the first unit, the developer discharge opening is disposed on one end side with respect to the center of the second unit in a longitudinal direction of the second unit, and the first storage member is disposed on the other end side opposite to the one end side with respect to the center of the second unit.

(Configuration 9)

The cartridge unit according to configuration 5, wherein a distance between the first memory contact and the positioned portion is longer than a distance between the positioned portion and the rotation restricted portion.

(Configuration 10)

The cartridge unit according to any one of configurations 1 to 9, wherein the first storage member is disposed on a top surface of the second unit in a posture in which the cartridge unit is used.

(Configuration 11)

A cartridge unit attachable to and detachable from an apparatus main body of an image forming apparatus, the cartridge unit comprising:

a first unit which includes a photosensitive drum and a developing roller; and a second unit which is configured to be attachable to and detachable from the first unit, the second unit including a first storage member that stores information, and the second unit configured to supply developer to the first unit, the first storage member including a first storage element, a first memory contact electrically connected to the first storage element, and a first contact arrangement surface on which the first memory contact is disposed, wherein the second unit is configured to be attachable to and detachable from the apparatus main body in a state in which the second unit is attached to the first unit, the second unit includes an end surface at an end portion of the second unit in a rotational axis direction of the developing roller, the end surface extends in a direction crossing the rotational axis direction of the developing roller, and the first storage member is disposed on the end surface.

(Configuration 12)

The cartridge unit according to configuration 11, wherein the first memory contact is disposed at a position protruding the most outward in the rotational axis direction.

(Configuration 13)

The cartridge unit according to configuration 11, wherein the apparatus main body includes a main body memory contact which comes into contact with the first memory contact when the cartridge unit is attached to the apparatus main body, and the second unit includes a positioning portion which determines a position of the main body memory contact.

(Configuration 14)

The cartridge unit according to configuration 11, wherein the second unit includes a first frame, and a supporting portion which supports the first storage member and is movable with respect to the first frame, and when the rotational axis direction is defined as a first direction, a direction perpendicular to the first direction is defined as a second direction, and a direction perpendicular to the first direction and the second direction is defined as a third direction, the supporting portion is configured to be movable in each direction of the first direction, the second direction, and the third direction with respect to the first frame.

(Configuration 15)

A cartridge unit including:

a first unit which includes a photosensitive drum, and a developing roller; and a second unit which is configured to be attachable to and detachable from the first unit, the second unit including a first storage member that stores information, and the second unit configured to supply developer to the first unit, the first storage member including a first storage element, a first memory contact electrically connected to the first storage element, and a first contact arrangement surface on which the first memory contact is disposed, wherein the second unit is configured to move from a first position to a second position so that the second unit is positioned with respect to the first unit in a state in which the second unit is in contact with the first unit, the first contact arrangement surface faces toward a direction in which the second unit is directed from the first position to the second position, and the first unit includes an opening portion which exposes the first contact arrangement surface.

(Configuration 16)

The cartridge unit according to configuration 15, wherein the second unit includes a developer discharge opening for discharging the developer to the first unit, and in a longitudinal direction of the second unit, the developer discharge opening is disposed on one end side with respect to a center of the second unit, and the first storage member is disposed on the other end side opposite to the one end side with respect to the center of the second unit.

(Configuration 17)

The cartridge unit according to configuration 15, wherein the second unit includes a developer discharge opening for discharging the developer to the first unit, and in a longitudinal direction of the second unit, the developer discharge opening and the first storage member are disposed on one end side with respect to a center of the second unit.

(Configuration 18)

The cartridge unit according to any one of configurations 15 to 17, wherein the first storage member is disposed on a bottom surface of the second unit in a posture when the cartridge unit is used.

(Configuration 19)

The cartridge unit according to any one of configurations 1 to 18, wherein the first unit includes a second storage member that stores information, and the second storage member includes a second storage element and a second memory contact electrically connected to the second storage element.

(Configuration 20)

The cartridge unit according to configuration 19, wherein the first storage member is disposed on one end side with respect to a center of the cartridge unit in a longitudinal direction of the cartridge unit, and the second storage member is disposed on the other end side opposite to the one end side with respect to the center of the cartridge unit.

(Configuration 21)

A cartridge unit including:

a first unit which includes a photosensitive drum, a developing roller, a metal member, a transfer roller, and a first roller that comes into contact with the photosensitive drum; and a second unit which is configured to be attachable to and detachable from the first unit, the second unit including a first storage member that stores information, and the second unit configured to supply developer to the first unit, the first storage member including a first storage element, and a first memory contact electrically connected to the first storage element, wherein when viewed in an axis direction of the photosensitive drum and when a tangent line which passes through one end of the first storage member and is in contact with the first roller is defined as a first tangent line and a tangent line which passes through the other end of the first storage member and in contact with the first roller is defined as a second tangent line, at least a part of the metal member or the photosensitive drum overlaps a region surrounded by the first tangent line, the second tangent line, the first storage member, and the first roller.

(Configuration 22)

The cartridge unit according to configuration 21, wherein the first roller comes into contact with the photosensitive drum at a first contact point, and when viewed in an axis direction of the photosensitive drum and when a straight line which connects the one end of the first storage member to the first contact point is defined as a first straight line and a straight line which connects the other end of the first storage member to the first contact point is defined as a second straight line, at least a part of the metal member or the photosensitive drum overlaps a region surrounded by the first straight line, the second straight line, and the first storage member.

(Configuration 23)

The cartridge unit according to configuration 21 or 22, further including a second roller which comes into contact with the first roller, wherein when viewed in the axis direction of the photosensitive drum and a tangent line which passes through one end of the first storage member and is in contact with the second roller is defined as a third tangent line and a tangent line which passes through the other end of the first storage member and in contact with the first roller is defined as a fourth tangent line, at least a part of the metal member or the photosensitive drum overlaps a region surrounded by the third tangent line, the fourth tangent line, the first storage member, and the second roller.

(Configuration 24)

The cartridge unit according to configuration 23, wherein the second roller comes into contact with the first roller at a second contact point, and when viewed in the axis direction of the photosensitive drum and a straight line which connects the one end of the first storage member and the second contact point is defined as a third straight line and a straight line which connects the other end of the first storage member and the second contact point is defined as a fourth straight line, at least a part of the metal member or the photosensitive drum overlaps a region surrounded by the third straight line, the fourth straight line, and the first storage member.

(Configuration 25)

The cartridge unit according to any one of configurations 21 to 24, wherein the first storage member is provided inward from a corona charging device or both end portions of the photosensitive drum in the axis direction of the photosensitive drum.

(Configuration 26)

The cartridge unit according to any one of configurations 21 to 25, wherein the second unit includes a developer discharge opening for discharging the developer to the first unit, and in a longitudinal direction of the second unit, the developer discharge opening and the first storage member are disposed on one end side with respect to a center of the second unit.

(Configuration 27)

The cartridge unit according to any one of configurations 21 to 25, wherein the second unit includes a developer discharge opening for discharging the developer to the first unit, and in a longitudinal direction of the second unit, the developer discharge opening is disposed on one end side with respect to a center of the second unit, and the first storage member is disposed on the other end side opposite to the one end side with respect to the center of the second unit.

(Configuration 28)

The cartridge unit according to any one of configurations 21 to 25, further comprising a power supply portion which receives electric power supplied to the first roller from the apparatus main body, wherein in the axis direction of the photosensitive drum, the power supply portion is disposed on one end side of the cartridge unit, and the first storage member is disposed on the other end side of the cartridge unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239498, filed on Dec. 27, 2019, and Japanese Patent Application No. 2020-196038, filed on Nov. 26, 2020 which are hereby incorporated by reference herein in their entirety.

What is claimed is:

1. A cartridge unit including:

a first unit including a frame, a photosensitive drum, and a developing roller; and a second unit configured to;

be attachable to and detachable from the first unit;

supply developer to the first unit; and move from a first position to a second position so that the second unit is positioned with respect to the first unit, in a state where the second unit is in contact with the first unit, wherein the second unit includes a first storage member that stores information, the first storage member including:

a first storage element;

a first memory contact electrically connected to the first storage element; and a first contact arrangement surface on which the first memory contact is disposed, wherein the first contact arrangement surface faces toward a direction in which the second unit is directed from the first position to the second position, and wherein the first unit includes a hole that exposes the first contact arrangement surface.

2. The cartridge unit according to claim 1, wherein:

the second unit includes a developer discharge opening for discharging the developer to the first unit, and in a longitudinal direction of the second unit, the developer discharge opening is disposed on one end side with respect to a center of the second unit, and the first storage member is disposed on the other end side opposite to the one end side with respect to the center of the second unit.

3. The cartridge unit according to claim 1, wherein:

the second unit includes a developer discharge opening for discharging the developer to the first unit, and in a longitudinal direction of the second unit, the developer discharge opening and the first storage member are disposed on one end side with respect to a center of the second unit.

4. The cartridge unit according to claim 1, wherein the first storage member is disposed on a bottom surface of the second unit in a posture of the cartridge unit in use.

5. The cartridge unit according to claim 1, wherein:

the first unit includes a second storage member that stores information, and the second storage member includes a second storage element and a second memory contact electrically connected to the second storage element.

6. The cartridge unit according to claim 5, wherein:

the first storage member is disposed on one end side with respect to a center of the cartridge unit in a longitudinal direction of the cartridge unit, and the second storage member is disposed on the other end side opposite to the one end side with respect to the center of the cartridge unit.

7. The cartridge unit according to claim 5, wherein the second storage element is closer to the photosensitive drum than the first storage element is to the photosensitive drum.

8. The cartridge unit according to claim 1, wherein, in a posture of the cartridge unit in use, the first contact arrangement surface faces downward and is lower than a rotation center of the photosensitive drum.

9. The cartridge unit according to claim 1, wherein:

the cartridge unit is configured to detachably attach to a main body of an image forming apparatus, the main body includes a main body contact, and the first memory contact comes in contact with the main body contact, in a state where the cartridge unit is attached to the main body.

* * * * *